United States Patent
Li et al.

(10) Patent No.: US 12,477,126 B2
(45) Date of Patent: Nov. 18, 2025

(54) CROSS-COMPONENT PREDICTION USING MULTIPLE COMPONENTS

(71) Applicants: Beijing Bytedance Network Technology Co., Ltd., Beijing (CN); Bytedance Inc., Los Angeles, CA (US)

(72) Inventors: Junru Li, Beijing (CN); Meng Wang, Beijing (CN); Li Zhang, San Diego, CA (US); Kai Zhang, San Diego, CA (US)

(73) Assignees: Beijing Bytedance Network Technology Co., Ltd., Beijing (CN); Bytedance Inc., Los Ageles, CA (US)

( * ) Notice: Subject to any disclaimer, the term of this patent is extended or adjusted under 35 U.S.C. 154(b) by 698 days.

(21) Appl. No.: 17/835,599

(22) Filed: Jun. 8, 2022

(65) Prior Publication Data

US 2022/0312020 A1  Sep. 29, 2022

Related U.S. Application Data

(63) Continuation of application No. PCT/CN2020/134382, filed on Dec. 8, 2020.

(30) Foreign Application Priority Data

Dec. 8, 2019 (WO) ................ PCT/CN2019/123857

(51) Int. Cl.
*H04N 19/186* (2014.01)
*H04N 19/105* (2014.01)
(Continued)

(52) U.S. Cl.
CPC ......... *H04N 19/186* (2014.11); *H04N 19/105* (2014.11); *H04N 19/11* (2014.11);
(Continued)

(58) Field of Classification Search
None
See application file for complete search history.

(56) References Cited

U.S. PATENT DOCUMENTS

| | | | |
|---|---|---|---|
| 10,200,700 B2 | 2/2019 | Zhang et al. | |
| 10,419,757 B2 | 9/2019 | Chen et al. | |

(Continued)

FOREIGN PATENT DOCUMENTS

| | | | |
|---|---|---|---|
| CN | 105723706 A | 6/2016 | |
| CN | 106664425 A | 5/2017 | |

(Continued)

OTHER PUBLICATIONS

Bross et al. "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P2001, 2019. http://phenix.it-sudparis.eu/jvet/doc_end_user/current_document.php?id=8857.

(Continued)

*Primary Examiner* — David N Werner
(74) *Attorney, Agent, or Firm* — Conley Rose, P.C.; William H. Dietrich

(57) ABSTRACT

Devices, systems and methods for digital video coding, which includes Prediction from Multiple Cross-components (PMC) methods, are described. An exemplary method for video processing includes making a first determination that a cross-component prediction (CCP) mode is disabled for a conversion between a video block of a video and a bitstream representation of the video and making a second determination, based on the first determination, regarding whether a first syntax element indicating usage of an enhanced Two-Step Cross-component Prediction Mode (TSCPM) coding tool or an enhanced cross-component linear model (CCLM) coding tool is included in the bitstream representation. The (Continued)

method also includes performing a conversion based on the second determination.

20 Claims, 29 Drawing Sheets

(51) Int. Cl.
  *H04N 19/11* (2014.01)
  *H04N 19/132* (2014.01)
  *H04N 19/159* (2014.01)
  *H04N 19/172* (2014.01)
  *H04N 19/196* (2014.01)
  *H04N 19/70* (2014.01)

(52) U.S. Cl.
  CPC ......... *H04N 19/132* (2014.11); *H04N 19/159* (2014.11); *H04N 19/172* (2014.11); *H04N 19/197* (2014.11); *H04N 19/70* (2014.11)

(56) References Cited

U.S. PATENT DOCUMENTS

| | | | |
|---|---|---|---|
| 10,448,025 B1 | 10/2019 | Xu et al. | |
| 10,469,847 B2 | 11/2019 | Xiu et al. | |
| 10,939,128 B2 | 3/2021 | Zhang et al. | |
| 10,979,717 B2 | 4/2021 | Zhang et al. | |
| 2012/0069904 A1* | 3/2012 | Amon | H04N 21/4788 375/E7.243 |
| 2014/0098862 A1* | 4/2014 | Yang | H04N 19/159 375/240.12 |
| 2014/0140392 A1 | 5/2014 | Xu et al. | |
| 2017/0127080 A1 | 5/2017 | Kawamura et al. | |
| 2017/0244975 A1 | 8/2017 | Wang et al. | |
| 2017/0324643 A1* | 11/2017 | Seregin | H04N 19/132 |
| 2017/0366818 A1* | 12/2017 | Zhang | H04N 19/159 |
| 2018/0199062 A1 | 7/2018 | Zhang et al. | |
| 2018/0205946 A1 | 7/2018 | Zhang et al. | |
| 2018/0288446 A1* | 10/2018 | An | H04N 19/159 |
| 2020/0314419 A1* | 10/2020 | Wang | H04N 19/11 |
| 2020/0359051 A1 | 11/2020 | Zhang et al. | |
| 2020/0366910 A1 | 11/2020 | Zhang et al. | |
| 2020/0366933 A1 | 11/2020 | Zhang et al. | |
| 2020/0382769 A1 | 12/2020 | Zhang et al. | |
| 2021/0092395 A1 | 3/2021 | Zhang et al. | |
| 2021/0092396 A1 | 3/2021 | Zhang et al. | |
| 2021/0152837 A1 | 5/2021 | Zhang et al. | |
| 2021/0211681 A1 | 7/2021 | Zhang et al. | |
| 2021/0258571 A1 | 8/2021 | Zhang et al. | |
| 2021/0258572 A1 | 8/2021 | Zhang et al. | |
| 2021/0297661 A1* | 9/2021 | Deng | H04N 19/159 |
| 2021/0297694 A1 | 9/2021 | Zhang et al. | |
| 2021/0314559 A1* | 10/2021 | Lin | H04N 19/159 |
| 2021/0314595 A1 | 10/2021 | Zhang et al. | |
| 2021/0321131 A1* | 10/2021 | Zhang | H04N 19/184 |
| 2021/0329248 A1* | 10/2021 | Deng | H04N 19/60 |
| 2021/0344902 A1 | 11/2021 | Zhang et al. | |
| 2021/0400260 A1 | 12/2021 | Zhang et al. | |
| 2022/0007034 A1* | 1/2022 | Wang | H04N 19/176 |
| 2022/0224891 A1* | 7/2022 | Chiang | H04N 19/593 |
| 2022/0272329 A1* | 8/2022 | Jang | H04N 19/186 |
| 2022/0279189 A1* | 9/2022 | Jang | H04N 19/136 |

FOREIGN PATENT DOCUMENTS

| | | | |
|---|---|---|---|
| CN | 109716771 A | 5/2019 | |
| CN | 110100439 A | 8/2019 | |
| CN | 113261291 A | 8/2021 | |
| KR | 20050063214 A | 6/2005 | |
| WO | 2018045207 A1 | 3/2018 | |
| WO | 2018053293 A1 | 3/2018 | |
| WO | 2018132710 A1 | 7/2018 | |
| WO | 2019054200 A1 | 3/2019 | |
| WO | WO-2021110116 A1 * | 6/2021 | ........... H04N 19/105 |

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

"Information Technology—High Efficiency Coding and Media Delivery in Heterogeneous Environments—Part 2: High Efficiency Video Coding" Apr. 20, 2018, ISO/DIS 23008, 4th Edition.

Laroche et al. "CE3-5.1: On Cross-Component Linear Model Simplification," Joint Video Experts Team (JVET) of TU-T SG 16 WP 3 and ISO/IEC JTC 1/SC 29/WG 11 12th Meeting: Macao, CN, Oct. 3-12, 2018, document JVET-L0191, 2018.

Ma et al. "CE3: Multi-Directional LM (MDLM) (Test 5.4.1 and 5.4.2)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0338, 2018.

Rosewarne et al. "High Efficiency Video Coding (HEVC) Test Model 16 (HM 16) Improved Encoder Description Update 7," Joint Collaborative Team on Video Coding (JCT-VC) of ITU-T SG16 WP3 and ISO/IEC JTC1/SC29/WG1125th Meeting: Chengdu, CN, Oct. 14-21, 2016, document JCTVC-Y1002, 2016.

Van Der Auwera et al. "Description of Core Experiment 3: Intra Prediction and Mode Coding," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K1023, 2018.

Wang et al. "CE3: Adaptive Multiple Cross-Component Linear Model (Test 5.9.1)," Joint Video Experts Team (JVET) of ITU-T SG 16 WP 3 and ISO/IEC JTC 1/SC 29/WG 11 12th Meeting: Macao, CN, Oct. 3-12, 2018, JVET-L0419, 2018.

Zhang et al. "Improving Chroma Intra Prediciton for HEVC," 2016 IEEE International Conference on Multimedia & Expo Workshops (ICMEW), Jul. 15, 2016, pp. 2-4.

Zhang et al. "Enhanced Cross-Component Linear Model Intra-Prediction," Joint Video Exploration Team (JVET) of ITU-T SG 16 WP 3 and ISO/IEC JTC 1/SC 29/WG 11 4th Meeting: Chengdu, CN, Oct. 15-21, 2016, document IVET-D0110, 2016.

International Search Report and Written Opinion from International Patent Application No. PCT/CN2020/133786 dated Mar. 3, 2021 (13 pages).

International Search Report and Written Opinion from International Patent Application No. PCT/CN2020/134382 dated Mar. 8, 2021 (11 pages).

Document: JVET-P2001-v1, Bross B., et al., "Versatile Video Coding (Draft 7)," Joint Video Experts Team (JVET) of ITU-T SG 16 WP 3 and ISO/ IEC JTC 1/SC 29/WG 11, 16th Meeting: Geneva, CH, Oct. 1-Oct. 11, 2019, 456 pages.

Li J., et al., "Prediction with Multi-cross Component," IEEE Xplore, 2020, 06 Pages.

First Office Action for Chinese Application No. 202080085360.X, mailed Mar. 26, 2025, 18 pages.

* cited by examiner

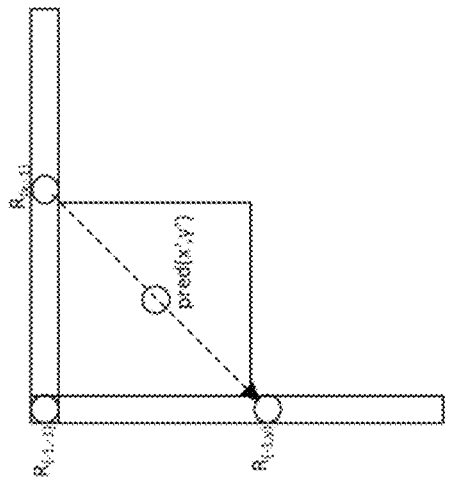
FIG. 6A  Diagonal top-right mode
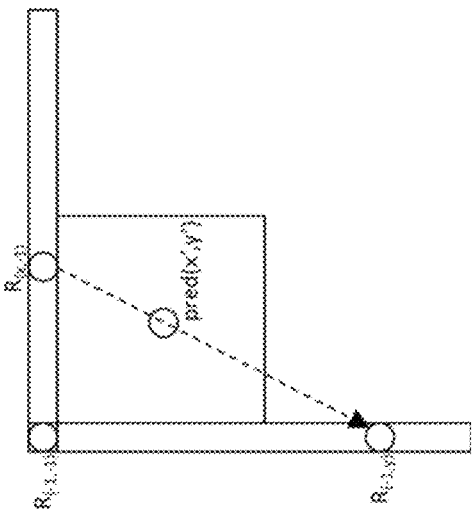
FIG. 6B  Diagonal bottom-left mode
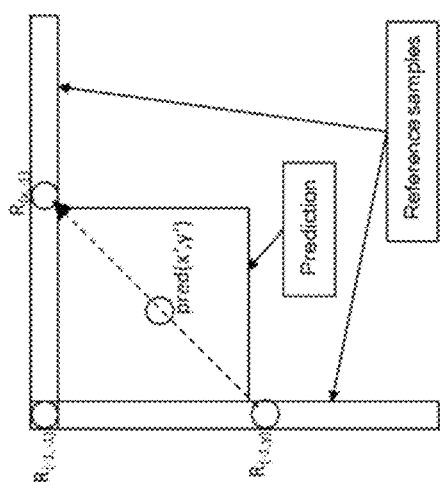
FIG. 6C  Adjacent diagonal top-right mode
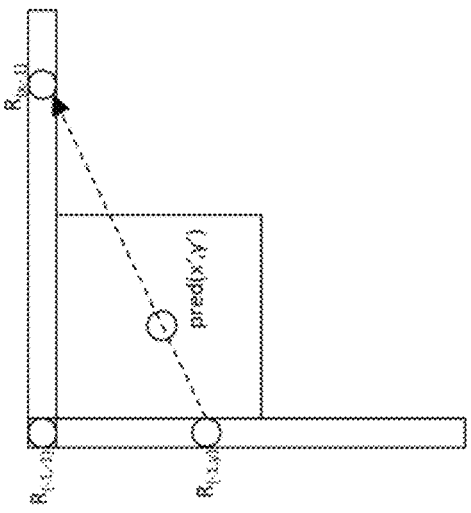
FIG. 6D  Adjacent diagonal bottom-left mode

CROSS-COMPONENT PREDICTION USING MULTIPLE COMPONENTS

CROSS REFERENCE TO RELATED APPLICATIONS

This application is a continuation of International Patent Application No. PCT/CN2020/134382, filed on Dec. 8, 2020, which claims the priority to and benefits of International Patent Application No. PCT/CN2019/123857 filed on Dec. 8, 2019. All the aforementioned patent applications are hereby incorporated by reference in their entireties.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to cross component prediction methods are described.

In one example aspect, a method of video processing is disclosed. The method includes making a first determination that a cross-component prediction (CCP) mode is disabled for a conversion between a video block of a video and a bitstream representation of the video and making a second determination, based on the first determination, regarding whether a first syntax element indicating usage of an enhanced Two-Step Cross-component Prediction Mode (TSCPM) coding tool or an enhanced cross-component linear model (CCLM) coding tool is included in the bitstream representation. The method also includes performing a conversion based on the second determination.

In another example aspect, a method of video processing is disclosed. The method includes making a first determination that an intra-block-copy (IBC) mode is disabled for a conversion between a video block of a video and a bitstream representation of the video and making a second determination, based on the first determination, regarding whether a first syntax element indicating usage of an adaptive block vector (BV) resolution coding tool is included in the bitstream representation. The method also includes performing a conversion based on the second determination.

In another example aspect, a method of video processing is disclosed. The method includes determining, for a conversion between a video block of a video and a bitstream representation of the video, that linear model parameters of an enhanced cross-component prediction (CCP) coding tool are assigned default values in case neighboring reference samples of the video block are located outside of a current video unit in which a current sample of the video block is located. The method also includes performing the conversion based on the determining.

In another example aspect, a method of video processing is disclosed. The method includes determining, for a conversion between a video block of a video and a bitstream representation of the video, that linear model parameters of an enhanced cross-component prediction (CCP) coding tool are derived based on padding neighboring reference samples of the video block in case the neighboring reference samples are located outside of a current video unit in which a current sample of the video block is located. The method also includes performing the conversion based on the determining.

In another example aspect, a method of video processing is disclosed. The method includes determining, for a conversion between a video block of a video and a bitstream representation of the video, that an enhanced cross-component prediction (CCP) mode is omitted in the bitstream representation in case neighboring reference samples of the video block are located outside of a current video unit in which a current sample of the video block is located. The method also includes performing the conversion based on the determining.

Another example video processing method comprises determining prediction values of samples of a first component of a video block of a video using representative samples of a second component of the video and/or a third component of the video, and performing a conversion between the video block and a bitstream representation of the video block according to the determined prediction values of the first component.

In another example aspect, a method of video processing is disclosed. The method includes determining, for a conversion between a video block of a video and a coded representation if the video, a cross-component mode is disabled for the conversion, and performing the conversion based on the determining according to a format rule for the coded representation, wherein the format rule specifies that syntax elements indicating enhancements to the cross-component mode are omitted from the coded representation.

In another example aspect, a method of video processing is disclosed. The method includes determining, for a conversion between a video block of a video and a coded representation if the video, an intra block copy mode is disabled for the conversion, and performing the conversion based on the determining according to a format rule for the coded representation, herein the format rule specifies that a syntax element indicating use of an adaptive resolution is omitted from the coded representation.

In another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 6A shows an example definition of samples used by position dependent intra prediction combination (PDPC) applied to diagonal top-right mode.

FIG. 6B shows an example definition of samples used by position dependent intra prediction combination (PDPC) applied to diagonal bottom-left mode.

FIG. 6C shows an example definition of samples used by position dependent intra prediction combination (PDPC) applied to adjacent top-right mode.

FIG. 6D shows an example definition of samples used by position dependent intra prediction combination (PDPC) applied to adjacent bottom-left mode.

DETAILED DESCRIPTION

Figure 1:
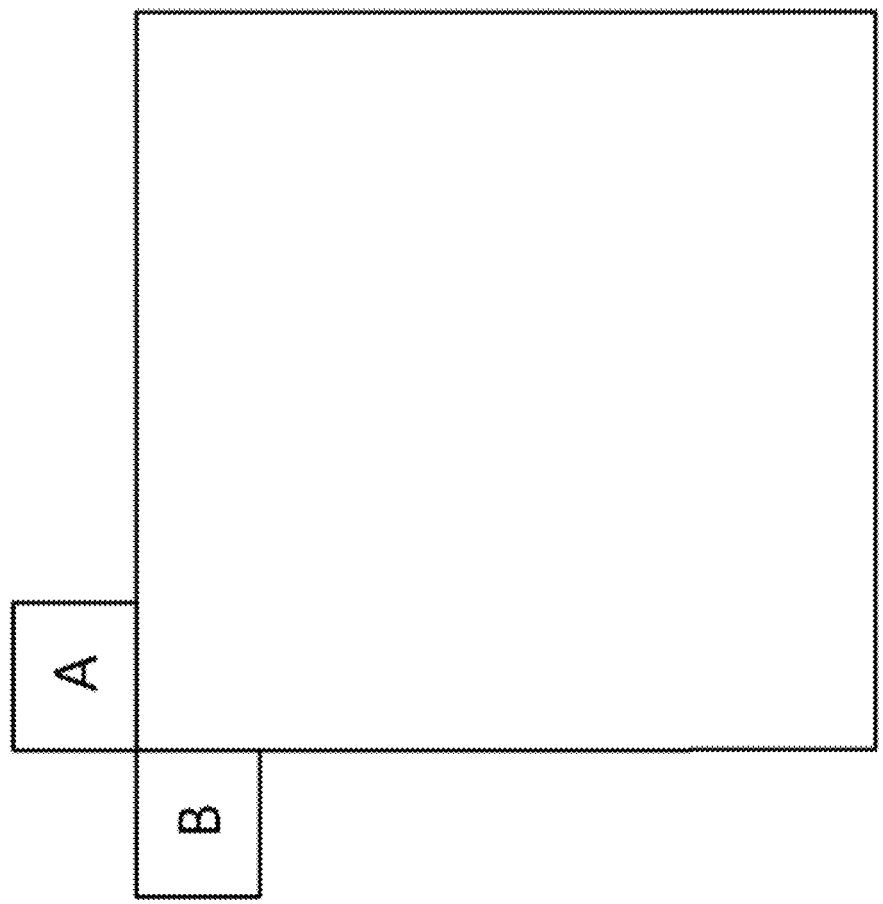
FIG. 1 shows neighboring blocks used in intra mode prediction.

Section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1 Summary

This technology described in this patent application is related to image/video coding technologies. Specifically, it is related to cross-component prediction in image/video coding. It may be applied to the existing video coding standard like high efficiency video coding (HEVC), or the standard (Versatile Video Coding) to be finalized. It may be also applicable to future video coding standards or video codec.

2 Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Color Formats

Chroma sub sampling is the practice of encoding images by implementing less resolution for chroma information than for luma information, taking advantage of the human visual system's lower acuity for color differences than for luminance.

4:2:0 is 2:1 sub sampling of Horizontal and Vertical. A signal with chroma 4:4:4 has no compression (so it is not sub sampled) and transports both luminance and color data entirely. In a four by two array of pixels, 4:2:2 has half the chroma of 4:4:4, and 4:2:0 has a quarter of the color information available.

Suppose one chroma block size is M×N wherein M is the width and N is the height of the chroma block, and the top-left position within the chroma block is denoted by (x, y). Then the collocated luma block could be identified by:

| Color format | top-left position of collocated luma block | Size of collocated luma block |
|---|---|---|
| 4:4:4 | (x, y) | M × N |
| 4:2:0 | (2x, 2y) | 2M × 2N |
| 4:2:2 | (2x, y) | 2M × N |

2.2 Intra Prediction in HEVC/H.265

In picture two distinct kinds of redundancy can be identified: 1) Spatial or temporal redundancy, 2) Psycho-visual redundancy. For remove spatial redundancy, prediction process is used. Intra-prediction is the process to predict pixels of picture frame. Intra-picture prediction uses neighborhood pixels for predict picture block. Before intra prediction frame must be split.

In HEVC, one picture/slice/tile may be split into multiple coding tree units (CTU). Depending on the parameters like texture complexity, the CTUs can have the size: 64×64, 32×32, or 16×16. Coding Tree Unit (CTU) is therefore a coding logical unit, which is in turn encoded into an HEVC bitstream. It consists of three blocks, namely luma (Y) two chroma components (Cb and Cr). Taking 4:2:0 color format as an example, Luma component have L×L samples and each chroma component have L/2×L/2 samples. Each block is called Coding Tree Block (CTB). Each CTB has the same size (L×L) as the CTU (64×64, 32×32, or 16×16). Each CTB can be divide repetitively in a quad-tree structure, from the same size as CTB to as small as 8×8. Each block resulting from this partitioning is called Coding Blocks (CBs) and becomes the decision making point of prediction type (inter or intra prediction). The prediction type along with other parameters is coded in Coding Unit (CU). So CU is the basic unit of prediction in HEVC, each of which is predicted from previously coded data. And the CU consists of three CBs (Y, Cb and Cr). CBs could still be too large to store motion vectors (inter-picture (temporal) prediction) or intra-picture (spatial) prediction mode. Therefore, Prediction Block (PB) was introduced. Each CB can be split into PBs differently depending on the temporal and/or spatial predictability. The CTUs can have the size: 32×32, 16×16, 8×8 or 4×4.

There are two kinds of intra prediction modes, PCM (pulse code modulation) and normal intra prediction mode.

2.2.1 PCM (Pulse Code Modulation)

In I_PCM mode, prediction, transform, quantization and entropy coding are bypassed. Coding of the samples of a block by directly representing the sample values without prediction or application of a transform.

In HEVC, I_PCM mode is only available for 2N×2N PU. Max and min I_PCM CU size is signaled in SPS, legal I_PCM CU sizes are 8×8, 16×16 and 32×32, user-selected PCM sample bit-depths, signaled in SPS for luma and chroma, separately.

Take Luma sample as an example: recSamplesL[i,j] =pcm_sample_luma[(nS*j)+i]<<(BitDepthY−PCMBit-DepthY). It becomes lossless coding when PCMBitDepthY=BitDepthY

2.2.2 Normal Intra Prediction

For the luma component, there are 35 modes, including Planar, DC and 33 angular prediction modes for all block sizes. To better code these luma prediction modes, one most probable mode (MPM) flag is firstly code to indicate whether one of the 3 MPM modes is chosen. If the MPM flag is false, then the 32 rest modes are coded with fixed length coding).

The selection of the set of three most probable modes is based on modes of two neighboring PUs, one left and one to the above of the current PU. Let the intra modes of left and above of the current PU be A and B, respectively wherein the two neighboring blocks are depicted in FIG. 1.

If a neighboring PU is not coded as intra or is coded with pulse code modulation (PCM) mode, the PU is considered to be a DC predicted one. In addition, B is assumed to be DC mode when the above neighboring PU is outside the CTU to avoid introduction of an additional line buffer for intra mode reconstruction.

If A is not equal to B, the first two most probable modes denoted as MPM[0] and MPM[1] are set equal to A and B, respectively, and the third most probable mode denoted as MPM[2] is determined as follows:

If neither of A or B is planar mode, MPM[2] is set to planar mode.

Otherwise, if neither of A or B is DC mode, MPM[2] is set to DC mode.

Otherwise (one of the two most probable modes is planar and the other is DC), MPM[2] is set equal to angular mode 26 (directly vertical).

If A is equal to B, the three most probable modes are determined as follows. In the case they are not angular modes (A and B are less than 2), the three most probable modes are set equal to planar mode, DC mode and angular mode 26, respectively. Otherwise (A and B are greater than or equal to 2), the first most probable mode MPM[0] is set equal to A and two remaining most probable modes MPM[1] and MPM[2] are set equal to the neighboring directions of A and calculated as:

$$MPM[1]=2+((A-2-1+32)\%32)$$

$$MPM[2]=2+((A-2+1)\%32)$$

where % denotes the modulo operator (e.g., a % b denotes the remainder of a divided by b).

For the chroma component, there are 5 modes, including DM, Planar, DC, Horizontal, Vertical.

2.3 Intra Prediction in VVC

2.3.1 Intra Mode Coding with 67 Intra Prediction Modes

To capture the arbitrary edge directions presented in natural video, the number of directional intra modes is extended from 33, as used in HEVC, to 65. The additional directional modes are depicted as grey dotted arrows in FIG. 2, and the planar and DC modes remain the same. These denser directional intra prediction modes apply for all block sizes and for both luma and chroma intra predictions.

Figure 2:
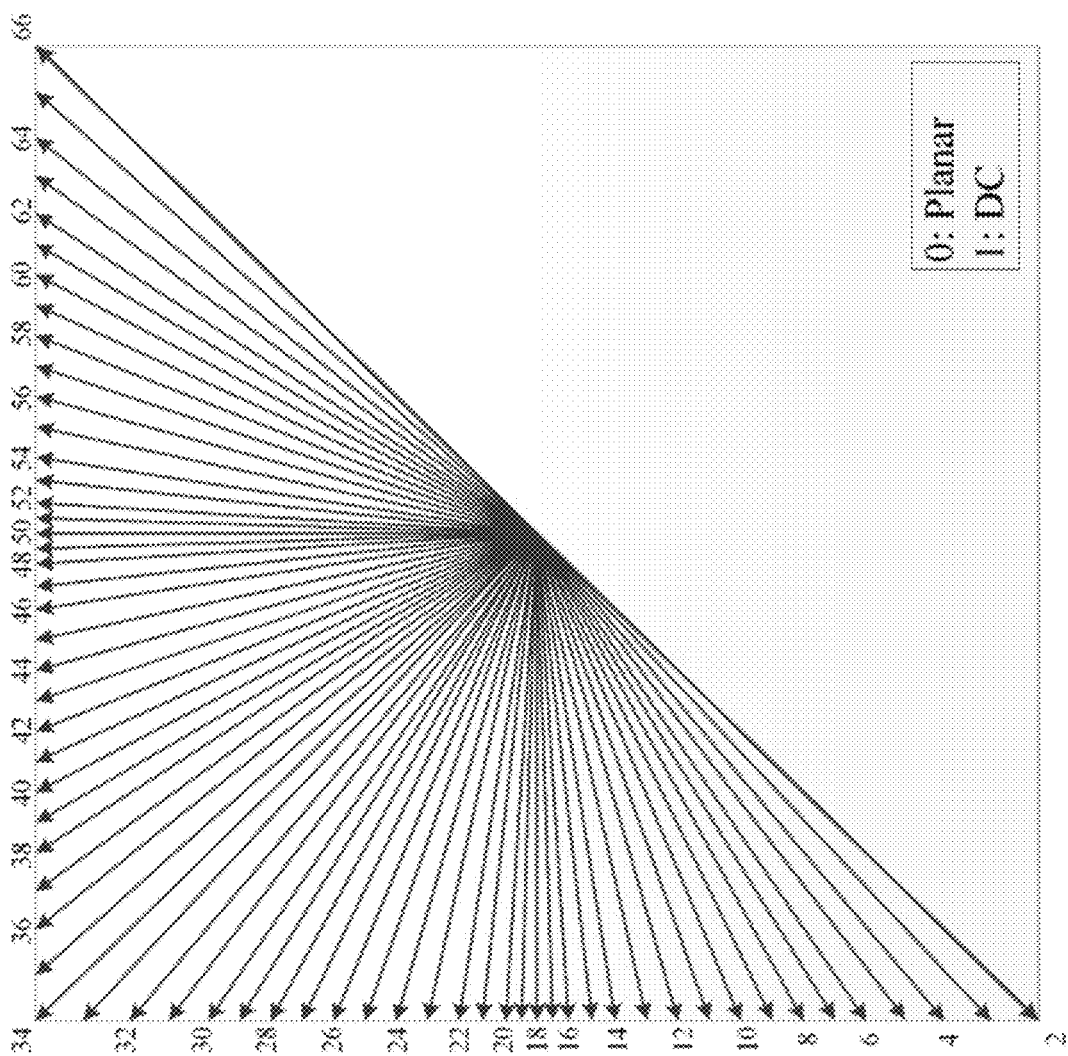
FIG. 2 shows 67 intra prediction modes.

Conventional angular intra prediction directions are defined from 45 degrees to −135 degrees in clockwise direction as shown in FIG. 2. In VTM2, several conventional angular intra prediction modes are adaptively replaced with wide-angle intra prediction modes for the non-square blocks. The replaced modes are signaled using the original method and remapped to the indexes of wide angular modes after parsing. The total number of intra prediction modes is unchanged, e.g., 67, and the intra mode coding is unchanged.

Figure 3:
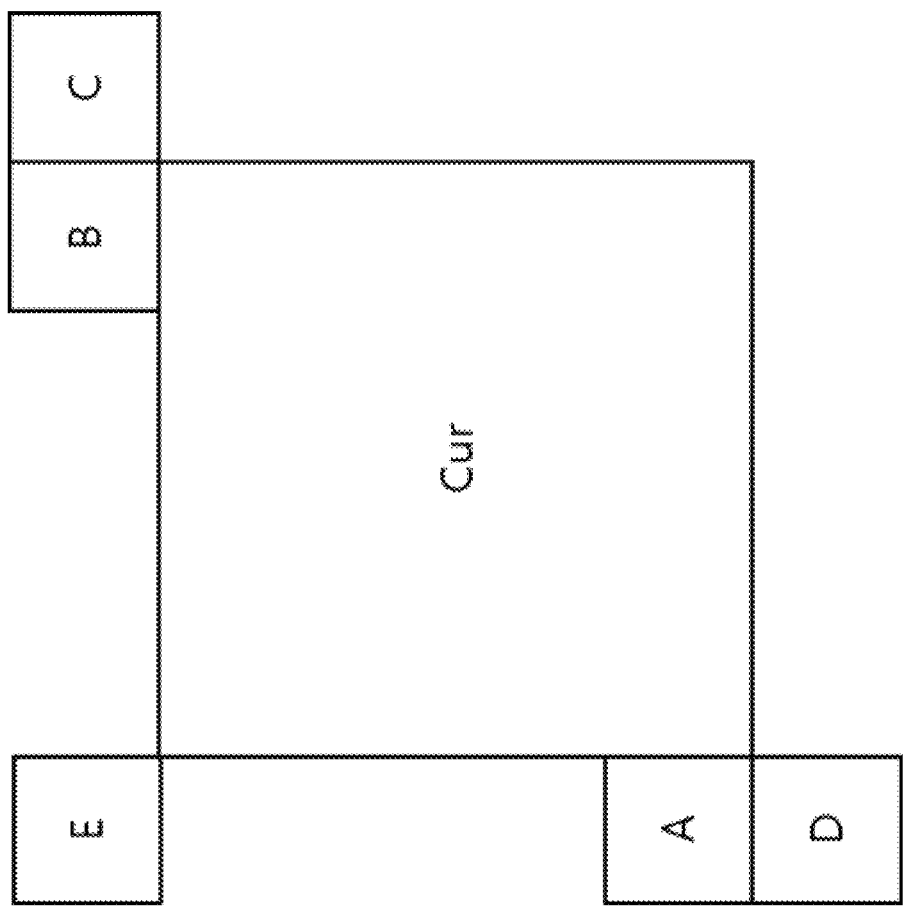
FIG. 3 shows neighboring blocks used in most probable mode (MPM) list construction process.

In the HEVC, every intra-coded block has a square shape and the length of each of its side is a power of 2. Thus, no division operations are required to generate an intra-predictor using DC mode. In VVV2, blocks can have a rectangular shape that necessitates the use of a division operation per block in the general case. To avoid division operations for DC prediction, only the longer side is used to compute the average for non-square blocks. 2.3.2 Intra mode coding for luma component with 6 MPMs In VVC reference software VTM3.0.rc1, only intra mode of neighbor position A and B denoted as LEFT and ABOVE, as depicted in FIG. 3 are used for MPM list generation. For the non MPM coding, truncated binary coded is applied.

Let the intra modes of left and above of the current CU be $Mode_A$ and $Mode_B$, respectively.

If a neighboring CU is not coded as intra or is coded with pulse code modulation (PCM) mode, the CU is considered to be a Planar predicted one. In addition, $Mode_B$ is assumed to be Planar mode when the above neighboring CU is outside the CTU to avoid introduction of an additional line buffer for intra mode reconstruction.

The 6 MPM modes are denoted by MPM[i] (i being 0 . . . 5). The following steps are performed in order:
1. Initialized values: MPM[6]={$Mode_A$, !$Mode_A$, 50, 18, 46, 54};
2. If $Mode_A$ is equal to $Mode_B$, the followings apply
   If $Mode_A$ is larger than 1 (non-DC/planar), MPM[6] ={$Mode_A$, planar, DC, 2+((candIntraPredModeA+62)%65), 2+((candIntraPredModeA−1)%65, 2+((candIntraPredModeA+61)%65))};
3. Otherwise ($Mode_A$ is equal to $Mode_B$), the followings apply:
   MPM[0]=$Mode_A$, MPM[1]=$Mode_B$
   Set the variable biggerIdx is as follows:

biggerIdx=candModeList[0]>candModeList[1]? 0:1

If both of $Mode_A$ and $Mode_B$ are larger than 1, MPM [x] with x=2 . . . 5 is derived as follows:

MPM[2]=INTRA_PLANAR

MPM[3]=INTRA_DC

If MPM[biggerIdx]−MPM[!biggerIdx] is equal to neither 64 nor 1, the following applies:

MPM[4]=2+((MPM[biggerIdx]+62)%65)

MPM[5]=2+((MPM[biggerIdx]−1)%65)

Otherwise, the following applies:

MPM[4]=2+((MPM[biggerIdx]+61)%65)

MPM[5]=2+(candModeList[biggerIdx]+61)%65)

Otherwise, if sum of $Mode_A$ and $Mode_B$ is larger or equal to 2, the following applies:

MPM[2]=!MPM[!biggerIdx]

MPM[3]=2+((MPM[biggerIdx]+62)%65)

MPM[4]=2+((MPM[biggerIdx]−1)%65)

MPM[5]=2+((MPM[biggerIdx]+61)%65)

where % denotes the modulo operator (e.g., a % b denotes the remainder of a divided by b).

2.3.3 Wide-Angle Intra Prediction for Non-Square Blocks

Conventional angular intra prediction directions are defined from 45 degrees to −135 degrees in clockwise direction. In VTM2, several conventional angular intra prediction modes are adaptively replaced with wide-angle intra prediction modes for non-square blocks. The replaced modes are signaled using the original method and remapped to the indexes of wide angular modes after parsing. The total number of intra prediction modes for a certain block is unchanged, e.g., 67, and the intra mode coding is unchanged.

Figure 4:
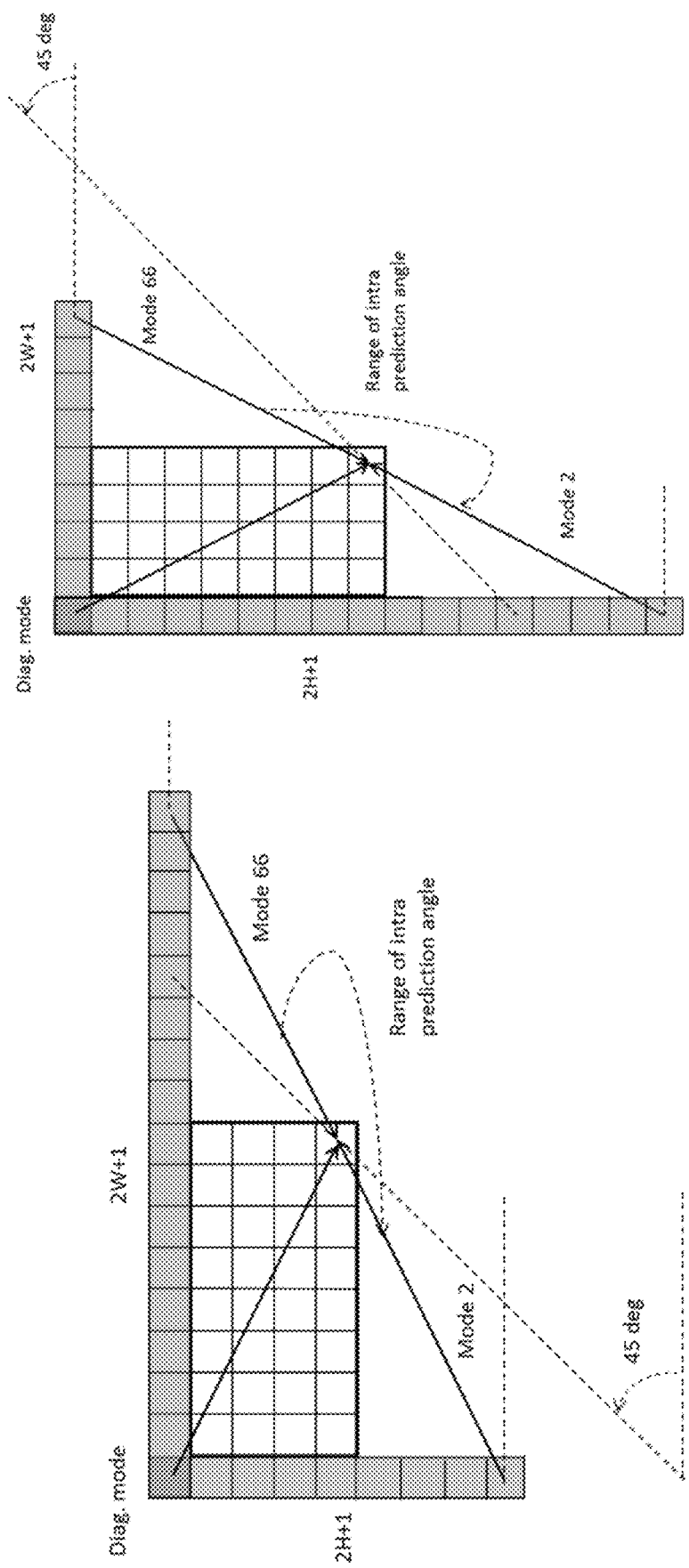
FIG. 4 shows reference samples for wide-angular intra prediction.

To support these prediction directions, the top reference with length 2W+1, and the left reference with length 2H+1, are defined as shown in FIG. 4.

The mode number of replaced mode in wide-angular direction mode is dependent on the aspect ratio of a block. The replaced intra prediction modes are illustrated in Table 2-1.

TABLE 2-1

Intra prediction modes replaced by wide-angular modes

| Condition | Replaced intra prediction modes |
|---|---|
| W/H == 2 | Modes 2, 3, 4, 5, 6, 7 |
| W/H > 2 | Modes 2, 3, 4, 5, 6, 7, 8, 9, 10, 11 |
| W/H == 1 | None |
| H/W == 1/2 | Modes 61, 62, 63, 64, 65, 66 |
| H/W < 1/2 | Mode 57, 58, 59, 60, 61, 62, 63, 64, 65, 66 |

Figure 5:
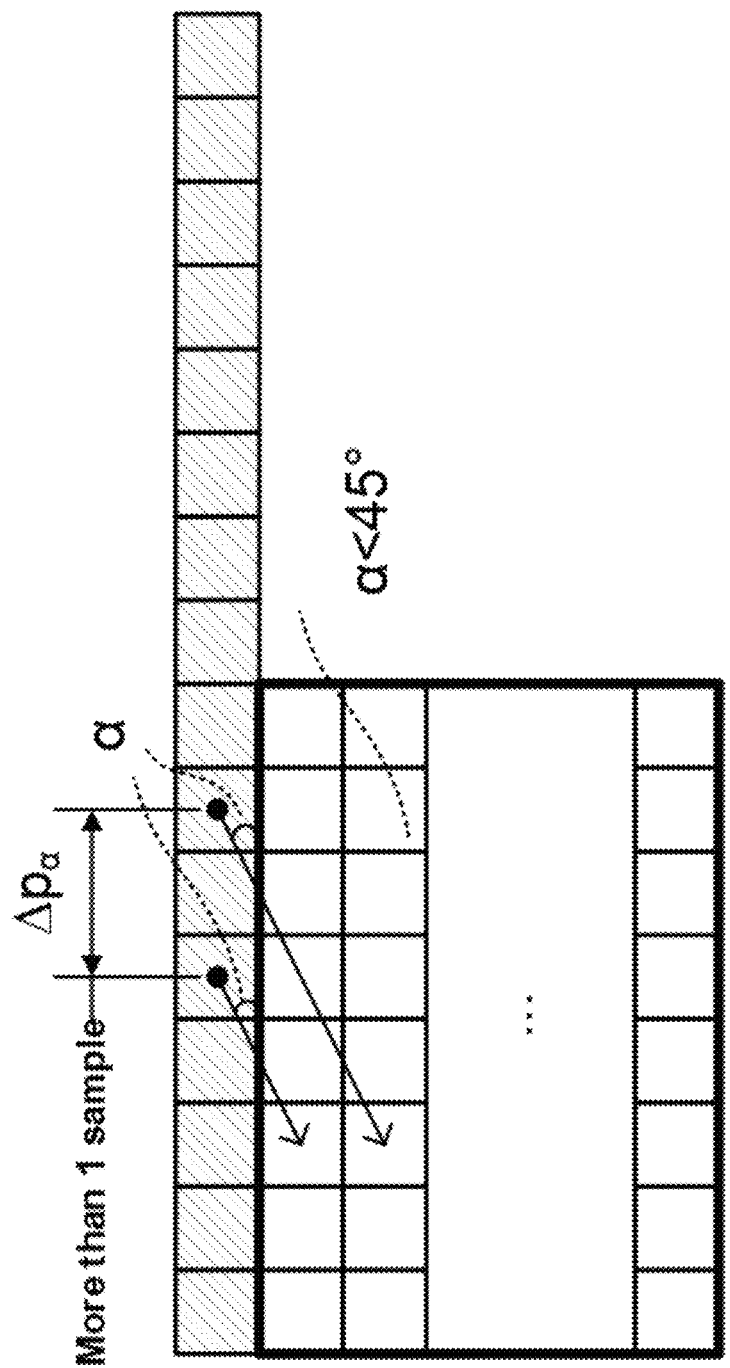
FIG. 5 shows a problem of discontinuity in case of directions beyond 45 degree.

As shown in FIG. 5, two vertically-adjacent predicted samples may use two non-adjacent reference samples in the case of wide-angle intra prediction. Hence, low-pass reference samples filter and side smoothing are applied to the wide-angle prediction to reduce the negative effect of the increased gap $\Delta p_\alpha$.

2.3.4 Position Dependent Intra Prediction Combination

In the VTM2, the results of intra prediction of planar mode are further modified by a position dependent intra prediction combination (PDPC) method. PDPC is an intra prediction method which invokes a combination of the un-filtered boundary reference samples and HEVC style intra prediction with filtered boundary reference samples. PDPC is applied to the following intra modes without signaling: planar, DC, horizontal, vertical, bottom-left angular mode and its eight adjacent angular modes, and top-right angular mode and its eight adjacent angular modes.

The prediction sample pred(x,y) is predicted using an intra prediction mode (DC, planar, angular) and a linear combination of reference samples according to the Equation as follows:

$$\text{pred}(x,y) = (wL \times R_{-1,y} + wT \times R_{x,-1} - wTL \times R_{-1,-1} + (64 - wL - wT + wTL) \times \text{pred}(x,y) + 32) >> 6$$

where $R_{x,-1}$, $R_{-1,y}$ represent the reference samples located at the top and left of current sample (x, y), respectively, and $R_{-1,-1}$ represents the reference sample located at the top-left corner of the current block.

If PDPC is applied to DC, planar, horizontal, and vertical intra modes, additional boundary filters are not needed, as required in the case of HEVC DC mode boundary filter or horizontal/vertical mode edge filters.

FIGS. 6A-6D illustrates the definition of reference samples ($R_{x-1}$, $R_{-1,y}$ and $R_{-1,-1}$) for PDPC applied over various prediction modes. The prediction sample pred(x', y') is located at (x', y') within the prediction block. The coordinate x of the reference sample $R_{x-1}$ is given by: x=x'+y'+1, and the coordinate y of the reference sample $R_{-1,y}$ is similarly given by: y=x'+y'+1.

The PDPC weights are dependent on prediction modes and are shown in Table 2-2.

TABLE 2-2

Example of PDPC weights according to prediction modes

| Prediction modes | wT | wL | wTL |
|---|---|---|---|
| Diagonal top-right | 16 >> ( ( y' << 1 ) >> shift) | 16 >> ( ( x' << 1 ) >> shift) | 0 |
| Diagonal bottom-left | 16 >> ( ( y' << 1 ) >> shift) | 16 >> ( ( x' << 1 ) >> shift) | 0 |
| Adjacent diagonal top-right | 32 >> ( ( y' << 1 ) >> shift) | 0 | 0 |
| Adjacent diagonal bottom-left | 0 | 32 >> ( ( x' << 1 ) >> shift) | 0 |

2.3.5 Multiple Reference Line Intra Prediction (MRLIP)

Instead of always using the reconstructed samples in the adjacent left column and above row (e.g., reference line 0) for intra prediction, it is proposed to allow using reference samples located at different distances.

Figure 7:
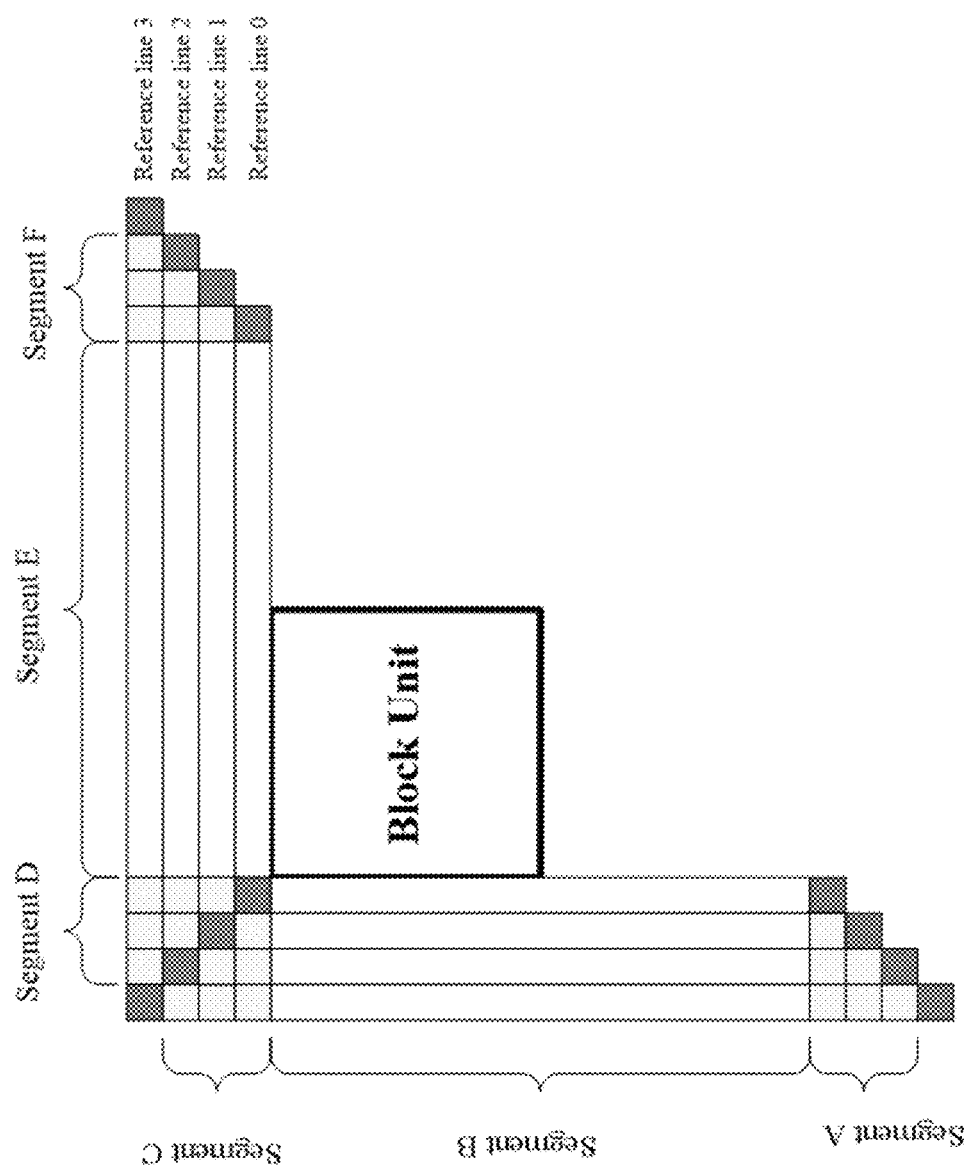
FIG. 7 shows an example of reference lines to be used for intra prediction.

The MRLIP has the following characteristics:
Reference line index signaling
for reference line idx>0, only those in MPM list and only signal mpm index without remaining mode;
for reference line index=0, the same as original design, all kinds of intra prediction modes may be selected
One of three lines may be selected for one luma block: reference line 0, 1, 3 as depicted in FIG. 7.
Top line of CTU restriction
disable MRL for the first line of blocks inside a CTU

2.3.6 Chroma Coding

In HEVC chroma coding, five modes (including one direct mode (DM) which is the intra prediction mode from the top-left corresponding luma block and four default modes) are allowed for a chroma block. The two-color components share the same intra prediction mode.

Different from the design in HEVC, two new methods have been proposed, including: cross-component linear model (CCLM) prediction mode and multiple DMs.

2.3.6.1 CCLM

To reduce the cross-component redundancy, a cross-component linear model (CCLM) prediction mode, a.k.a. LM, is used in the JEM, for which the chroma samples are predicted based on the reconstructed luma samples of the same CU by using a linear model as follows:

$$pred_C(i,j) = \alpha \cdot rec'_L(i,j) + \beta \tag{1}$$

where $pred_C(i,j)$ represents the predicted chroma samples in a CU and $rec'_L(i,j)$ represents the downsampled reconstructed luma samples of the same CU for color formats 4:2:0 or 4:2:2 while $rec'_L(i,j)$ represents the reconstructed luma samples of the same CU for color format 4:4:4. CCLM Parameters α and β are derived by minimizing the regression error between the neighboring reconstructed luma and chroma samples around the current block as follows:

$$\alpha = \frac{N \cdot \sum (L(n) \cdot C(n)) - \sum L(n) \cdot \sum C(n)}{N \cdot \sum (L(n) \cdot L(n)) - \sum L(n) \cdot \sum L(n)} \tag{2}$$

$$\beta = \frac{\sum C(n) - \alpha \cdot \sum L(n)}{N} \tag{3}$$

where L(n) represents the down-sampled (for color formats 4:2:0 or 4:2:2) or original (for color format 4:4:4) top and left neighboring reconstructed luma samples, C(n) represents the top and left neighboring reconstructed chroma samples, and value of N is equal to twice of the minimum of width and height of the current chroma coding block. For a coding block with a square shape, the above two equations are applied directly.

The CCLM luma-to-chroma prediction mode is added as one additional chroma intra prediction mode. At the encoder side, one more RD cost check for the chroma components is added for selecting the chroma intra prediction mode. When intra prediction modes other than the CCLM luma-to-chroma prediction mode is used for the chroma components of a CU, CCLM Cb-to-Cr prediction is used for Cr component prediction.

2.3.6.1.1 CCLM for Non-Square Block

Figure 8:
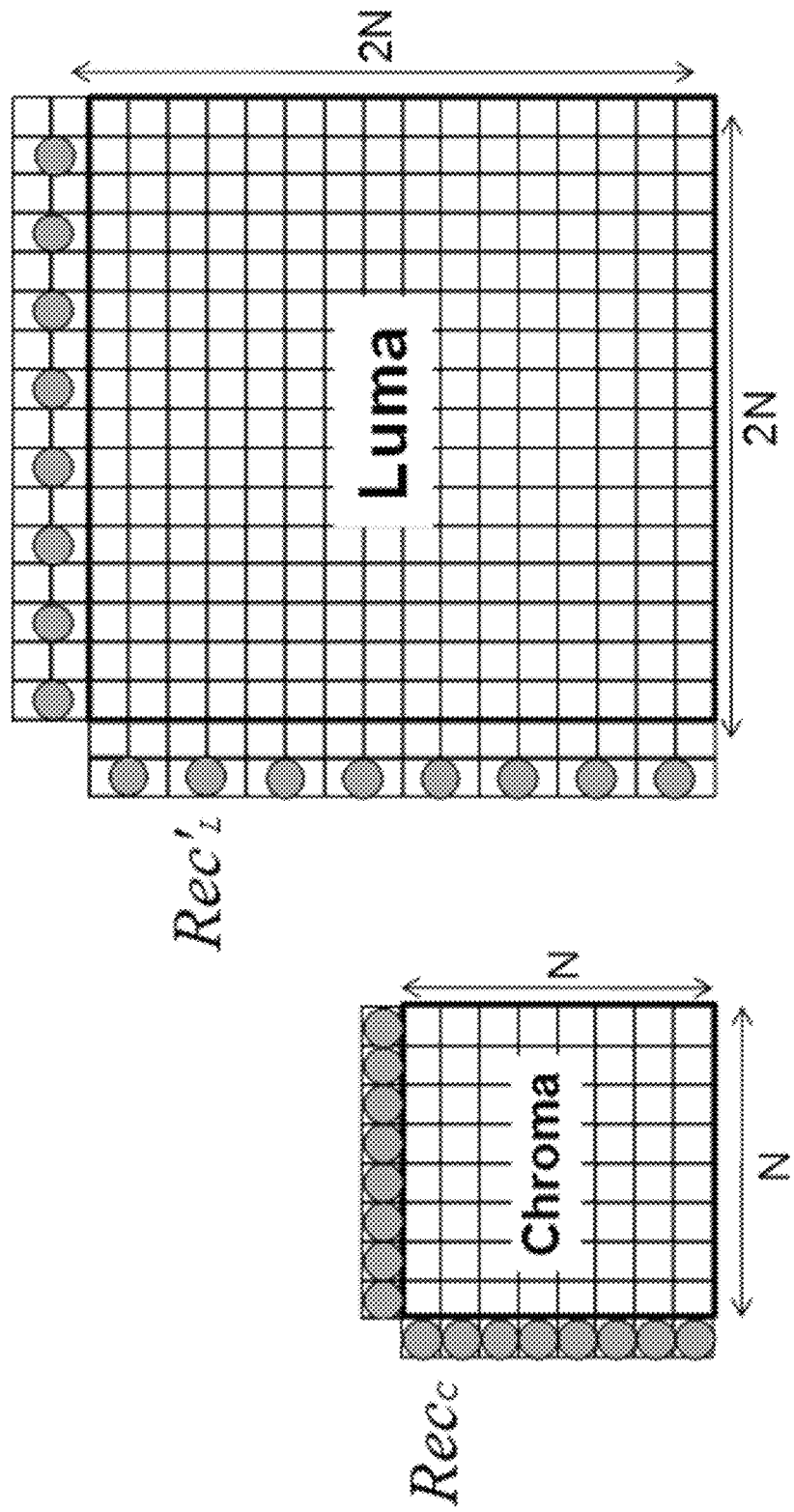
FIG. 8 shows locations of the samples used for the derivation of α and β.

For a non-square coding block, the neighboring samples of the longer boundary are first sub sampled to have the same number of samples as for the shorter boundary. FIG. 8 shows the location of the left and above reconstructed samples and the sample of the current block involved in the CCLM mode.

This regression error minimization computation is performed as part of the decoding process, not just as an encoder search operation, so no syntax is used to convey the α and β values.

2.3.6.1.2 CCLM Between Chroma Components

The CCLM prediction mode also includes prediction between the two chroma components, e.g., the Cr component is predicted from the Cb component. Instead of using the reconstructed sample signal, the CCLM Cb-to-Cr prediction is applied in residual domain. This is implemented by adding a weighted reconstructed Cb residual to the original Cr intra prediction to form the final Cr prediction:

$$pred^*_{Cr}(i,j) = pred_{Cr}(i,j) + \alpha \cdot resi'_{Cb}(i,j) \tag{4}$$

wherein $resi'_{Cb}(i,j)$ presents the reconstructed Cb residue sample at position (i,j).

The scaling factor α is derived in a similar way as in the CCLM luma-to-chroma prediction. The only difference is an addition of a regression cost relative to a default α value in the error function so that the derived scaling factor is biased towards a default value of −0.5 as follows:

$$\alpha = \frac{N \cdot \sum(Cb(n) \cdot Cr(n)) - \sum Cb(n) \cdot \sum Cr(n) + \lambda \cdot (-0.5)}{N \cdot \sum(Cb(n) \cdot Cb(n)) - \sum Cb(n) \cdot \sum Cb(n) + \lambda} \quad (5)$$

where Cb(n) represents the neighboring reconstructed Cb samples, Cr(n) represents the neighboring reconstructed Cr samples, and $\lambda$ is equal to $\Sigma(Cb(n) \cdot Cb(n))>>9$.

2.3.6.1.3 Downsampling Filters in CCLM Mode

Figure 9B:
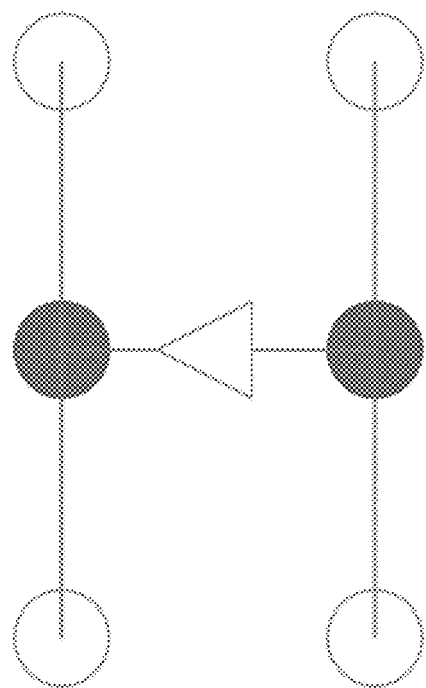
FIG. 9B shows downsampling filtering for cross-component linear model (CCLM) in Versatile Video Coding (VVC).

To perform cross-component prediction, for the 4:2:0 chroma format, where 4 luma samples corresponds to 1 chroma samples, the reconstructed luma block needs to be downsampled to match the size of the chroma signal. The default downsampling filter (e.g., 6-tap as depicted in FIG. 9B) used in CCLM mode is as follows.

$$Rec'_L[x,y] = \{2 \times Rec_L[2x,2y] + 2 \times Rec_L[2x,2y+1] + Rec_L[2x-1,2y] + Rec_L[2x+1,2y] + Rec_L[2x-1,2y+1] + Rec_L[2x+1,2y+1] + 4\} >> 3. \quad (6)$$

Figure 9A:
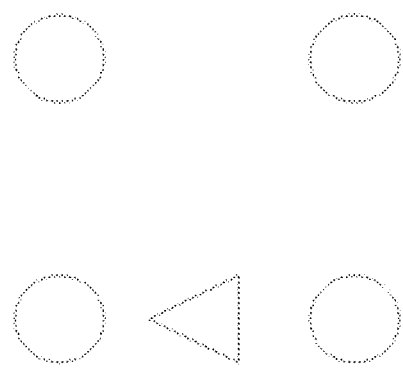
FIG. 9A shows a chroma sample (the triangle) and its corresponding four luma samples (circles).

Note that this downsampling assumes the "type 0" phase relationship as shown in FIG. 9A for the positions of the chroma samples relative to the positions of the luma samples—e.g., collocated sampling horizontally and interstitial sampling vertically.

2.3.6.2 MDLM (Multi-Directional LM)

Figure 10A:
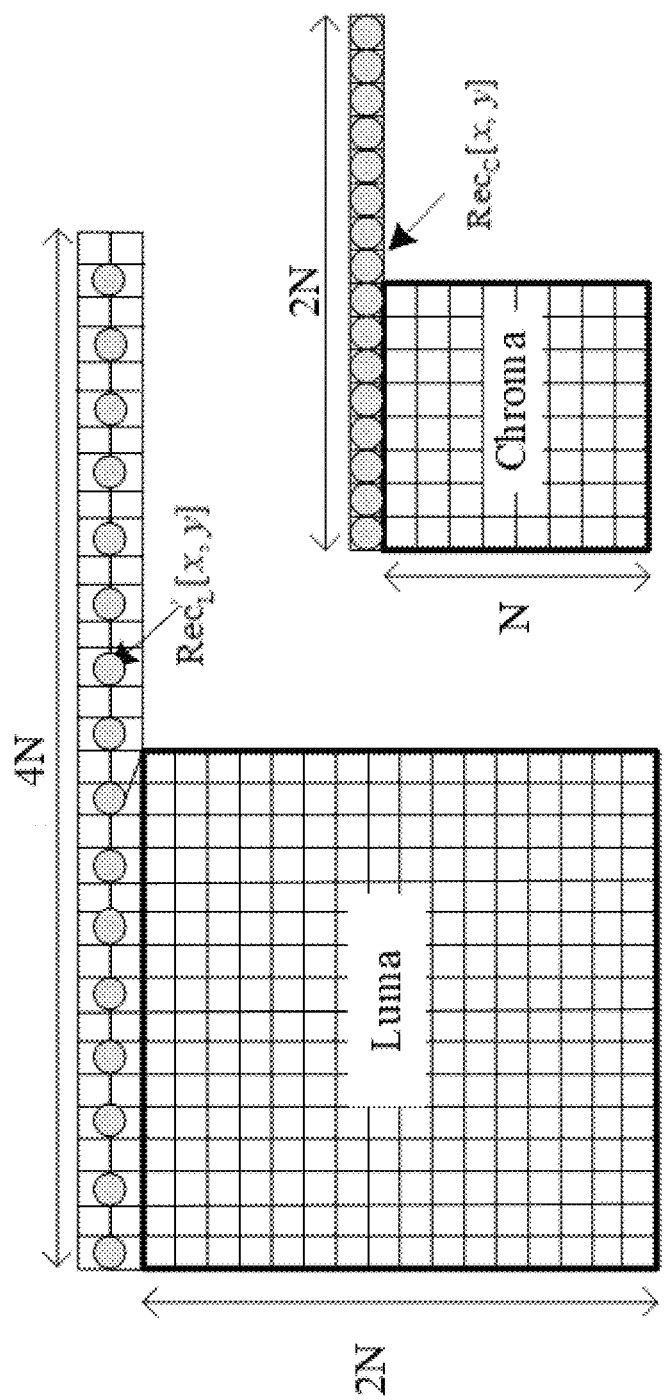
FIG. 10A shows a linear model top (LM-T) side assuming the chroma block size equal to N×N.
Figure 10B:
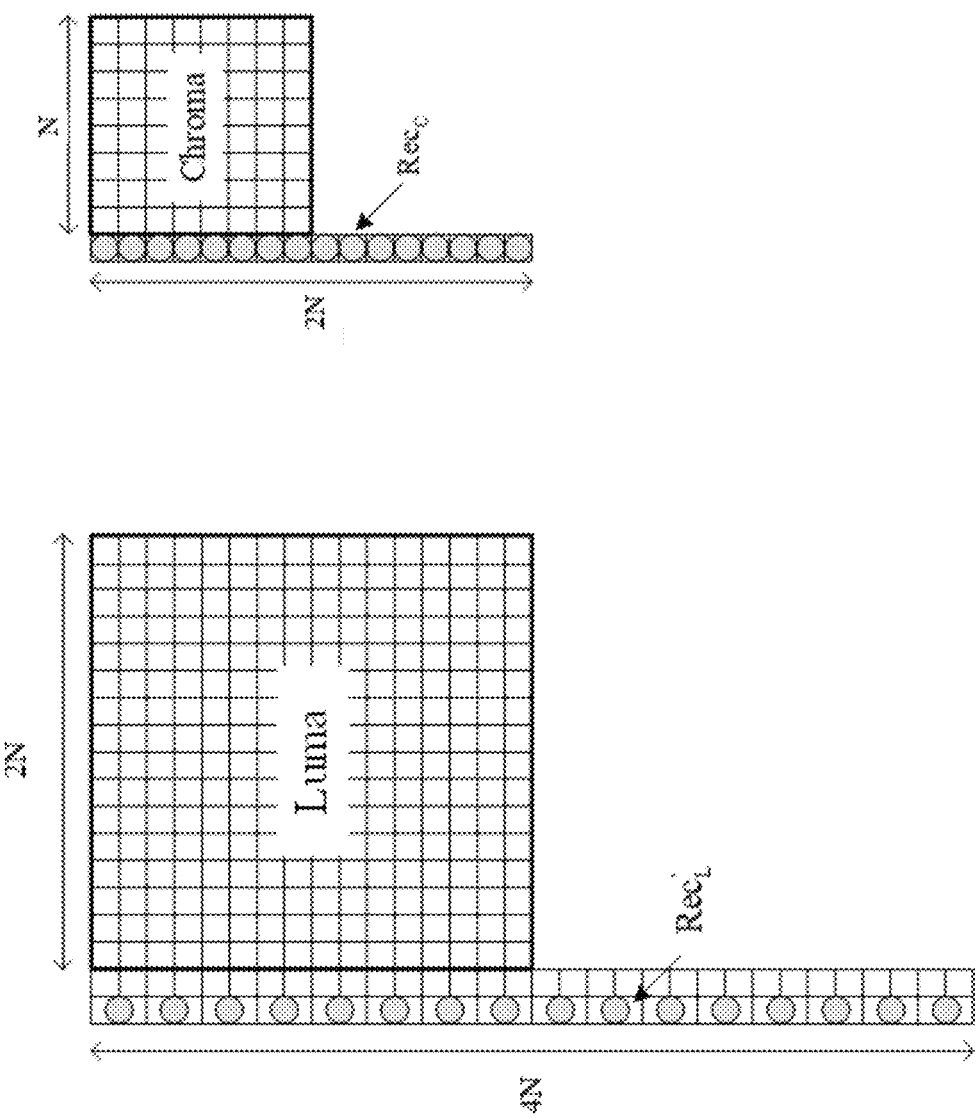
FIG. 10B shows a linear model left (LM-L) side assuming the chroma block size equal to N×N.

This contribution proposes multi-directional LM (MDLM). In MDLM, two additional CCLM modes are proposed: LM-T, where the linear model parameters are derived only based on the top neighboring samples as shown in FIG. 10A, and LM-L, where the linear model parameters are derived only based on the left neighboring samples as shown in FIG. 10B.

2.3.6.3 Three CCLM Solutions in VVC

CCLM from luma to chroma prediction as in JEM is adopted in VTM-2.0. In addition, WET-L0338 and WET-L0191 are further adopted into VTM-3.0.

In total, three modes for CCLM are supported, named INTRA_LT_CCLM (the one in JEM), INTRA_L_CCLM (LM-T) and INTRA_T_CCLM (LM-L). The differences among the three modes are which neighboring samples are utilized to derive the linear model parameters (e.g., α,β).

Suppose the chroma block size equal to nTbW×nTbH, the availability of top or left block of current block by availT and availL, respectively. The subsampling ratio of above row and left column by xS and yS, respectively.

2.3.6.3.1 INTRA_LT_CCLM

In this mode, also denoted as LM-LT, the above row and left column may be utilized to derive linear model parameters. For non-square chroma block, the corresponding longer side may be sub-sampled. That is, up to 2*nS=2*(min(nTbW, nTbH)) samples may be utilized for linear model parameter derivation.

More specifically, the following applies:

$$nS=((availL\&\&availT)?Min(nTbW,nTbH): \\ (availL?nTbH:nTbW)) \quad (7)$$

$$xS=1<<(((nTbW>nTbH)\&\&availL\&\&availT)?(Log \\ 2(nTbW)-Log\ 2(nTbH)):0) \quad (8)$$

$$yS=1<<(((nTbH>nTbW)\&\&availL\&\&availT)?(Log \\ 2(nTbH)-Log\ 2(nTbW)):0) \quad (9)$$

2.3.6.3.2 INTRA_L_CCLM

In this mode, also denoted as LM-L, the above row and above-right side (up to numSampL samples) are both utilized, if needed.

More specifically, the following applies:

xS and yS are set to 1 (e.g., no sub-sampling regardless it is non-square or square block).

$$numSampL= \\ (availL\&\&predModeIntra==INTRA\_L\_CCLM)? \\ (nTbH+numLeftBelow):0 \quad (10)$$

2.3.6.3.3 INTRA_T_CCLM

In this mode, also denoted as LM-T, the left column and left-below side (up to numSampT samples) are both utilized, if needed.

More specifically, the following applies:

xS and yS are set to 1 (e.g., no sub-sampling regardless it is non-square or square block).

$$numSampT= \\ (availT\&\&predModeIntra==INTRA\_T\_CCLM)? \\ (nTbW+numTopRight):0 \quad (11)$$

2.3.6.4 Four-Point Based Linear Model Derivation

Either 2 points or 4 points of neighboring luma samples and its corresponding chroma samples are utilized to derive the linear model parameters. According to the color format, the luma samples may be those downsampled luma samples instead of directly using the reconstructed luma samples.

Basically, the 2 or 4 points are selected with equal distance. Suppose the block width and height of current chroma block is W and H, respectively. And the top-left coordinate of current chroma block is [0, 0].

1. If the above and the left blocks are both available and current mode is the normal LM mode (excluding LM-T, and LM-L), 2 chroma samples locating at above row, and 2 chroma samples located left column are selected. The two above samples' coordinates are [floor(W/4), −1] and [floor (3*W/4), −1]. The two left samples' coordinates are [−1, floor(H/4)] and [−1, floor (3*H/4)]. The selected samples are painted in solid color (e.g., grey or black) as depicted in FIG. 11A.

Figure 11B:
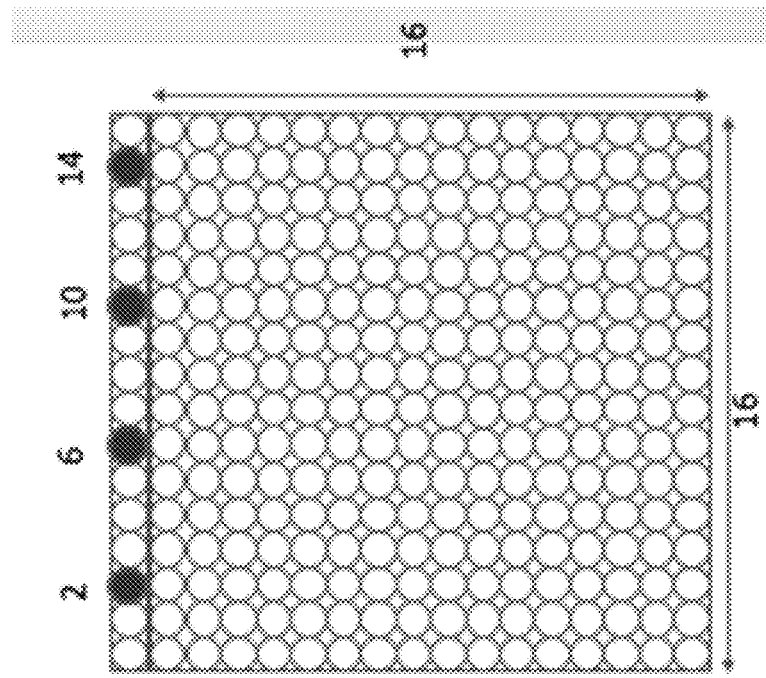
FIG. 11B shows another example of linear model (LM) parameter derivation process with 4 entries.
Figure 11A:
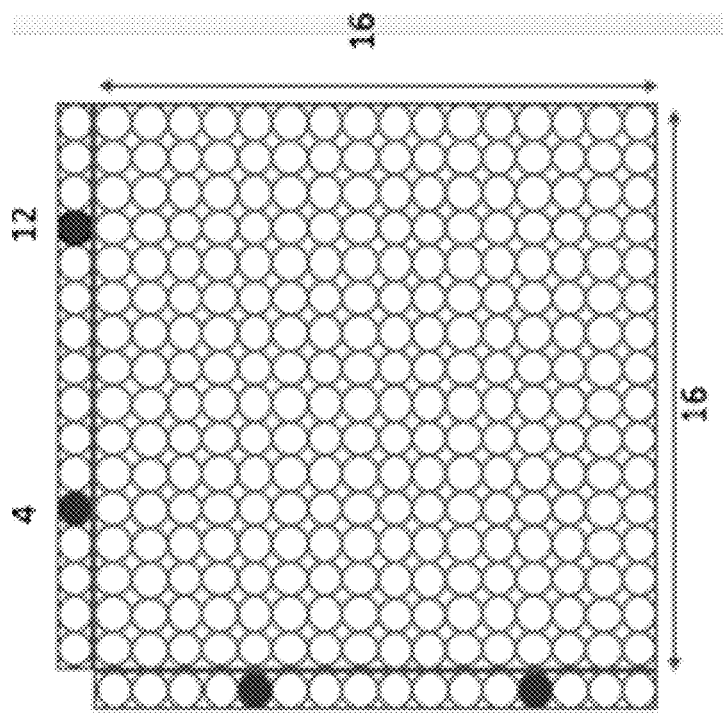
FIG. 11A shows an example of linear model (LM) parameter derivation process with 4 entries.

FIG. 11A shows example when both above and left neighboring samples are available. Subsequently, the 4 samples are sorted according to luma sample intensity and classified into 2 group. The two larger samples and two smaller samples are respectively averaged. Cross component prediction model is derived with the 2 averaged points. Alternatively, the maximum and minimum value of the four samples are used to derive the LM parameters.

2. If the above block is available while the left block is not available, four chroma samples from above block are selected when W>2 and 2 chroma samples are selected when W=2.

The four selected above samples' coordinates are [W/8, −1], [W/8+W/4, −1], [W/8+2*W/4, −1], and [W/8+3*W/4, −1]. The selected samples are painted in solid color (e.g., grey or black) as depicted in FIG.

11B. FIG. 11B shows an example when only above neighboring samples are available and top-right is not available.

3. If the left block is available while the above block is not available, four chroma samples from left block are selected when H>2 and 2 chroma samples are selected when H=2.

The four selected left samples' coordinates are [−1, H/8], [−1, H/8+H/4], [−1, H/8+2*H/4, −1], and [−1, H/8+3*H/4].

4. If neither of the left and above blocks are available, a default prediction is used. with α equals 0, β equals to 1<<(BitDepth−1), where BitDepth represents the bit-depth of chroma samples.

5. If the current mode is the LM-T mode, four chroma samples from above block are selected when W'>2 and 2 chroma samples are selected when W'=2. W' is the available number of above neighboring samples, which can be 2*W.

The four selected above samples' coordinates are [W'/8, −1], [W'/8+W'/4, −1], [W'/8+2*W'/4, −1], and [W'/8+3*W'/4, −1].

6. If the current mode is the LM-L mode, four chroma samples from left block are selected when H'>2 and 2 chroma samples are selected when H'=2. H' is the available number of left neighboring samples, which can be 2*H.

The four selected left samples' coordinates are [−1, H'/8], [−1, H'/8+H'/4], [−1, H'/8+2*H'/4, −1], and [−1, H'/8+3*H'/4].

Figure 12:
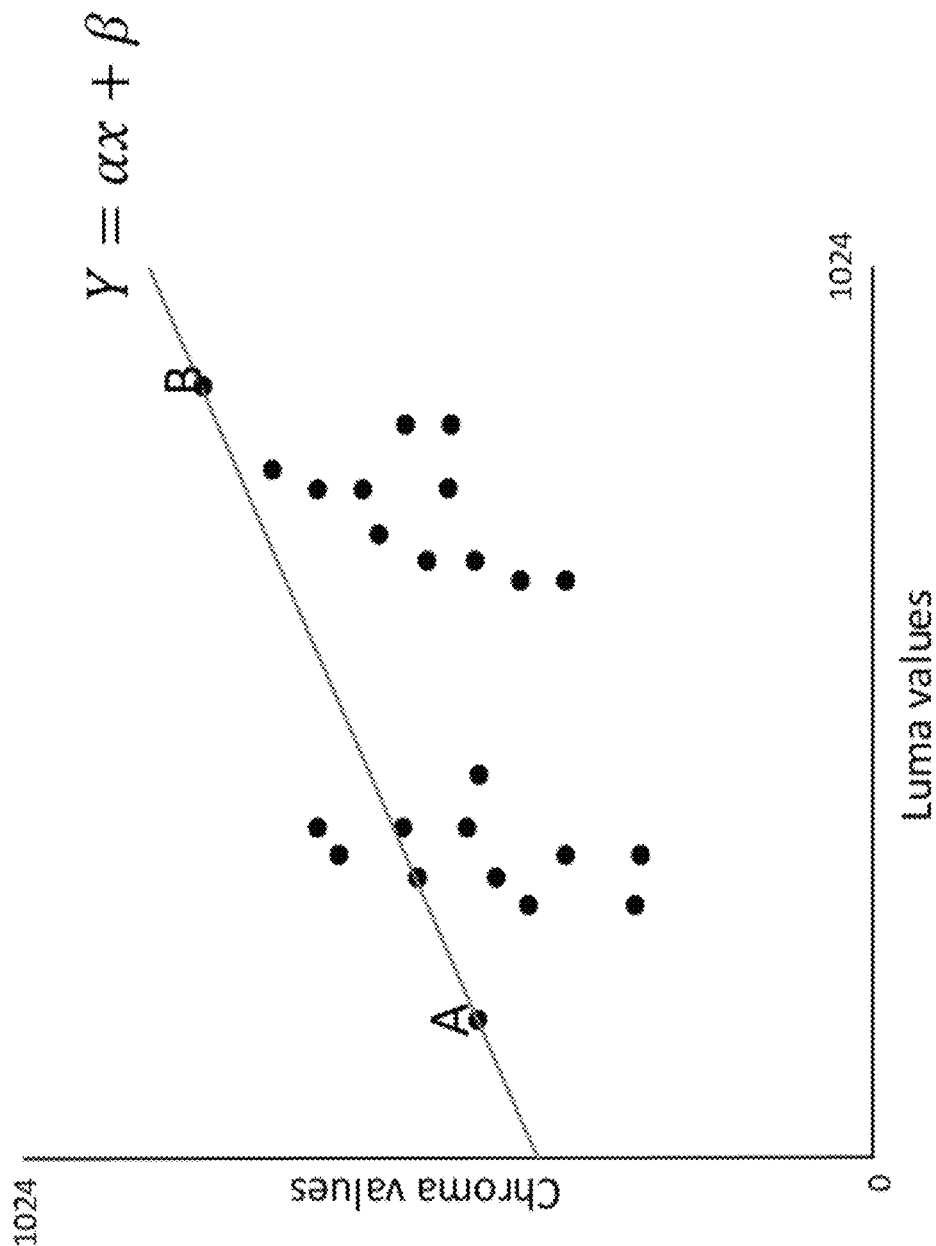
FIG. 12 shows an illustration of a straight line between minimum and maximum Luma value.

JVET-L0191 proposes to replace the LMS algorithm of the linear model parameters α and β by a straight-line equation, so called two-point method. Two smaller values among the four points are averaged, denoted as A; and the greater two values (the remaining two) among the four points are averaged, denoted by B. A and B are depicted in FIG. 12.

Where the linear model parameters α and β are obtained according to the following equations:

$$a = \frac{(y_B - y_A)}{(x_B - x_A)} \quad (12)$$

$$\beta = y_A - \alpha * x_A \quad (13)$$

The division to derive α is avoided and replaced multiplications and shifts as below:

— If either above or left neighboring block is available, the following applies:
```
a = 0;
iShift = 16;
shift = (InternalBitDepth > 8) ? InternalBitDepth − 9 : 0;
add = shift ? 1 << (shift − 1) : 0;
diff = (MaxLuma − MinLuma + add) >> shift;
if (diff > 0)
{
  div = ((MaxChroma − MinChroma) * g_aiLMDivTableLow[diff − 1] + 32768) >> 16;
  a = (((MaxChroma − MinChroma) * g_aiLMDivTableHigh[diff − 1] + div + add) >> shift);
}
b = Minchroma − ((a * MinLuma) >> iShift);
```
— Otherwise, the following applies:
```
a = 0; iShift = 0; b = 1 << (BitDepth_C − 1)
``` wherein S is set equal to iShift, α is set equal to a and β is set equal to b; g_aiLMDivTableLow and g_aiLM-DivTableHigh are two tables each with 512 entries. Each entry stores a 16-bit integer.

To derive the Chroma predictor, as for the current VTM implementation, the multiplication is replaced by an integer operation as the following:

$$pred_C(i,j) = (\alpha \cdot rec'_L(i,j)) >> S + \beta$$

The prediction values are further clipped to the allowed range of chroma values.

2.3.6.5 Chroma Prediction Generation Process

For all of the three supported LM modes, the followings apply:

The prediction samples predSamples[x][y] of one chroma block equal to with x=0 . . . nTbW−1, y=0 . . . nTbH−1 are derived as follows:

$$predSamples[x][y] = Clip1C(((pDsY[x][y]*\alpha)>>k)+\beta) \quad (14)$$

$$Clip1_C(x) = Clip3(0, (1<<BitDepth_C)-1, x) \quad (15)$$

wherein (a, b), k (set to S) are the two linear model parameters derived from sub-sections 2.3.6.3.1 or 2.3.6.3.2 or 2.3.6.3.3 depending on the selected CCLM mode for the chroma block, nTbW and nTbH are the width and height of the chroma block, respectively, and pDsY is the downsampled collocated luma reconstructed block.

More specifically, the down-sampled collocated luma samples pDsY[x][y] with x=0 . . . nTbW−1, y=0 . . . nTbH−1 are derived as follows, with (1, 2, 1; 1, 2, 1) downsampling filter or (1, 1) downsampling filter for the top-left position:

pDsY[x][y] with x=1 . . . nTbW−1, y=0 . . . nTbH−1 is derived as follows:

$$pDsY[x][y] = (pY[2*x−1][2*y]+pY[2*x−1][2*y+1]+ \\ 2*pY[2*x][2*y]+2*pY[2*x][2*y+1]+pY[2*x+1] \\ [2*y]+pY[2*x+1][2*y+1]+4)>>3 \quad (16)$$

If availL is equal to TRUE, pDsY[0][y] with y=0 . . . nTbH−1 is derived as follows:

$$pDsY[0][y] = (pY[−1][2*y]+pY[−1][2*y+1]+2*pY[0] \\ [2*y]+2*pY[0][2*y+1]+pY[1][2*y]+pY[1][2*y+ \\ 1]+4)>>3 \quad (17)$$

Otherwise, pDsY[0][y] with y=0 . . . nTbH−1 is derived as follows:

$$pDsY[0][y] = (pY[0][2*y]+pY[0][2*y+1]+1)>>1 \quad (18)$$

In above examples, pY indicates the collocated luma reconstructed samples before deblocking filter.

2.3.6.6 Syntax Design of Chroma Intra Prediction Modes

7.3.9.5 Coding Unit Syntax

| | Descriptor |
|---|---|
| coding_unit( x0, y0, cbWidth, cbHeight, cqtDepth, tree Type, modeType) { | |
| ... | |
|   if( ( tree Type == SINGLE_TREE \|\| | |
|     treeType == | |
|     DUAL_TREE_CHROMA) && | |
|     ChromaArrayType != 0 ) { | |
|     if( pred_mode_plt_flag && treeType == DUAL_TREE_CHROMA ) | |
|       palette_coding( x0, y0, cbWidth / SubWidthC, cbHeight/ SubHeightC, treeType ) | |
|     else { | |
|       if( !cu_act_enabled_flag ) { | |
|         if( cbWidth <= MaxTsSize && cbHeight <= MaxTsSize && sps_bdpcm_chroma_enabled_flag ) { | |
|           intra_bdpcm_chroma_flag | ae(v) |
|           if( intra_bdpcm_chroma_flag ) | |
|             intra_bdpcm_chroma_dir_flag | ae(v) |
|         } else { | |
|           if( Cclm Enabled) | |
|             cclm_mode_flag | ae(v) |
|           if( cclm_mode_flag ) | |
|             cclm_mode_idx | ae(v) |
|           else | |
|             intra_chroma_pred_mode | ae(v) |
|         } | |
|       } | |
| ... | |

TABLE 20

Specification of IntraPredModeC[xCb][yCb] depending on cclm_mode_flag cclm_mode_idx, intra_chroma_pred_mode_and lumaIntraPredMode

| cclm_mode_flag | cclm_mode_idx | intra_chroma_pred_mode | lumaIntraPredMode | | | | |
|---|---|---|---|---|---|---|---|
| | | | 0 | 50 | 18 | 1 | X (0 <= X <= 66) |
| 0 | — | 0 | 66 | 0 | 0 | 0 | 0 |
| 0 | — | 1 | 50 | 66 | 50 | 50 | 50 |
| 0 | — | 2 | 18 | 18 | 66 | 18 | 18 |
| 0 | — | 3 | 1 | 1 | 1 | 66 | 1 |
| 0 | — | 4 | 0 | 50 | 18 | 1 | X |
| 1 | 0 | — | 81 | 81 | 81 | 81 | 81 |
| 1 | 1 | — | 82 | 82 | 82 | 82 | 82 |
| 1 | 2 | — | 83 | 83 | 83 | 83 | 83 |

2.4 Two-Step Cross-Component Prediction Mode (TSCPM) in AVS3

This section shows an example of the Two-Step Cross-component Prediction Mode (TSCPM) in AVS3. TSCPM is done in the following steps:
1) Get linear model from neighboring reconstructed samples
2) Apply the linear model to the originally reconstructed luma block to get an internal prediction block.
3) The internal prediction block is down-sampled to generate the final chroma prediction block.

Figure 13:
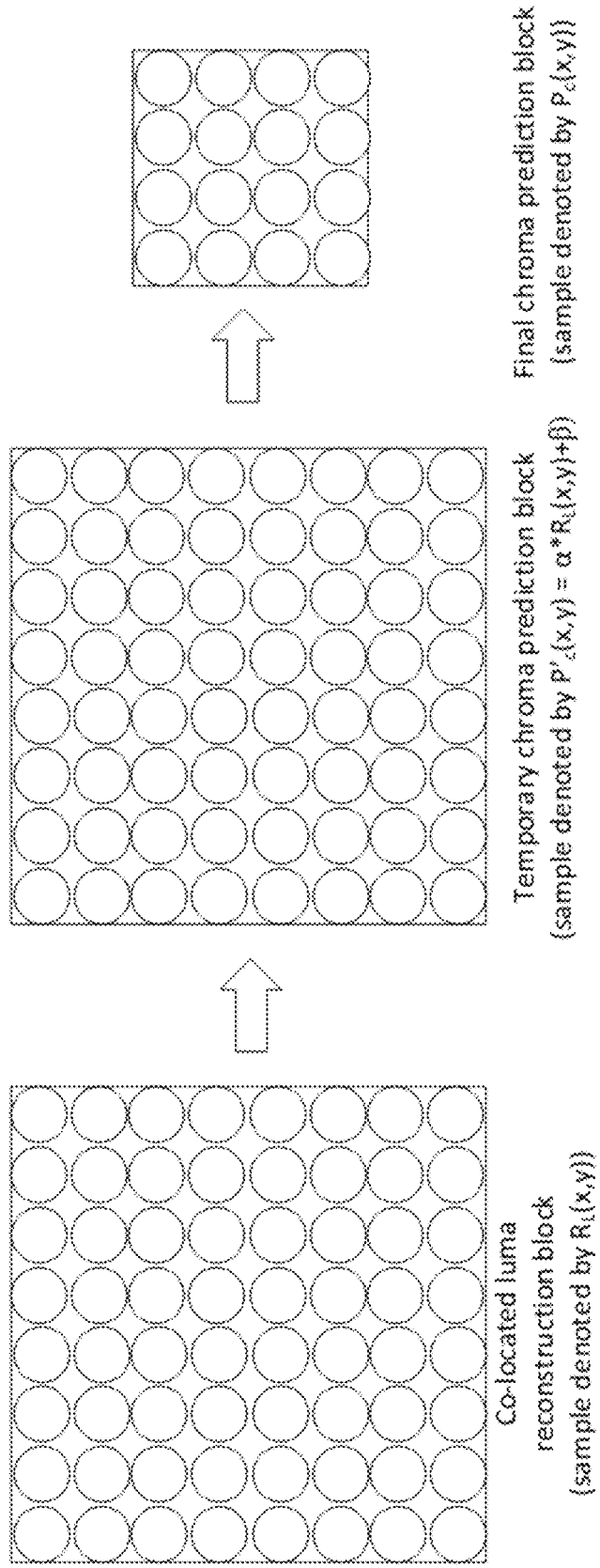
FIG. 13 shows a coding flow of Two-Step Cross-component Prediction Mode (TSCPM) taking 4:2:0 and 8×8 luma block, 4×4 chroma block as an example.

FIG. 13 depicts the basic procedures of the chroma prediction block generation process. The left square denotes the originally reconstructed luma sample located at (x, y) of the collocated luma block by $R_L(x, y)$. By simply applying the linear model with parameters ($\alpha$, $\beta$) to each luma sample, a temporary chroma prediction block is generated. After that, the temporary chroma prediction block is further down-sampled to generate the final chroma prediction block.

The linear model derivation process and down-sampling process is described in the following sub-sections.

2.4.1 Derivation of Linear Model

In one embodiment, either 4 or 2 samples may be selected and averages of two larger values and two smaller values are utilized to calculate the parameters.

Selection of Neighboring Samples

Firstly, the ratio r of width and height of chroma coded block is calculated as Eq.19. Then based on the availability of above row and left column, four or two samples are selected.

$$r = \begin{cases} \dfrac{width}{height} & \text{if width} \geq \text{height} \\ \dfrac{height}{width} & \text{if width} < \text{height} \end{cases}$$

Figure 14:
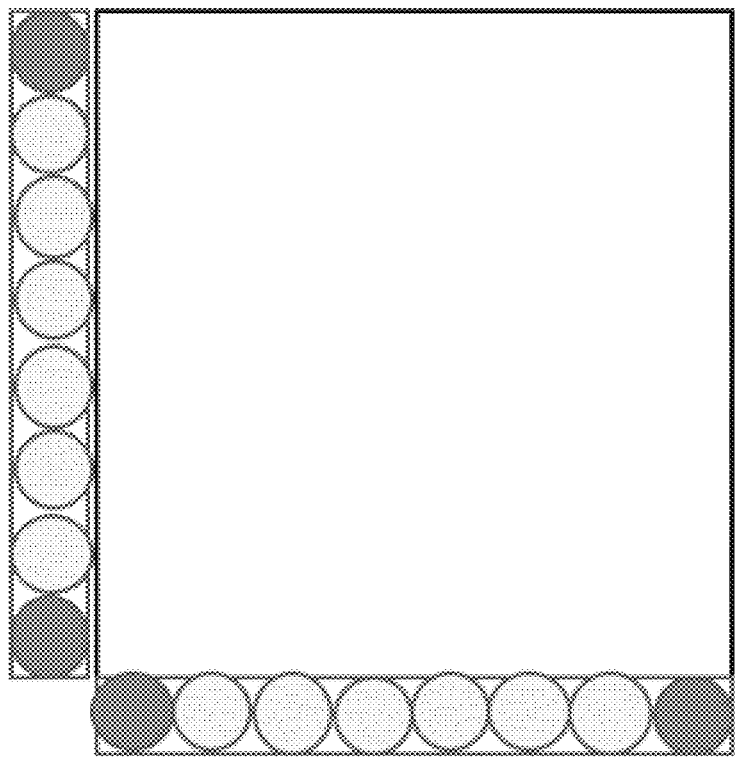
FIG. 14 shows examples of four neighboring samples, with both left and above reference samples available.

More specifically, if the above and the left neighboring reference samples are both available, four samples locating at [0, −1], [width−max(1, r), −1], [−1, 0], [−1, height−max(1, r)] are selected. When only above neighboring reference samples are available, four samples locating at [0, −1], [width/4, −1], [2width/4, −1], [3width/4, −1] are used. For the case that only left reference samples are accessible, [−1, 0], [−1, height/4], [−1, 2height/4], [-1, 3 height/4] are employed. FIG. 14 shows an example of the locations regarding to the four neighboring samples. The selected samples are painted in yellow.

Subsequently, the 4 samples are sorted according to luma sample intensity and classified into 2 groups. The two larger samples and two smaller samples are respectively averaged. Cross component prediction model is derived with the 2 averaged points. In one example, the similar way as described in 2.3.6.4 may be utilized to derive $\alpha$, $\beta$ and shift with the average of two larger selected sample values as (MaxLuma, MaxChroma) and the average of two smaller selected sample values as (MinLuma, MinChroma).

If only either the above block with current chroma block width to 2 or left block with current chroma block height to 2 is available, [0, −1] and [1, −1] of the above line, or [−1, 0], [−1, 1] of the left line are selected. A chroma prediction model is derived according to the luminance and chrominance values of selected 2 samples. In one example, the similar way as described in 2.3.6.4 may be utilized to derive $\alpha$, $\beta$ and shift.

If neither of the left and above blocks are available, a default prediction is used. with $\alpha$ equals 0, $\beta$ equals to 1<<(BitDepth−1), where BitDepth represents the bit-depth of chroma samples.

2.4.2 Two Step Derivation Process of Chroma Prediction Block

The temporary chroma prediction block is generated with Eq.21, where $P_C'(x, y)$ denotes a temporary prediction block.

α and β are model parameters. $R_L(x, y)$ is a reconstructed luma sample.

$$P'_c(x,y) = \alpha \times R_L(x,y) + \beta \quad (20)$$

Similar to normal intra prediction process, clipping operations are applied to $P'_c(x, y)$ to make sure it is within [0, 1<<(BitDepth−1)].

A six-tap filter (e.g., [1 2 1; 1 2 1]) is introduced for the down-sampled process for temporary chroma prediction block, as shown in Eq.4.

$$P_c = (2 \times P'_c(2x,2y) + 2 \times P'_c(2x,2y+1) + (2x-1,2y) + (2x+1, 2y) + P'_c(2x-1,2y+1) + P'_c(2x+1,2y-1) + \text{offset0}) >> 3 \quad (21)$$

In addition, for chroma samples located at the left most column, [1 1] downsampling filter if applied instead.

$$P_c = (P'_c(2x,2y) + (2x+1,2y) + \text{offset1}) >> 1$$

The two variables offset0 and offset1 are integer values. In some examples, the variables offset0 and offset1 may be set to 4, and 1, respectively. In some examples, offset0 and offset1 may be set to 0.

2.4.3 Additional TSCPM Modes

In addition to the TSCPM mode (denoted by TSCPM-LT) described in above-mentioned sub-sections, two additional TSCPM modes are further introduced, denoted as TSCPM-L and TSCPM-A wherein only left or above neighboring samples are utilized.

2.4.4 Syntax Design

Based on the AVS3 specification, a flag is used to signal whether the chroma intra-predication mode is TSCPM or not. This flag (as a $2^{nd}$ bin) is coded right after the indication of DM mode usage ($1^{st}$ bin). The detailed bin strings for each chroma mode is tabulated in the table below.

TABLE 2-4

Coding bins signaling with TSCPM of chroma intra modes in TAVS3.

| IntraChromaPredMode | Mode | Bin String | | | | |
|---|---|---|---|---|---|---|
| 0 | Intra_Chroma_DM (IntraLumaPredMode is unequal to 33) | 1 | | | | |
| 0 | Intra_Chroma_PCM (IntraLumaPredMode is equal to 33) | 1 | | | | |
| 1 | Intra_Chroma_DC | 0 | 0 | 1 | | |
| 2 | Intra_Chroma_Horizontal | 0 | 0 | 0 | 1 | |
| 3 | Intra_Chroma_Vertical | 0 | 0 | 0 | 0 | 1 |
| 4 | Intra_Chroma_Bilinear | 0 | 0 | 0 | 0 | 0 |
| 5 | Intra_Chroma_TSCPM (TSCPM-LT) | 0 | 1 | 1 | | |
| 6 | TSCPM-L | 0 | 1 | 0 | 1 | |
| 7 | TSCPM-T | 0 | 1 | 0 | 0 | |
| | Bin index | 0 | 1 | 2 | 3 | 4 |

3 Problems

The design of cross-component prediction methods, including CCLM, TSCPM utilizes the luma information to predict a chroma color component (e.g., Cb or Cr). It is noticed that for a second chroma color component (e.g., Cr) to be coded, the other two-color components (e.g., luma and Cb) are already available. How to utilize those information needs to be further studied.

Technical Solution(s)

To solve the above-mentioned problem, a method of Prediction from Multiple Cross-components (PMC) is proposed. In PMC, the prediction signal of a first color component C0 may be derived using the reconstructed representative samples of corresponding blocks of a second and/or third color components, denoted by C1 and C2. In yet another example, the prediction signal of C0 may further depends on the neighboring (e.g., adjacent or non-adjacent) samples of reconstructed samples of C1 and C2. In yet another example, the prediction signal of C0 may further depends on the neighboring (e.g., adjacent or non-adjacent) samples of reconstructed samples of C0.

The detailed techniques below should be considered as examples to explain general concepts. These techniques should not be interpreted in a narrow way. Furthermore, these techniques can be combined in any manner.

In the following descriptions, the term 'cross-component prediction (CCP)' may represent any variance of coding methods that derive the reconstruction/prediction signal of a first color component using the information of a second color component.

Figure 15A:
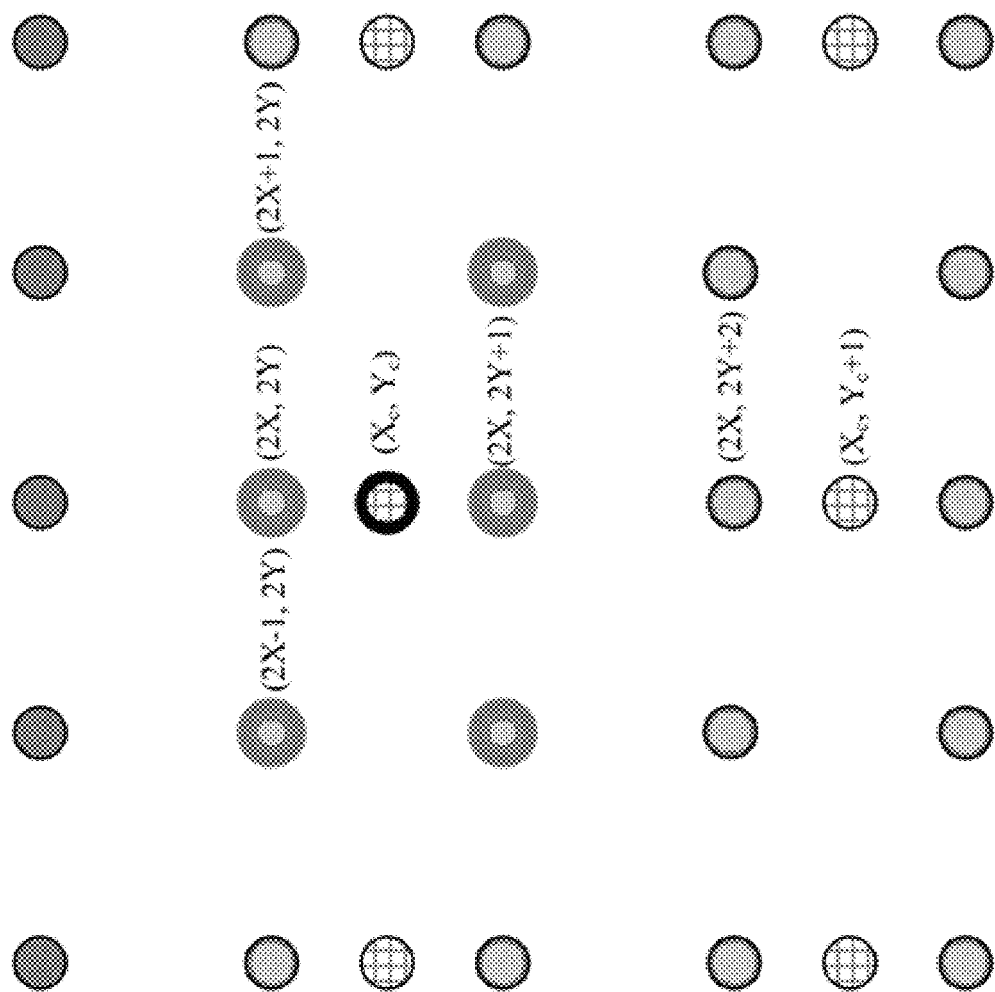
FIG. 15A shows 6 representative color component C1 samples (dark gray) used to predict ($X_c$, $Y_c$).
Figure 15B:
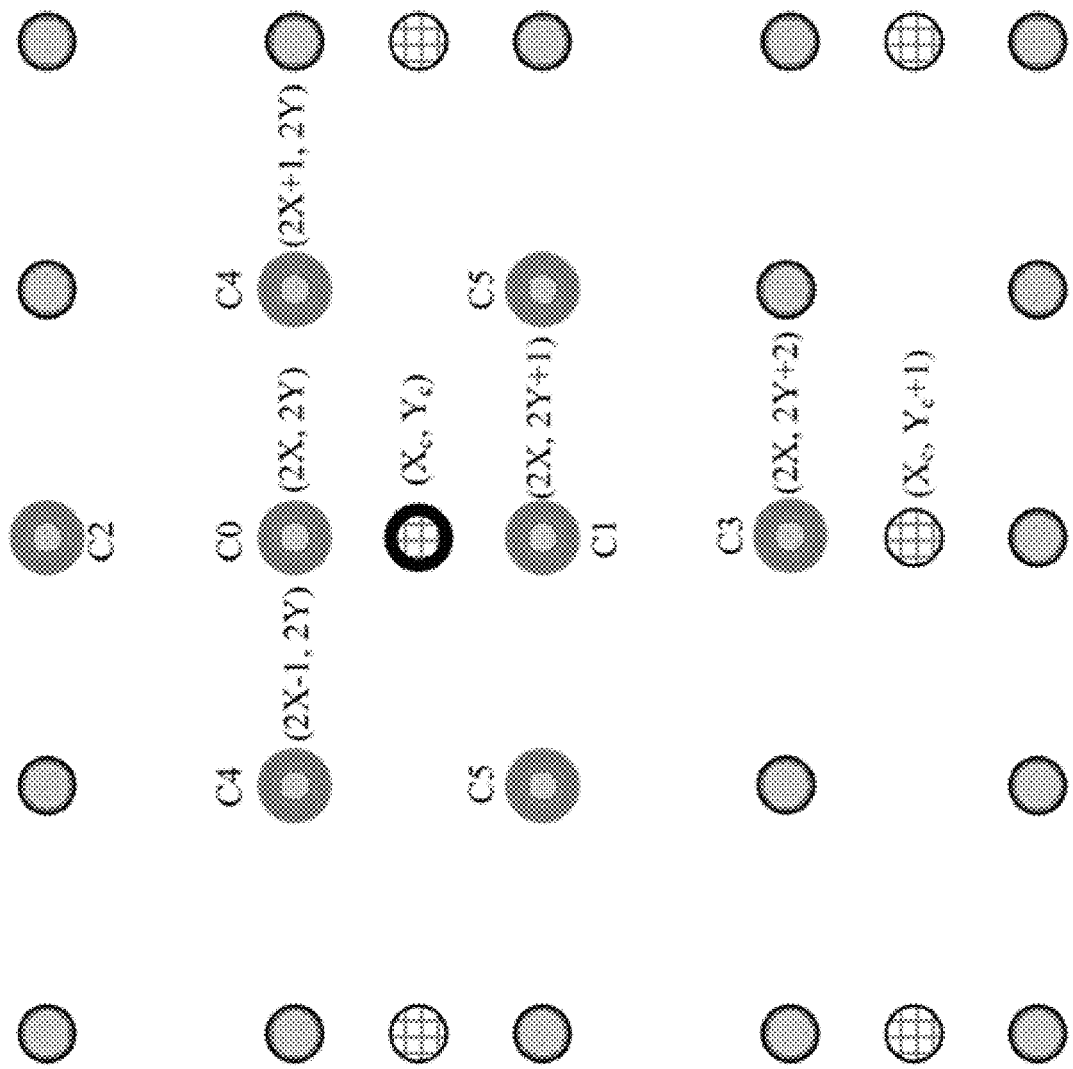
FIG. 15B shows 8 representative color component C1 samples (dark gray) used to predict ($X_c$, $Y_c$).

1. The coding/decoding process of a PMC coded C0 block (e.g., prediction signal derivation process) may depend on reconstructed and/or prediction samples of representative samples with C1 and/or C2 color components corresponding to the current C0 samples.
    a. In one example, linear function may be applied to the presentative samples with C1 and/or C2 color components and/or current C0 block's neighboring samples (including adjacent or non-adjacent).
    b. In one example, non-linear function may be applied to the presentative samples with C1 and/or C2 color components and/or current C0 block's neighboring samples (including adjacent or non-adjacent).
    c. In one example, the final predictor of one sample in the C0 block, denoted by $FPred_{c0}$ is derived by using the following equation:

$$FPred_{c0} = X \times TPred_{c0} + Y \times (Rec_{c2} - FPred_{c2}) + Z \quad (4\text{-}1)$$

wherein $TPred_{c0}$ represents a temporary prediction value of the sample using existing prediction modes (e.g., intra/inter/IBC prediction modes), $Rec_{c2}$ and $FPred_{c2}$ represent the reconstruction and final prediction values of representative C2 samples.

d. In one example, the final predictor of one sample in the C0 block, denoted by $FPred_{c0}$ is derived using the following equation:

$$FPred_{c0} = X \times (\alpha_{c0} * Rec_{c1} + \beta_{c0}) + Y \times (Rec_{c2} - (\alpha_{c2} * Rec_{c1} + \beta_{c2})) + Z \quad (4\text{-}2)$$

wherein $Rec_{c1}$ and $Rec_{c2}$ represent the reconstruction values of representative C1 and C2 samples, respectively.

e. In one example, the final predictor of one sample in the C0 block, denoted by $FPred_{c0}$ is derived by using the following equation:

$$FPred_{c0} = X \times (\alpha_{c0} - Y \times \alpha_{c2}) * Rec_{c1} + (X \times \beta_{c0} - Y \times \beta_{c2}) + Y \times Rec_{c2} + z \quad (4\text{-}3)$$

f. In one example, for a current C0 block with size equal to K'×L', two temporary blocks (with size equal to K×L) for C0 and C2 may be firstly derived, according to linear model parameters ($X \times \alpha_{c0}$, $X \times \beta_{c0}$) and ($Y \times \alpha_{c2}$, $Y \times \beta_{c2}$), and corresponding C1 block with size equal to K×L, respectively. The temporary blocks may be further downsampled to K'×L' with/without clipping.
  i. In one example, the two temporary blocks are derived using the linear model parameters applied to the corresponding C1 block, similar to CCLM/TSCPM process.
g. In one example, for a current C0 block with size equal to K'×L', one temporary blocks (with size equal to K×L) may be derived, according to (X×$\alpha_{c0}$−Y×$\alpha_{c2}$, X×$\beta_{c0}$−Y×$\beta_{c2}$) and corresponding C1 block with size equal to K×L. The temporary block may be further downsampled to K'×L' with/without clipping.
  i. Alternatively, furthermore, the final prediction may be generated by adding the collocated sample in the temporary block with/without being downsampled to Y×$Rec_{c2}$, or/subtracting the collocated sample in the temporary block with/without being downsampled from the Y×$Rec_{c2}$
h. In one example, for a current C0 block with size equal to K'×L', a temporary C1 block may be firstly derived, e.g., using downsampling filter, from C1 block with size equal to K×L. Linear model parameters (X×$\alpha_{c0}$, X×$\beta_{c0}$) and (Y×$\alpha_{c2}$, Y×$\beta_{c2}$), may be applied to the temporary C1 block, followed by adding the collocated sample in the temporary block after linear model parameters being applied, to the Y×$Rec_{c2}$, or followed by subtracting the collocated sample in the temporary block after linear model parameters being applied, from the Y×$Rec_{c2}$
i. In above examples, the variables X, Y are two variables which may represent the weighting factors and Z is an offset value; $\alpha_{c0}$, $\alpha_{c2}$ are two variables applied to representative C1 samples; $\beta_{c0}$ and $\beta_{c2}$ are offset values.
  i. In one example, X or Y or Z is equal to 1.
  ii. In one example, X or Y or Z is equal to 0.
  iii. In one example, X is equal to 1, Y is equal to −1 and Z is equal to 0.
  iv. In one example, X or Y or Z is equal to $2^K$ or $-2^K$, wherein K is an integer value, such as a value being in the range of [−M, N] wherein M and N are no smaller than 0.
  v. The variables used in above equations may be pre-defined or signaled in the bitstream.
    1) Alternatively, the variables used in above equations may be derived on-the-fly.
  vi. One or multiple of the variables used in above equations may be same for all samples within one video unit (e.g., coding block/prediction block/transform block).
    1) Alternatively, multiple sets of variables used in above equations may be derived or signaled.
    2) Alternatively, a first sample in the video unit may select a first set of variable values; and a second sample in the video unit may select a second set of variable values wherein at least one variable value is different in the first and second sets.
j. In above examples, Ci (i being 0 to 2) may be defined as follows:
  i. In one example, C0 is Cb; C1 is Y and C2 is Cr color component.
  ii. In one example, C0 is Cr; C1 is Y and C2 is Cb color component.
  iii. In one example, C0 is the luma color components (Y in YCbCr format; G in RGB format), C1 and C2 are the remaining two-color components.
  k. In one example, a representative sample may be obtained by down-sampling.
  l. In above examples, $Rec_{c2}$ may be the corresponding C2 sample.
  m. In above examples, the final prediction values may be further clipped to a specific range.
2. How to select and/or how many representative samples of C1 and/or C2 to be used for predicting one C0 sample may be determined on-the-fly.
  a. In one example, how to select the representative samples of C1 and/or C2 may be based on the position of the current C0 sample and/or color format.
    i. Taking 4:2:0 color format for example, the representative C1/C2 samples may be those surrounding the C1/C2 samples corresponding to the sample.
      a) assume a chroma sample to be predicted is located at ($X_c$, $Y_c$) which may be equal to (X, Y), the L representative luma reconstruction samples may be defined as:
        1) For example, two representative luma reconstruction samples are defined as the samples located at (2X, 2Y), (2X, 2Y+1).
        2) For example, two representative luma reconstruction samples are defined as the samples: (2X, 2Y), (2X+1, 2Y).
        3) For example, six representative luma reconstruction samples are depicted in FIG. 15A. FIGS. 15A-B show examples of selection of representative C1 samples in PMC.
        4) For example, eight representative luma reconstruction samples are depicted in FIG. 15B.
    ii. In one example, the representative C2 sample may be with the same coordinator as the current C0 sample.
  b. In one example, the representative samples may be defined as those reconstructed samples before in-loop filtering methods (e.g., deblocking filter/SAO/ALF/CCALF) are applied.
  c. In one example, the representative samples may be defined as a function of multiple reconstructed samples before in-loop filtering methods (e.g., deblocking filter/SAO/ALF/CCALF) are applied.
    i. In one example, the function may be defined as a downsample filtering process.
    ii. In one example, the function may be defined as linear function (e.g., weighted average) or non-linear function.
3. Linear model parameters may be applied to representative C1 samples.
  a. In one example, ($\alpha_{c0}$, $\beta_{c0}$) are linear model parameters derived for the current sample/current block.
    i. In one example, they may be derived using the neighboring samples of current block C0 and neighboring samples of C1 block.
  b. In one example, ($\alpha_{c2}$, $\beta_{c2}$) are linear model parameters derived for the representative C2 samples/the C2 block covering the representative C2 samples.
    i. In one example, they may be derived using the neighboring samples of C2 block and neighboring samples of C1 block.
  c. The linear model parameters may be derived in the same way as that used in VVC/JEM, or those used in TSCPM, or as described in PCT/CN2018/114158, PCT/CN2018/118799, PCT/CN2018/119709, PCT/

CN2018/125412, PCT/CN2019/070002, PCT/CN2019/075874, PCT/CN2019/075993, PCT/CN2019/076195, PCT/CN2019/079396, PCT/CN2019/079431, PCT/CN2019/079769, which are incorporated by reference herein in its entirety for all purposes,.
  i. Alternatively, linear model parameters may be derived from the neighboring reconstructed C1 samples without downsampling.
  ii. Alternatively, linear model parameters may be derived from the neighboring reconstructed C0/C2 samples with up sampling.
  iii. Alternatively, furthermore, the linear model parameters may be firstly clipped to a range before being used either in CCP (TSCPM or CCLM) mode.
4. Multiple PMC modes may be allowed with different variable values/different linear model parameter derivation methods and/or different downsampling/up sampling methods and/or different locations of reconstructed/downsampled reconstructed neighboring samples for linear model derivation.
  a. In one example, one mode is defined that may only utilize neighboring samples from above row and/or right above row.
  b. In one example, one mode is defined that may only utilize neighboring samples from left column and/or left below column.
  c. In one example, one mode is defined that multiple linear models (e.g., multiple sets of linear models) may be derived and applied to one block
    i. In one example, the current luma reconstruction blocks and/or neighboring reconstructed samples may be split to M (M>1) categories. Different category may utilize different linear model.
  d. In one example, one mode is defined that the downsampling filter is defined to be sub sampling filter. Assume a chroma sample to be predicted is located at (x, y), the L representative luma reconstruction samples are defined as the samples located at (2*x−1, 2*y), (2*x−1, 2*y+1), (2*x, 2*y), (2*x, 2*y+1), (2*x+1, 2*y) and (2*x+1, 2*y+1).
    i. In one example, K samples nearest the position (a, b) may be used. The variable (a, b) may depend on the color format. In one example, a=2*x and b=2*y for 4:2:0 color format.
    ii. In one example, the prediction sample of the chroma block may only depend on K of the L representative luma reconstruction samples (K is an integer value).
    iii. In one example, the prediction sample of the chroma block may only depend on sample located at (2*x, 2*y).
    iv. In one example, the prediction sample of the chroma block may only depend on sample located at (2*x+1, 2*y).
    v. In one example, the prediction sample of the chroma block may only depend on sample located at (2*x+1, 2*y+1).
    vi. In one example, the prediction sample of the chroma block may only depend on sample located at (2*x, 2*y+1).
    vii. In one example, the prediction sample of the chroma block may only depend on samples located at (2*x, 2*y) and (2*x, 2*y+1).

5. When PMC is enabled for a video unit of C0 color component (e.g., for a Cr block), the residual information of the video unit may be further signaled.
  a. Alternatively, signaling of the residual information of the video unit may be omitted, e.g., only zero coefficients are available.
  b. Alternatively, a flag (e.g., coded block flag (CBF) for the C0 color component) may be still signaled to indicate whether there are non-zero coefficients in the video unit.
    i. Alternatively, the CBF for the C0 color component is not signaled, and, in an example, inferred to be equal to 1.
  c. Alternatively, furthermore, signaling of the flag (e.g., coded block flag (CBF) for the C2 color component) to indicate whether there are non-zero coefficients in corresponding C2 block may be always skipped.
    i. Alternatively, furthermore, the CBF for the C2 color component is inferred to be equal to 1.
    ii. Alternatively, furthermore, whether to and/or how to signal the CBF for the C2 block may depend on the usage of PMC and/or which PMC mode.
    iii. Alternatively, furthermore, whether to and/or how to signal the CBF for the C0 block may depend on the usage of PMC and/or which PMC mode.
  d. Alternatively, furthermore, signaling of the flag (e.g., coded block flag (CBF) for the C1 color component) to indicate whether there are non-zero coefficients in corresponding C1 block may be always skipped.
    i. Alternatively, furthermore, the CBF for the C1 color component is inferred to be equal to 1.
    ii. Alternatively, furthermore, whether to and/or how to signal the CBF for the C1 block may depend on the usage of PMC and/or which PMC mode.
    iii. Alternatively, furthermore, whether to and/or how to signal the CBF for the C0 block may depend on the usage of PMC and/or which PMC mode.

Signaling Related to PMC

6. PMC modes may be treated as some additional prediction modes.
  a. Whether to signal an indication of PMC mode may depend on the coding mode of the current block.
    i. In one example, the indication is signaled only when the current block is coded with one or multiple specific modes.
  b. Whether to signal an indication of PMC mode may depend on the color format.
    i. For example, the indication is not signaled if the color format is 4:0:0.
  c. In one example, the bin/flag indicating the utilization of PMC mode of $C_0$ may be signaled/parsed according to the CBF flag and/or prediction mode of $C_1$ and/or $C_2$.
    i. In one example, the PMC mode may be signaled when the CBF flag of $C_1$ and/or $C_2$ is 1 or 0, and/or the prediction mode of $C_1$ and/or $C_2$ is one of CCP (e.g., TSCPM/CCLM) modes.
    ii. In one example, the PMC mode may be inferred to be 0, if the CBF flag of $C_1$ and/or $C_2$ is 0 and/or the prediction mode of $C_1$ and/or $C_2$ is not one of CCP (e.g., TSCPM/CCLM) modes.
  d. In one example, indication of enabling one of multiple PMC modes may be firstly signaled/parsed in addition to the existing intra prediction modes.

i. Alternatively, furthermore, when one of multiple PMC modes is enabled for a block, an index to the multiple PMC modes may be further signaled.
ii. In one example, a first bin may be coded to indicate the usage of DM mode, followed by a $2^{nd}$ bin coded to indicate the usage of CCP (e.g., TSCPM/CCLM) and a $3^{rd}$ bin coded to indicate the usage of PMC mode.
   a) Alternatively, the $2^{nd}$ bin is coded to indicate the usage of PMC and the $3^{rd}$ bin is coded to indicate the usage of CCP (e.g., TSCPM/CCLM) modes.
   b) Alternatively, a first bin may be coded to indicate the usage of PMC mode, followed by a bin coded to indicate the usage of DM and/or CCP (e.g., TSCPM/CCLM) modes.
e. In one example, PMC modes may be treated as additional variances of cross-component prediction methods, such as being part of a set of CCP (e.g., CCLM/TSCPM) modes.
   i. Alternatively, furthermore, whether to signal/parse the PMC modes may depend on the usage of CCP modes.
      a) In one example, if the CCP mode is enabled (e.g., cclm_mode_flag in VVC, $2^{nd}$ bin of chroma intra prediction mode in AVS3) for a block, an index may be further signaled to indicate which of the multiple CCP mode is applied to the block.
         1) Alternatively, furthermore, for those available CCP methods, it may be further classified to multiple categories, such as TSCPM/CCLM/PMC. Indications of the category index may be further signaled.
            [1] In one example, the indication of the category index may be firstly coded, followed by an index relative to the category if needed.
            [2] In one example, the indication of the category index may be coded after an index relative to the category, if needed.
            [3] In one example, same or different contexts may be utilized to code a first index relative to a first category (e.g., indication of TSCPM) and a second index relative to a second category.
f. In one example, the order of signaling DM/CCP/PMC mode (e.g., DM before or after PMC) may depend on the coded mode information of a spatial block.
   i. In one example, if the neighboring block is coded with PMC mode, the indication of PMC mode may be signaled before the indication of other CCP/DM modes.
   ii. Alternatively, if the neighboring block is coded with DM mode, the indication of DM mode may be signaled before the indication of CCP modes.
   iii. Alternatively, if the neighboring block is coded with non-PMC mode (e.g, DM mode or other chroma intra prediction mode unequal to PMC), the indication of DM mode may be signaled before the indication of PMC mode.
g. Alternatively, a PMC mode is treated as a new intra prediction modes in addition to existing ones.
   i. In one example, different PMC modes may be assigned with different mode indices and coded with binary bin strings.
h. In one example, indications of (e.g., a flag/bin) the usage of PMC mode may be bypass coded, e.g., without any context.
   i. Alternatively, indications of (e.g., a flag/bin) the usage of PMC mode may be context coded, e.g., with one or multiple context.
      a) In one example, the context may be derived using neighboring blocks' mode information (e.g., equal to PMC or equal to CCP) and/or availability of neighboring blocks.
      b) In one example, the context may be derived according to the block dimension (e.g., width and/or height) of current block.
i. In one example, three PMC modes are enabled for processing a video unit (e.g., video/picture/slice/brick/tile/subpicture), the following coding methods of indications of usage of one mode may be utilized. Denote the three PCM modes by PMC_Mode0, PMC_Mode1, PMC_Mode2, wherein PMC_Mode0 indicates the PMC mode using both left and above neighboring samples to derive linear model parameters; PMC_Mode1 and PMC_Mode2 indicate the PMC mode using only left and only above neighboring samples to derive linear model parameters, respectively.
   i. Some examples are tabulated in Table 4-1, Table 4-2, Table 4-3, Table 4-4, Table 4-5, Table 4-6, Table 4-7 to describe the corresponding bin strings for different chroma intra prediction modes. Differences compared to the design before introducing PMC are highlighted in bold italicized text. It is noted that the TSCPM tabulated in those tables may be replaced by other CCP methods, the bin orders/mode indices may be also switched.

Related to Signaling of Variances of Cross-Component Prediction (CCP) Methods

7. Whether to signal/parse the indications of a CCP method (e.g., LM-T, LM-L, TSCPM-T, TSCPM-L, PMC-T, PMC-L) may depend on the availability of neighboring samples (e.g., adjacent or non-adjacent).
   a. In one example, if the above neighboring samples are unavailable, the indications of a CCP method (e.g., LM-T, TSCPM-T, PMC-T,) that relies on above neighboring samples may not be signaled.
   b. In one example, if the left neighboring samples are unavailable, the indications of a CCP method (e.g., LM-L, TSCPM-L, PMC-L) that relies on left neighboring samples may not be signaled.
   c. In one example, if both left and above neighboring samples are unavailable, the indications of a CCP method (e.g., LM-T, LM-L, TSCPM-T, TSCPM-L, PMC-T, PMC-L, LM-LT, TSCPM-LT, PMC-LT, other variances of CCLM/TSCPM/PMC) that relies on neighboring samples may not be signaled.
   d. In one example, if neighboring samples located at only one side (either left or above the current block) are available, the indications of a CCP method (e.g., LM-LT, TSCPM-LT, PMC-LT) that relies on neighboring samples of both sides may not be signaled.
   e. In one example, if either left or above neighboring samples are unavailable, the indications of a CCP method (e.g., LM-T, LM-L, TSCPM-T, TSCPM-L, PMC-T, PMC-L, CCLM, TSCPM, PMC) that relies on neighboring samples may not be signaled.

f. Alternatively, furthermore, when the indication is not signaled, the coding method is inferred to be disabled.
8. Indications of whether and/or how to use above mentioned methods may be signaled in a video processing unit (e.g., sequence/video/picture/slice/tile/brick/sub-picture/CTU row/CTU/VPDU/CU/PU/TU/sub-blocks in a CU/PU).
   a. Alternatively, furthermore, the indications of whether and/or how to use above mentioned methods may be signaled SPS/VPS/PPS/picture header/slice header/tile group header/group of CTUs/CTU/other kinds of video data units.
9. Whether and/or how to use the above-mentioned methods may depend on the decoded information, such as block dimension, position of a block relative to a video processing unit (e.g., relative to a slice), slice/picture type, partitioning types (e.g., dual tree or single tree), etc. al.
   a. In one example, for blocks (e.g., chroma blocks) with number of samples larger than (or equal to) M (e.g., M=4096, 1024), such methods are disallowed.
   b. In one example, for blocks (e.g., chroma blocks) with number of samples smaller than (or equal to) M (e.g., M=4, 8, 16), such methods are disallowed.
   c. In one example, for blocks (e.g., chroma blocks) with width and/or height larger than (or equal to) M (e.g., M=64, 32), such methods are disallowed.
   d. In one example, for blocks (e.g., chroma blocks) with width and/or height smaller than (or equal to) M (e.g., M=2, 4), such methods are disallowed.
   e. When the above method is disallowed, indications of usage of such methods may be skipped.
   f. Alternatively, a confirming bitstream follows the rule that such methods be disabled when certain conditions (e.g., depending on block dimension) are satisfied.

In above example, a neighbor is unavailable if it is out of the current picture/slice/tile/patch/brick/subpicture/other video processing unit which includes the current sample. Hereby the term "cross-component prediction (CCP)" may refer to any cross-component prediction, such as TSCPM, CCLM and PMC.

10. If the CCP mode is disabled (e.g tscpm_enable_flag=0), the syntax element (e.g. enhance_tscpm_enable_flag) indicating the enabling of Enhanced-TSCPM or enhanced CCLM (e.g. TSCPM_L, TSCPM_T, LM_T, LM_L) shall be implicitly inferred to be 0 without signaling/parsing.
11. If Enhanced CCP (e.g. Enhanced-TSCPM mode or enhanced CCLM) is disabled (e.g enhance_tscpm_enable_flag=0), the following may apply:
   a. The flag/bin (index 2 in Table 5-1) indicating the type of TSCPM (e.g. TSCPM_LT or Enhanced-TSCPM) shall be removed.
   b. The flag/bin (index 3 in Table 5-1) for distinguishing TSCPM-L and TSCPM-T shall also be excluded.
12. If Intra Block Copy (IBC) mode is disabled (ibc_enable_flag=0), the flag/bin to indicate Adaptive BV Resolution (ABVR) (abvr_enable_flag) shall be implicitly inferred to be 0 without signaling/parsing.
13. In case that the left and/or above neighboring reference samples are not available, the linear model parameters $\alpha$ and $\beta$ of enhanced CCP (e.g. TSCPM_L, TSCPM_T/PMC_L, PMC_T/LM_L, LM_T) may be set with default values.
   c. The default values of $\alpha$ may be 0.
   d. The default value of $\beta$ may be 0.
   e. The default value of $\beta$ may be $1<<(bitDepth-1)$, wherein bitDepth is the bit depth of samples (corresponding to luma or chroma samples).
   f. In one example, if above neighboring reference samples are not available, the linear model parameters $\alpha$ and $\beta$ of enhanced CCP using the above neighboring samples (e.g. TSCPM_T, PMC_T, LM_T) may be set with default values.
   g. In one example, if left neighboring reference samples are not available, the linear model parameters $\alpha$ and $\beta$ of enhanced CCP using the left neighboring samples (e.g. TSCPM_T, PMC_T, LM_T) may be set with default values.
14. In case that the left and/or above neighboring reference samples are not available, the linear model parameters $\alpha$ and $\beta$ of enhanced CCP (e.g. TSCPM_L, TSCPM_T/PMC_L, PMC_T/LM_L, LM_T) may be derived with padding neighboring reference samples.
   h. In one example, if above neighboring reference samples are not available, the linear model parameters $\alpha$ and $\beta$ of enhanced CCP using the above neighboring samples (e.g. TSCPM_T, PMC_T, LM_T) may be derived with padding above neighboring reference samples.
   i. In one example, if left neighboring reference samples are not available, the linear model parameters $\alpha$ and $\beta$ of enhanced CCP using the left neighboring samples (e.g. TSCPM_T, PMC_T, LM_T) may be derived with padding left neighboring reference samples.
15. In case that the left and/or above neighboring reference samples are not available, at least one of the enhanced CCP mode (e.g. TSCPM_L, TSCPM_T/PMC_L, PMC_T/LM_L, LM_T) may be excluded in a conformance bit-stream.
   j. In one example, if above neighboring reference samples are not available, the enhanced CCP mode only using the above neighboring samples (e.g. TSCPM_T, PMC_T, LM_T) shall not be applied in a conformance bit-stream.
   k. In one example, if left neighboring reference samples are not available, the enhanced CCP mode only using the left neighboring samples (e.g. TSCPM_T, PMC_T, LM_T) shall not be applied in a conformance bit-stream.

TABLE 4-1

Bin strings of each chroma intra prediction mode (PMC is treated as one of TSCPM mode, and one bin (e.g., $4^{th}$ bin) is further signaled to indicate it is belonging to TSCPM or PMC).

| IntraChromaPredMode | Mode | Bin String |
|---|---|---|
| 0 | Intra_Chroma_DM (IntraLumaPredMode is unequal to 33) | 1 |

TABLE 4-1-continued

Bin strings of each chroma intra prediction mode (PMC is treated as one of TSCPM mode, and one bin (e.g., 4$^{th}$ bin) is further signaled to indicate it is belonging to TSCPM or PMC).

| IntraChromaPredMode | Mode | Bin String | | | | |
|---|---|---|---|---|---|---|
| 0 | Intra_Chroma_PCM (IntraLumaPredMode is equal to 33) | 1 | | | | |
| 1 | Intra_Chroma_DC | 0 | 0 | 1 | | |
| 2 | Intra_Chroma_Horizontal | 0 | 0 | 0 | 1 | |
| 3 | Intra_Chroma_Vertical | 0 | 0 | 0 | 0 | 1 |
| 4 | Intra_Chroma_Bilinear | 0 | 0 | 0 | 0 | 0 |
| 5 | Intra_Chroma_TSCPM (TSCPM-LT) | 0 | 1 | 1 | | *0* |
| 6 | TSCPM-L | 0 | 1 | 0 | 1 | *0* |
| 7 | TSCPM-T | 0 | 1 | 0 | 0 | *0* |
| 8 | PMC Mode 0 (e.g., PMC-LT) | *0* | *1* | *1* | | *1* |
| 9 | PMC Mode 1 (e.g., PMC-L) | *0* | *1* | *0* | *1* | *1* |
| 10 | PMC Mode 2 (e.g., PMC-T) | *0* | *1* | *0* | *0* | *1* |
| Bin index | | 0 | 1 | 2 | 3 | 4 |

TABLE 4-2

Bin strings of each chroma intra prediction mode (PMC is treated as one of TSCPM mode, and one bin (e.g., 4$^{th}$ bin) is further signaled to indicate it is belonging to TSCPM or PMC).

| IntraChromaPredMode | Mode | Bin String | | | | |
|---|---|---|---|---|---|---|
| 0 | Intra_Chroma_DM (IntraLumaPredMode is unequal to 33) | 1 | | | | |
| 0 | Intra_Chroma_PCM (IntraLumaPredMode is equal to 33) | 1 | | | | |
| 1 | Intra_Chroma_DC | 0 | 0 | 1 | | |
| 2 | Intra_Chroma_Horizontal | 0 | 0 | 0 | 1 | |
| 3 | Intra_Chroma_Vertical | 0 | 0 | 0 | 0 | 1 |
| 4 | Intra_Chroma_Bilinear | 0 | 0 | 0 | 0 | 0 |
| 5 | Intra_Chroma_TSCPM (TSCPM-LT) | 0 | 1 | 1 | | *1* |
| 6 | TSCPM-L | 0 | 1 | 0 | 1 | |
| 7 | TSCPM-T | 0 | 1 | 0 | 0 | |
| 8 | PMC Mode 0 (e.g., PMC-LT) | *0* | *1* | *1* | | *0* |
| 9 | PMC Mode 1 (e.g., PMC-L) | *0* | *1* | *0* | *1* | *0* |
| 10 | PMC Mode 2 (e.g., PMC-T) | *0* | *1* | *0* | *0* | *0* |
| Bin index | | 0 | 1 | 2 | 3 | 4 |

TABLE 4-3

Bin strings of each chroma intra prediction mode (PMC is treated as a new category (indicated by the 1$^{st}$ bin), before the indication of TSCPM represented by the 2$^{nd}$ bin).

| IntraChromaPredMode | Mode | Bin String | | | | |
|---|---|---|---|---|---|---|
| 0 | Intra_Chroma_DM (IntraLumaPredMode is unequal to 33) | 1 | | | | |
| 0 | Intra_Chroma_PCM (IntraLumaPredMode is equal to 33) | 1 | | | | |
| 1 | Intra_Chroma_DC | 0 | 0 | 1 | | |
| 2 | Intra_Chroma_Horizontal | 0 | 0 | 0 | 1 | |
| 3 | Intra_Chroma_Vertical | 0 | 0 | 0 | 0 | 1 |
| 4 | Intra_Chroma_Bilinear | 0 | 0 | 0 | 0 | 0 |
| 5 | Intra_Chroma_TSCPM (TSCPM-LT) | 0 | *0* | 1 | 1 | |
| 6 | TSCPM-L | 0 | *0* | 1 | 0 | 1 |
| 7 | TSCPM-T | 0 | *0* | 1 | 0 | 0 |
| 8 | PMC Mode 0 (e.g., PMC-LT) | *0* | *1* | *1* | *1* | |
| 9 | PMC Mode 1 (e.g., PMC-L) | *0* | *1* | *1* | *0* | *1* |
| 10 | PMC Mode 2 (e.g., PMC-T) | *0* | *1* | *1* | *0* | *0* |
| Bin index | | 0 | 1 | 2 | 3 | 4 |

TABLE 4-4

Bin strings of each chroma intra prediction mode (PMC is treated as a new category (indicated by the $0^{th}$ bin)).

| IntraChromaPredMode | Mode | Bin String |
|---|---|---|
| 0 | Intra_Chroma_DM (IntraLumaPredMode is unequal to 33) | *0* 1 |
| 0 | Intra_Chroma_PCM (IntraLumaPredMode is equal to 33) | *0* 1 |
| 1 | Intra_Chroma_DC | *0* 0 0 1 |
| 2 | Intra_Chroma_Horizontal | *0* 0 0 0 1 |
| 3 | Intra_Chroma_Vertical | *0* 0 0 0 0 1 |
| 4 | Intra_Chroma_Bilinear | *0* 0 0 0 0 0 |
| 5 | Intra_Chroma_TSCPM (TSCPM-LT) | *0* 0 1 1 |
| 6 | TSCPM-L | *0* 0 1 0 1 |
| 7 | TSCPM-T | *0* 0 1 0 0 |
| 8 | PMC Mode 0 (e.g., PMC-LT) | *1* 1 |
| 9 | PMC Mode 1 (e.g., PMC-L) | *1* 0 1 |
| 10 | PMC Mode 2 (e.g., PMC-T) | *1* 0 0 |
| | Bin index | 0 1 2 3 4 5 |

TABLE 4-5

Bin strings of each chroma intra prediction mode (indication of PMC modes is signaled after TSCPM modes, denoted by the $2^{nd}$ bin).

| IntraChromaPredMode | Mode | Bin String |
|---|---|---|
| 0 | Intra_Chroma_DM (IntraLumaPredMode is unequal to 33) | 1 |
| 0 | Intra_Chroma_PCM (IntraLumaPredMode is equal to 33) | 1 |
| 1 | Intra_Chroma_DC | 0 0 *0* 1 |
| 2 | Intra_Chroma_Horizontal | 0 0 *0* 0 1 |
| 3 | Intra_Chroma_Vertical | 0 0 *0* 0 0 1 |
| 4 | Intra_Chroma_Bilinear | 0 0 *0* 0 0 0 |
| 5 | Intra_Chroma_TSCPM (TSCPM-LT) | 0 1 1 |
| 6 | TSCPM-L | 0 1 0 1 |
| 7 | TSCPM-T | 0 1 0 0 |
| 8 | PMC Mode 0 (e.g., PMC-LT) | *0 0 1 1* |
| 9 | PMC Mode 1 (e.g., PMC-L) | *0 0 1 0 1* |
| 10 | PMC Mode 2 (e.g., PMC-T) | *0 0 1 0 0* |
| | Bin index | 0 1 2 3 4 5 |

TABLE 4-6

Bin strings of each chroma intra prediction mode (each of the PMC mode is treated as a new chroma intra prediction mode. All of PMC modes are added after existing modes).

| IntraChromaPredMode | Mode | Bin String |
|---|---|---|
| 0 | Intra_Chroma_DM (IntraLumaPredMode is unequal to 33) | 1 |
| 0 | Intra_Chroma_PCM (IntraLumaPredMode is equal to 33) | 1 |
| 1 | Intra_Chroma_DC | 0 0 1 |
| 2 | Intra_Chroma_Horizontal | 0 0 0 1 |
| 3 | Intra_Chroma_Vertical | 0 0 0 0 1 |
| 4 | Intra_Chroma_Bilinear | 0 0 0 0 0 *1* |
| 5 | Intra_Chroma_TSCPM (TSCPM-LT) | 0 1 1 |
| 6 | TSCPM-L | 0 1 0 1 |
| 7 | TSCPM-T | 0 1 0 0 |
| 8 | PMC Mode 0 (e.g., PMC-LT) | *0 0 0 0 0 0 1* |
| 9 | PMC Mode 1 (e.g., PMC-L) | *0 0 0 0 0 0 0 1* |
| 10 | PMC Mode 2 (e.g., PMC-T) | *0 0 0 0 0 0 0 0* |
| | Bin index | 0 1 2 3 4 5 |

TABLE 4-7

Bin strings of each chroma intra prediction mode (mode index signaled after CBF flags).

| IntraChromaPredMode | Mode | Bin String | | | | |
|---|---|---|---|---|---|---|
| 0 | Intra_Chroma_DM (IntraLumaPredMode is unequal to 33) | 1 | | | | |
| 0 | Intra_Chroma_PCM (IntraLumaPredMode is equal to 33) | 1 | | | | |
| 1 | Intra_Chroma_DC | 0 | 0 | 1 | | |
| 2 | Intra_Chroma_Horizontal | 0 | 0 | 0 | 1 | |
| 3 | Intra_Chroma_Vertical | 0 | 0 | 0 | 0 | 1 |
| 4 | Intra_Chroma_Bilinear | 0 | 0 | 0 | 0 | 0 |
| 5 | Intra_Chroma_TSCPM (TSCPM-LT) (a bin may be coded to indicate Tscpm-LT after Cbf_Cb/Cbf_Cr flag) | 0 | *1* | *1* | | |
| 6 | TSCPM-L (a bin may be coded to indicate Tscpm-LT after Cbf_Cb/Cbf_Cr flag) | 0 | *1* | *0* | *1* | |
| 7 | TSCPM-T (a bin may be coded to indicate Tscpm-LT after Cbf_Cb/Cbf_Cr flag) | 0 | *1* | *0* | *0* | |
| 8 | PMC Mode 0 (e.g., PMC-LT) (a bin may be coded to indicate PMC-LT after Cbf_Cb/Cbf_Cr flag) | 0 | *1* | *1* | | |
| 9 | PMC Mode 1 (e.g., PMC-L) (a bin may be coded to indicate PMC-LT after Cbf_Cb/Cbf_Cr flag) | 0 | *1* | *0* | *1* | |
| 10 | PMC Mode 2 (e.g., PMC-T) (a bin may be coded to indicate PMC-LT after Cbf_Cb/Cbf_Cr flag) | 0 | *1* | *0* | *0* | |
| | Bin index | 0 | 1 | 2 | 3 | 4 |

5 Embodiments

Example of decoding process is illustrated as follows. Prediction from Multiple Cross-components (PMC) modes are proposed. The prediction of component C0 is derived by the reconstructed samples of other color components C1 and C2.

5.1 Embodiment #1

In this embodiment, C0 is the Cr color component, C1 is the luma color component and C2 is the Cb color component.

The prediction of Cr component is derived by the linear combination of the Y and Cb reconstructed samples. Three Multiple Cross-components (e.g., PMC_LT, PMC_L and PMC_T) modes are proposed. PMC modes are signaled with a flag after TSCPM, as illustrated in Table 5-1. Meanwhile, the indication of the explicit PMC mode indices (e.g., PMC_LT, PMC_L and PMC_T) aligns to the representation of TSCPM mode indices (e.g., TSCPM LT, TSCPM_L and TSCPM_T). Moreover, the coded block flag (cbf) of Cb block is inferred to be 1, if the corresponding Cb/Cr block is coded with PMC mode. For the case that the left and/or above neighboring reference samples are not available, only TSCPM_LT/PMC_LT is employed. In such scenario, bin2 and bin3, which indicate the utilization and indices of enhanced TSCPM/PMC (e.g., TSCPM_L, TSCPM_T/PMC_L, PMC_T), can be removed.

TABLE 5-1

Bin strings of each chroma intra prediction mode (PMC is treated as one of TSCPM mode, and one bin (e.g., 4th bin) is further signaled to indicate it is belonging to TSCPM or PMC).

| IntraChromaPredMode | Mode | Bin String | | | | |
|---|---|---|---|---|---|---|
| 0 | Intra_Chroma_DM (IntraLumaPredMode is unequal to 33) | 1 | | | | |
| 0 | Intra_Chroma_PCM (IntraLumaPredMode is equal to 33) | 1 | | | | |
| 1 | Intra_Chroma_DC | 0 | 0 | 1 | | |
| 2 | Intra_Chroma_Horizontal | 0 | 0 | 0 | 1 | |
| 3 | Intra_Chroma_Vertical | 0 | 0 | 0 | 0 | 1 |
| 4 | Intra_Chroma_Bilinear | 0 | 0 | 0 | 0 | 0 |
| 5 | Intra_Chroma_TSCPM (TSCPM-LT) | 0 | 1 | 1 | | *0* |
| 6 | TSCPM-L | 0 | 1 | 0 | 1 | *0* |
| 7 | TSCPM-T | 0 | 1 | 0 | 0 | *0* |
| 8 | PMC Mode 0 (e.g., PMC-LT) | *0* | *1* | *1* | | *1* |
| 9 | PMC Mode 1 (e.g., PMC-L) | *0* | *1* | *0* | *1* | *1* |
| 10 | PMC Mode 2 (e.g., PMC-T) | *0* | *1* | *0* | *0* | *1* |
| | Bin index | 0 | 1 | 2 | 3 | 4 |

Figure 16:
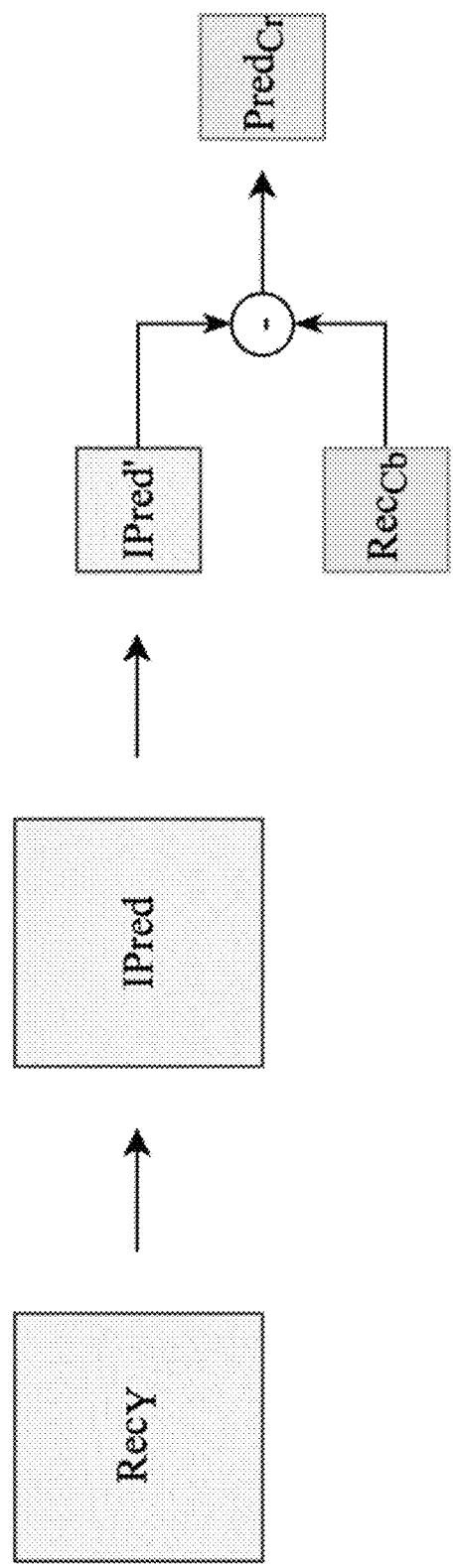
FIG. 16 shows decoding flow chart with a proposed method.

The overall flow is illustrated in FIG. 16. First, inter-channel linear model parameters ($\alpha_0$, $\beta_0$) of Y-Cb and the model parameters ($\alpha_1$, $\beta_1$) of Y-Cr are obtained from neighboring reconstructed samples. The linear model parameters derived methods of PMC_LT, PMC_L and PMC_T are respectively identical to TSCPM_LT, TSCPM_L and TSCPM_T in AVS3.

Second, an internal block IPred which has identical dimension of luma coding block is generated by linear model as follows, $$\text{IPred}=(\alpha_0+\alpha_1)\cdot\text{Rec}_Y+(\beta_0+\beta_1), \quad (22)$$

where $\text{Rec}_Y$ is the reconstructed samples of Y component.

Third, a down-sampled block IPred' is generated from IPred which employs the same set of down-sampling filters as those in TSCPM.

Fourth, the final prediction $\text{FPred}_{Cr}$ of Cr can be formulated as follows, $$\text{FPred}_{Cr}=\text{Clip}(0,(1<<\text{bitDepth})-1,\text{IPred}'-\text{Rec}_{Cb}). \quad (23)$$

where $\text{Rec}_{Cb}$ is the reconstructed samples of Cb component.

Alternatively, the following may apply:
A Prediction from Multiple Cross-components (PMC) method is proposed wherein the prediction of Cr component is derived by the linear combination of the Y and Cb reconstructed samples. An internal block IPred is firstly derived according to a linear model applied to the corresponding luma block, and the final prediction of Cr is set to the differences between the donwsampled temporary block and reconstructed Cb block. More specifically, the final prediction of Cr block is defined as follows:

$$\text{IPred}=A\cdot\text{Rec}_Y+B, \quad (24)$$

$$\text{FPred}_{Cr}=\text{IPred}'-\text{Rec}_{Cb}. \quad (25)$$

where $\text{Rec}_Y$ denotes the reconstruction of Y components and IPred is an internal block that has identical dimension of luma coding block. IPred' represents the down-sampled IPred, which employs the same set of down-sampling filters as in TSCPM.

To keep the complexity as low as possible and resume the logic of TSCPM, the linear parameters (A, B) are set to ($\alpha_0+\alpha_1$, $\beta_0+\beta_1$) wherein ($\alpha_0$, $\beta_0$) and ($\alpha_1$, $\beta_1$) are the two sets of linear model parameters derived for Cb and Cr, respectively, such as using TSCPM/CCLM methods.

5.2 Embodiment #2

If TSCPM mode is disabled (tscpm_enable_flag=0), the flag/bin (enhance_tscpm_enable_flag) indicating the enabling of Enhanced-TSCPM (e.g., TSCPM_L, TSCPM_T) is implicitly inferred to be 0 without signaling/parsing.

5.3 Embodiment #3

If Enhanced-TSCPM mode is disabled (e.g. enhance_tscpm_enable_flag=0), the flag/bin (index 2 in Table 5-1) indicating the type of TSCPM (e.g. TSCPM_LT or Enhanced-TSCPM) is removed. The flag/bin (index 3 in Table 5-1) for distinguishing TSCPM-L and TSCPM-T is also excluded.

5.4 Embodiment #4

If Intra Block Copy (IBC) mode is disabled (ibc_enable_flag=0), the flag/bin (abvr_enable_flag) is implicitly inferred to 0 without signaling/parsing.

5.5 Embodiment #5

PMC Prediction from Multiple Cross-Components

7.1.2.2 Sequence Header

TABLE 14

| Sequence Header | |
| --- | --- |
| Sequence Header | Descriptor |
| sequence_header( ) { | |
|   video_sequence_start_code | f(32) |
|   profile_id | u(8) |
|   level_id | u(8) |
|   progressive_sequence | u(1) |
|   field_coded_sequence | u(1) |
|   library_stream_flag | u(1) |
|   if (! LibraryStreamFlag) { | |
|     library_picture_enable_flag | u(1) |
|     if (LibraryPictureEnableFlag) { | |
|       duplicate_sequence_header_flag | u(1) |
|     } | |
|   } | |
| ... | |
|   ipf_enable_flag | u(1) |
|   tscpm_enable_flag | u(1) |
|   marker_bit | f(1) |
|   dt_enable_flag | u(1) |
|   if (DtEnableFlag) { | |
|     log2_max_dt_size_minus4 | u(2) |
|   } | |
|   pbt_enable_flag | u(1) |
|   if (profile_id == 0x32) { | |
|     udip_enable_flag | u(1) |
|     ist_enable_flag | u(1) |
|     srcc_enable_flag | u(1) |
|     ibc_enable_flag | u(1) |
|     *pmc_enable_flag* | |
|   } | |
| ... | |
| } | |

7.2.2.2 Sequence Header

*Cross multi- component prediction mode enable flag pmc _enable_flag Binary variable. A value of '1' indicates that the cross-component prediction mode can be used; a value of '0' indicates that the cross-component prediction mode should not be used. The value of PmcEnableFlag is equal to the value of pmc_ enable_flag. If pmc_enable_flag does not exist in the bit stream, the value of PmcEnableFlag is 0.*

7.1.6 Coding Unit Definition

TABLE 33

| coding unit definition | |
| --- | --- |
| | Descriptor |
| Coding unit definition | |
| coding_unit(x0, y0, width, height, | |
| mode, component) { | |
| ... | |
|   intra_chroma_pred_mode | ae(v) |
|   if (IntraChromaPredMode == 1 && | |
|   EnhanceTscpmFlag&& | |

TABLE 33-continued

| coding unit definition | |
|---|---|
|  | Descriptor |
| !(x0 ==0 \|\| y0 == 0)) { | |
|    intra_chroma_enhanced_mode | ae(v) |
| } | |
| *If (IntraChromaPredMode == 1* | |
| *&& TscpmEnableFlag &&* | |
| *PmcEnableFlag) {* | |
|    *intra_chroma_pmc_flag* | *ae(v)* |
| *}* | |
| ... | |
| if (!IntraChromaPmcFlag) { | |
|    ctp_u | ae(v) |
| } | |
| ... | |
| } | |

8.3.3.2.1 Export Binary Symbol Model

If ctxIdxIncW does not exist, the binary symbol model ctx is equal to ctxArray[ctxIdx], where ctxArray is the array storing the binary symbol model, and ctxIdx is the index value of the array; otherwise, the binary symbol model ctx and ctxW are equal to ctxArray[ctxIdx] and ctxArray[ctx1dxW], where ctxArray is the array storing the binary symbol model, and ctxIdx and ctxIdxW are the index values of the array. The ctxIdx of each binary symbol of the syntax element is equal to ctxIdxInc plus ctxIdxStart, and ctxIdxW is equal to ctxIdxIncW plus ctxIdxStart. The ctxIdxStart corresponding to each syntax element and the ctxIdxInc corresponding to each binary symbol are shown in Table 53, and ctxIdxIncW is shown in 8.3.3.2.17.

TABLE 53 ctxIdxStart and ctxIdxInc corresponding to the syntax elements

| Syntax Element | ctxIdxInc | ctxIdxStart | # of ctx |
|---|---|---|---|
| lcu_qp_delta | See 8.3.3.2.2 | 0 | 4 |
| sao_merge_type_index | binIdx + SaoMerge-LeftAvai + SaoMerge-UpAvai-1 | 4 | 3 |
| sao_mode | 0 | 7 | 1 |
| sao_interval_offset_abs | 0 | 8 | 1 |
| alf_lcu_enable_flag | 0 | 9 | 1 |
| qt_split_flag | See 8.3.3.2.3 | 10 | 4 |
| bet_split_flag | See 8.3.3.2.4 | 14 | 9 |
| bet_split_type_flag | See 8.3.3.2.5 | 23 | 3 |
| bet_split_dir_flag | See 8.3.3.2.6 | 26 | 5 |
| root_cu_mode | 0 | 31 | 1 |
| intra_chroma_pred_mode | See 8.3.3.2.7 | 32 | 4 |
| intra_chroma_enhanced_mode | See 8.3.3.2.8 | 36 | 1 |
| Infra_chroma_paw_flag | See 8.3.3.2.8 | 37 | 1 |

*8.3.3.2.9 Determine ctxIdxInc of intra_chroma_pmc_mode Determine the ctxIdxInc of intra_chroma_pmc_ mode according to the following method: ctxIdxInc is equal to 0;*

9.5.6.2 Normal Intra Prediction Mode a) If the current prediction block E is a chrominance block:

1) If the luma prediction mode IntraLumaPredMode of the prediction block whose PredBlockOrder value is 0 in the current coding unit is equal to 0, 2, 12 or 24, then is Redundant is equal to 1; otherwise, is Redundant is equal to 0.

2) If the value of tscpm_enableflag is equal to '1' and the value of intra_chroma_pred_mode is equal to 1, 3) Determine the initial value according to intra_chroma_enhanced_mode:
If the value of intm_chromaenhancedmode is equal to 0, then IntraChromaPredMode is equal to 5;
Otherwise, if the value of intra chroma enhanced mode is equal to 1, then IntmChromaPredMode is equal to 6;
Otherwise, if the value of intrachromaenhancedmode is equal to 2, then IntmChromaPredMode is equal to 7;
- *If the value of intra_ chroma_pmc_mode is equal to 1, then IntraChroma PredMode is equal to IntraChromaPredMode+3.*

4) Otherwise,
If the value of tscpm_enableflag is equal to '1' and the value of intra_chroma_pred_mode is not equal to 0, then the value of intrachroma_pred_mode is reduced by 1;
If is Redundant is equal to 0, IntraChromaPredMode is equal to intra_chroma_pred_mode; otherwise, perform the following operations in sequence:
If IntraLumaPredMode is equal to 0, then predIntmChromaPredMode is equal to 1; if IntraLumaPredMode is equal to 2, then predIntraChromaPredMode is equal to 4; if IntraLumaPredMode is equal to 12, then predIntraChromaPredMode is equal to 3; if IntraLumaPredMode is equal to 24, predIntraChromaPredMode is equal to 2.
If the value of intrachroma_pred_mode is equal to 0, then IntraChromaPredMode is equal to 0;
otherwise, if the value of intra_chroma_pred_mode is less than predIntraChromaPredMode, then IntraChromaPredMode is equal to intra_chroma_pred_mode; otherwise, IntraChromaPredMode is equal to intra_chroma_pred_mode plus 1.

9.7.5. Ordinary Intra Prediction of Chromaprediction Block

According to IntmChromaPredMode, the general intra prediction method of chrominance block is determined.

a) IntraChromaPredMode is equal to 5, 6, 7, *8, 9 or 10* (Intra_Chroma_TSCPM/ *Intra_Chroma_PMC prediction*)
The size of the current prediction block is M×N, I represents the luminance sample matrix of the compensated sample of the image where the current block is located, r[i], c [j] (i=0-2M, j=0-2N) is Luminance reference samples, row[i], co l[i] (i=0-2M, j=0-2N) are chrominance reference samples.
If row[i] (i=1~M) and col[i] (i=1~N) are both "unavailable", then α is equal to 0, β is equal to 1<<(BitDepth−1), and the value of iShift is equal to 0; otherwise, iShift is equal to 16, and a and β are derived according to the following steps:

If IntraChromaPredMode is equal to 5, 8:
1) The first step is to obtain (x[i],y[i]), where i=0~3:
   (1) If row[i] (i=1~M) and col[j] (j=1~N) are both "available":
   Set posA0 equal to 0 and posL0 equal to 0; if M is greater than or equal to N, posA1 is equal to M−[M/N], and posL1 is equal to N−1; otherwise, posA1 is equal to M−1 and posL1 is equal to N−[N/M]

$(x[0],y[0])=((r[2\times posA0]+2\times r[2\times posA0+1]+r[2\times posA0+2]+2)>>2, row[posA0+1])$ $(x[1],y[1])=((r[2\times posA1]+2\times r[2\times posA1+1]+r[2\times posA1+2]+2)>>2, row[posA1+1])$ $(x[2],y[2])=((c[2\times posL0+1]+c[2\times posL0+2]+1)>>1, col[posL0+1])$ $(x[3],y[3])=((c[2\times posL1+1]+c[2\times posL1+2]+1)>>1, col[posL1+1])$ (2) If row[i] is "available" and col[j] is "unavailable" (i=1~M, j=1~N):
   Let posA0 equal to 0, posA1 equal to [M/4], posA2 equal to [2×M/4], and posA3 equal to [3×M/4]

$(x[0],y[0])=((3\times r[2\times posA0+1]+r[2\times posA0+2]+2)>>2, row[posA0+1])$ $(x[1],y[1])=((r[2\times posA1]+2\times r[2\times posA1+1]+r[2\times posA1+2]+2)>>2, row[posA1+1])$ $(x[2],y[2])=((r[2\times posA2]+2\times r[2\times posA2+1]+r[2\times posA2+2]+2)>>2, row[posA2+1])$ $(x[3],y[3])=((r[2\times posA3]+2\times r[2\times posA3+1]+r[2\times posA3+2]+2)>>2, row[posA3+1])$ (3) If row[i] is "unavailable" and col[j] is "available" (1~M, j=1~N):
   Let posL0 be equal to 0, posL1 be equal to [N/4], posL2 be equal to [2×N/4], posL3 be equal to [3×N/4]

$(x[0],y[0])=((c[2\times posL0+1]+c[2\times posL0+2]+1)>>1, col[posL0+1])$ $(x[1],y[1])=((c[2\times posL1+1]+c[2\times posL1+2]+1)>>1, col[posL1+1])$ $(x[2],y[2])=((c[2\times posL2+1]+c[2\times posL2+2]+1)>>1, col[posL2+1])$ $(x[3],y[3])=((c[2\times posL3+1]+c[2\times posL3+2]+1)>>1, col[posL3+1])$ If IntraChromaPredMode is equal to 6, 9:
   (1) Count the number of reconstructed pixels on the upper side and set it as Len:
   Let posA0 equal 0, posA1 equal [Len/4], posA2 equal [2×N/4], and posA3 equal [3×N/4]

$(x[0],y[0])=((3\times r[2\times posA0+1]+r[2\times posA0+2]+2)>>2, row[posA0+1])$ $(x[1],y[1])=((r[2\times posA1]+2\times r[2\times posA1+1]+r[2\times posA1+2]+2)>>2, row[posA1+1])$ $(x[2],y[2])=((r[2\times posA2]+2\times r[2\times posA2+1]+r[2\times posA2+2]+2)>>2, row[posA2+1])$ $(x[3],y[3])=((r[2\times posA3]+2\times r[2\times posA3+1]+r[2\times posA3+2]+2)>>2, row[posA3+1])$ If IntraChromaPredMode is equal to 7, 10:
   (1) Count the number of usable pixels on the left and record it as Len:
   Let posL0 be equal to 0, posL1 be equal to [Len/4], posL2 be equal to [2×Len/4], posL3 be equal to [3×Len/4]

$(x[0],y[0])=((c[2\times posL0+1]+c[2\times posL0+2]+1)>>1, col[posL0+1])$ $(x[1],y[1])=((c[2\times posL1+1]+c[2\times posL1+2]+1)>>1, col[posL1+1])$ $(x[2],y[2])=((c[2\times posL2+1]+c[2\times posL2+2]+1)>>1, col[posL2+1])$ $(x[3],y[3])=((c[2\times posL3+1]+c[2\times posL3+2]+1)>>1, col[posL3+1])$ 2) The second step is to calculate the linear model coefficients α, β:
   (1) Let minIdx[2]={0,2}, maxIdx[2]={1,3}:
   If x[minIdx[0]] is greater than x[minIdx[1]], exchange the values of minIdx[0] and minIdx[1];
   If x[maxIdx[0]] is greater than x[maxIdx[1]], exchange the values of maxIdx[0] and maxIdx[1];
   If x[minIdx[0]] is greater than x[maxIdx[1]], exchange the values of minIdx[0] and maxIdx[0],
   and exchange the values of minIdx[1] and maxIdx[1] at the same time;
   If x[minIdx[1]] is greater than x[maxIdx[0]], exchange the values of minIdx[1] and maxIdx[0];
   (xMin,yMin)=((x[minIdx[0]]+x[minIdx[1]]+1)>>1,(y[minIdx[0]]+y[minIdx[1]]+1)>>1)
   (xMax,yMax)=((x[maxIdx[0]]+x[maxIdx[1]]+1)>>1,(y[maxIdx[0]]+y[maxIdx[1]]+1)>>1)
   diffX=xMax−xMin
   diffY=yMax−yMin
   If diffX is greater than 64:
   α=(diffY□Tscpm Table [((diffX+add)>>shift)−1]+add)>>shift
   β=yMin−((α□xMin)>>iShift)
   Among them, shift=(BitDepth>8)? BitDepth−6: 2, add=1<<(shift−1)
   Otherwise, if diffX is greater than 0:
   α=(diffY□Tscpm Table [diffX−1])
   β=yMin−((α□xMin)>>iShift)
   otherwise:
   α=0
   β=yMin
   The value of TscpmTable is shown in Table 86
2) The third step, tet chromaprediction value:
   a) If IntraChromaPredMode is equal to 5, 6 or 7, or if IntraChromaPredMode is equal to 8, 9 or 10 and the current Cb component, the predicted value is obtained as follows:

predChroma[x][y]=Clip1(((α×I[x][y])>>iShift)+β)
   (x=0~2M−1,y=0~2N−1)

predMatrix[0][y]=(predChroma[0][2y]+predChroma[0][2y+1]+1)>>1,(y=0~N−1)

predMatrix[x][y]=(predChroma[2x−1][2y]+2×prevChroma[2x][2y]+predChroma[2x+1][2y]+predChroma[2x−1][2y+1]+2×predChroma[2x][2y+1]+predChroma[2x+1][2y+1]+4)>>3(x=1~M−1, y=0~N−1)

otherwise, predChroma[x][y]=(((α_cb+α_cr)×I[x][y])>>iShift)+
  β_cb+β_cr(x=0~2M-1,y=0~2N-1)

predMatrixTemp[0][y]=(predChroma[0][2y]+pred-
  Chroma[0][2y+1]+1)>>1,(y=0~N-1)

predMatrixTemp[x][y]=(predChroma[2x-1][2y]+2×
  prevChroma[2x][2y]+predChroma[2x+1][2y]+
  predChroma[2x-1][2y+1]+2×predChroma[2x]
  [2y+1]+predChroma[2x+1][2y+1]+4)>>3,
  (x=1~M-1,y=0~N-1)

predMatrix[x][y]=predMatrixTemp[x][y]-Cb[x][y],
  (x=0~M-1,y=0~N-1)

Example Implementations of the Disclosed Technology

Figure 17:
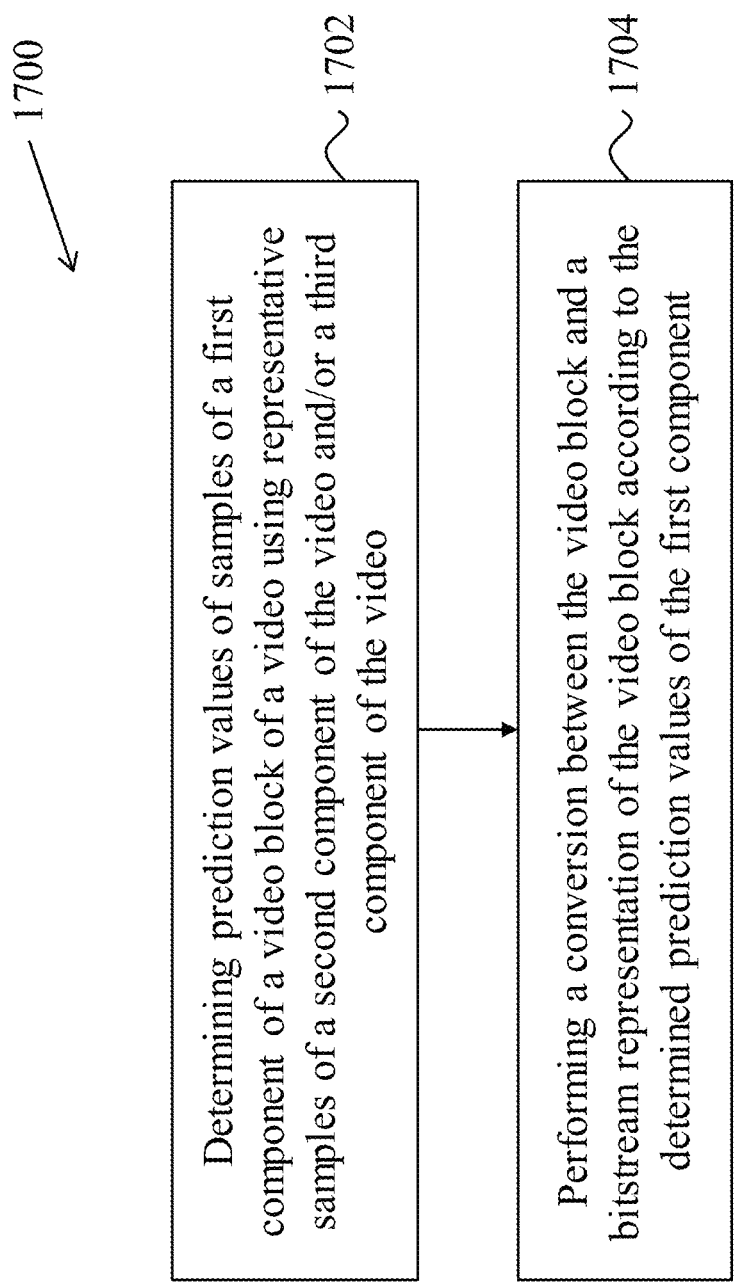
FIG. 17 shows a flowchart of an example video processing method.

FIG. 17 shows a flowchart of an example video processing method 1700. At operation 1702, prediction values of samples of a first component of a video block of a video are determined using representative samples of a second component of the video and/or a third component of the video. At operation 1704, a conversion is performed between the video block and a bitstream representation of the video block according to the determined prediction values of the first component.

In some embodiments, the determining is based on reconstructed values of the representative samples or prediction values of the representative samples. In some embodiments, the representative samples are obtained during the conversion. In some embodiments, the prediction values of the first component for one sample of the video block is obtained using an equation. In some embodiments, the equation includes: $FPred_{c0}=X \times TPred_{c0}+Y \times (Rec_{c2}-FPred_{c2})+Z$, where $FPred_{c0}$ is a prediction value for one sample, X and Y are weighting factors, Z is an offset value, $TPred_{c0}$ is a temporary prediction value of the one sample using a prediction mode, and $Rec_{c2}$ and $FPred_{c2}$ respectively represent reconstruction values and final prediction values of the representative samples of the third component.

In some embodiments, the equation includes: $FPred_{c0}=X \times (\alpha_{c0}*Rec_{c1}+\beta_{c0})+Y \times (Rec_{c2}-(\alpha_{c2}*Rec_{c1}+\beta_{c2})+Z$, where $FPred_{c0}$ is a prediction value for the one sample, X and Y are weighting factors, Z is an offset value, $\alpha_{c0}$, $\alpha_{c2}$ are two variables applied to the representative samples of the second component, $\beta_{c0}$ and $\beta_{c2}$ are offset values, $Rec_{c1}$ and $Rec_{c2}$ represent reconstruction values of the representative samples of the second component and the third component, respectively.

In some embodiments, the equation includes: $FPred_{c0}=(X \times \alpha_{c0}-Y \times \alpha_{c2})*Rec_{c1}+(X \times \beta_{c0}-Y \times \beta_{c2})+Y \times Rec_{c2}+Z$, where $FPred_{c0}$ is a prediction value for the one sample, X and Y are weighting factors, Z is an offset value, $\alpha_{c0}$, $\alpha_{c2}$ are two variables applied to the representative samples of the second component, $\beta_{c0}$ and $\beta_{c2}$ are offset values, $Rec_{c1}$ and $Rec_{c2}$ represent reconstruction values of the representative samples of the second component and the third component, respectively.

In some embodiments, X or Y or Z is equal to 1, or X or Y or Z is equal to 0, or X is equal to 1, Y is equal to -1 and Z is equal to 0, or X or Y or Z is equal to 2K or -2K, where K is an integer value being in the range of [-M, N], where M and N are greater than or equal to 0. In some embodiments, the equation includes variables that are either predefined, or signaled in a bitstream, or derived.

In some embodiments, the method of FIG. 17 further comprises deriving two temporary video blocks for the first component and the third component according to two sets of linear model parameters corresponding to a second video block associated with the second component, where the two temporary video blocks and the second video block have a first width and a first height that is different from a second width and a second height of the video block. In some embodiments, the two temporary blocks are derived using the linear model parameters applied to the second video block associated with the second component.

In some embodiments, the method of FIG. 17 further comprises deriving one temporary video block according to linear model parameters corresponding to a second video block associated with the second component, where the one temporary video block and the second video block have a first width and a first height that is different from a second width and a second height of the video block. In some embodiments, the method of FIG. 17 further comprises deriving a temporary video block for the second component from a second video block associated with the second component, where the second video block has a first width and a first height that is different from a second width and a second height of the video block, applying linear model parameters to the temporary video block, and adding a collocated sample to or subtracting the collocated sample from the temporary video block after the linear model parameters are applied.

In some embodiments, the first component is a blue chroma component, the second component is a luma component, and the third component is a red chroma component, or the first component is the red chroma component, the second component is the luma component, and the third component is the blue chroma component, or the first component is the luma component or a blue component, the second component and the third component are remaining components.

In some embodiments, a selection of the representative samples and a number of the representative samples of the second component and/or the third component are dynamically determined. In some embodiments, the selection of the representative samples is based on a position of a current sample of the first component and/or a color format. In some embodiments, the color format includes a 4:2:0 color format, and the representative samples of the second component and/or the third component surround samples of the second component and/or the third component.

In some embodiments, the representative samples include reconstructed samples before in-loop filtering methods. In some embodiments, the representative samples are a function of reconstructed samples before in-loop filtering methods. In some embodiments, linear model parameters are applied to the representative samples of the second component. In some embodiments, the linear model parameters include αc0 and βc0 that are derived for the samples or the video block, $\alpha_{c0}$ is a variable applied to the representative samples of the second component, and $\beta_{c0}$ is an offset value.

In some embodiments, $\alpha_{c0}$ and $\beta_{c0}$ are derived using neighboring samples of the video block and neighboring samples of a second video block associated with the second component. In some embodiments, the linear model parameters include αc2 and βc2 that are derived for the representative samples of the third component or a third video block associated with the third component, $\alpha_{c2}$ is a variable applied to the representative samples of the third component, and $\beta_{c2}$ is an offset value. In some embodiments, $\alpha_{c2}$ and $\beta_{c2}$ are derived using neighboring samples of a second video block associated with the second component and neighboring samples of the third video block.

In some embodiments, the linear model parameters are derived using versatile video coding (VVC), Joint Exploration Model (JEM), or two-step cross-component prediction mode (TSCPM). In some embodiments, the equation includes variables, and the prediction values are determining using one of a plurality of prediction from multiple cross-components (PMC) modes that include: different variable values or different derivation methods for linear model parameters, and/or different downsampling or up sampling methods, and/or different locations of reconstructed or downsampled reconstructed neighboring samples for derivation of linear model parameters.

In some embodiments, when a prediction from multiple cross-components (PMC) mode is enabled for the video block of the first component, a residual information of the video block is further signaled. In some embodiments, when a prediction from multiple cross-components (PMC) mode is enabled for the video block of the first component, a residual information of the video block is omitted. In some embodiments, signaling a flag that indicates a presence of non-zero coefficients in the video block of the first component. In some embodiments, an indication of a prediction from multiple cross-components (PMC) mode for the video block is signaled based on a coding mode of the video block. In some embodiments, an indication of a prediction from multiple cross-components (PMC) mode for the video block is signaled based on a color format.

In some embodiments, a bin or flag indicating a utilization of a prediction from multiple cross-components (PMC) mode of a first component is signaled or parsed according to a coded block flag (CBF) and/or a prediction mode of the second component and/or the third component. In some embodiments, the prediction values are determining using one of a plurality of prediction from multiple cross-components (PMC) modes, and an indication of the one PMC mode being enabled is signaled or parsed in addition to an existing intra prediction modes. In some embodiments, an index to the plurality of PMC modes is signaled.

In some embodiments, the prediction values are determining using one of a plurality of prediction from multiple cross-components (PMC) modes, and an indication of enabling the one PMC mode is signaled or parsed in addition to an existing intra prediction modes. In some embodiments, the prediction values are determining using one of a plurality of prediction from multiple cross-components (PMC) modes, and the plurality of PMC modes are additional variances of cross-component prediction (CCP) modes or methods. In some embodiments, a determination to signal or parse the one PMC mode depends on a usage of one CCP mode.

In some embodiments, the prediction values are determining using a cross-component prediction (CCP) method, and the CCP method is signaled based on availability of neighboring samples next to the samples of the first component. In some embodiments, an indication is not signaled for the CCP method that relies on the neighboring samples that are located above the samples of the first component and are unavailable. In some embodiments, an indication is not signaled for the CCP method that relies on the neighboring samples that are located left of the samples of the first component and are unavailable. In some embodiments, the prediction values are determined using a cross-component prediction (CCP) method or a prediction from multiple cross-components (PMC) mode, where the CCP method or the PMC mode is indicated via a signaled in a video processing unit.

In some embodiments, the method of FIG. 17 further includes performing a determination, based on a decoded information associated with the video block, whether the prediction values are determined using a cross-component prediction (CCP) method or a prediction from multiple cross-components (PMC) mode. In some embodiments, the determination is made to disallow using CCP or PMC to determine the prediction values in response to the video block having a number of samples greater than or equal to an integer M, where M is 4096 or 1024. In some embodiments, the determination is made to disallow using CCP or PMC to determine the prediction values in response to the video block having a number of samples less than or equal to an integer M, where M is 4, 8, or 16.

Figure 18:
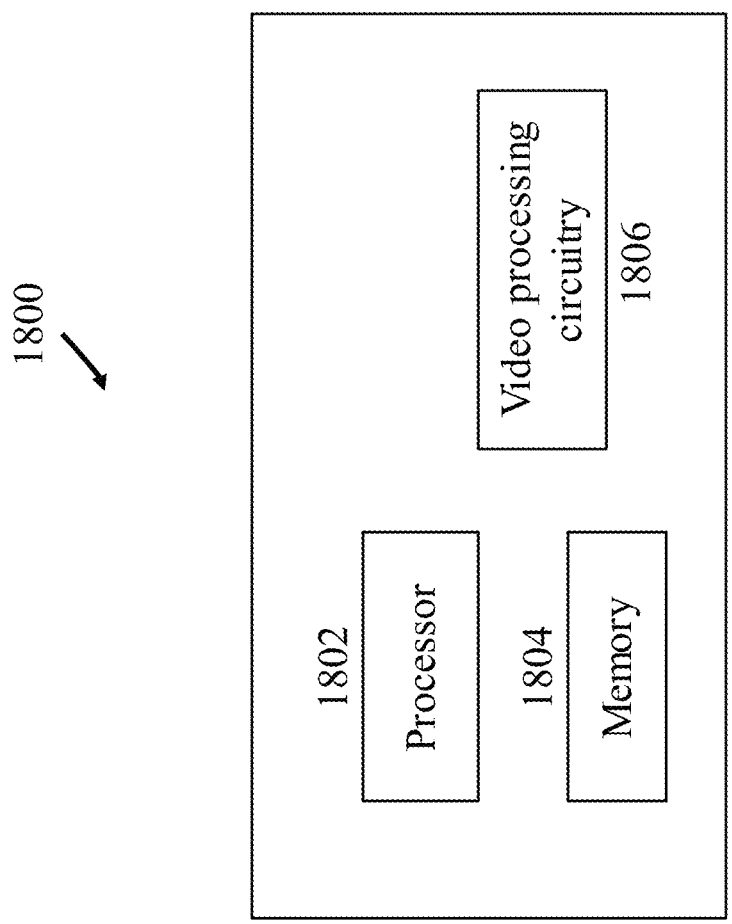
FIG. 18 is a block diagram of a video processing apparatus.

FIG. 18 is a block diagram of a video processing apparatus 1800. The apparatus 1800 may be used to implement one or more of the methods described herein. The apparatus 1800 may be embodied in a smartphone, tablet, computer, Internet of Things (IoT) receiver, and so on. The apparatus 1800 may include one or more processors 1802, one or more memories 1804 and video processing hardware 1806. The processor(s) 1802 may be configured to implement one or more methods (including, but not limited to, method 15) described in the present document. The memory (memories) 1804 may be used for storing data and code used for implementing the methods and techniques described herein. The video processing hardware 1806 may be used to implement, in hardware circuitry, some techniques described in the present document. In some embodiments, the video coding methods may be implemented using an apparatus that is implemented on a hardware platform as described with respect to FIG. 18.

Figure 19:
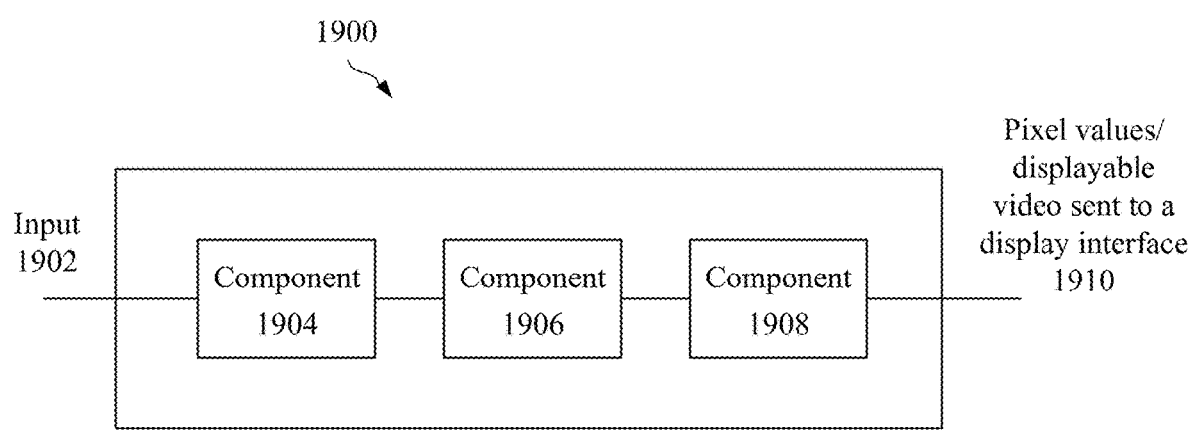
FIG. 19 is a block diagram showing an example video processing system in which various techniques disclosed herein may be implemented.

FIG. 19 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 20:
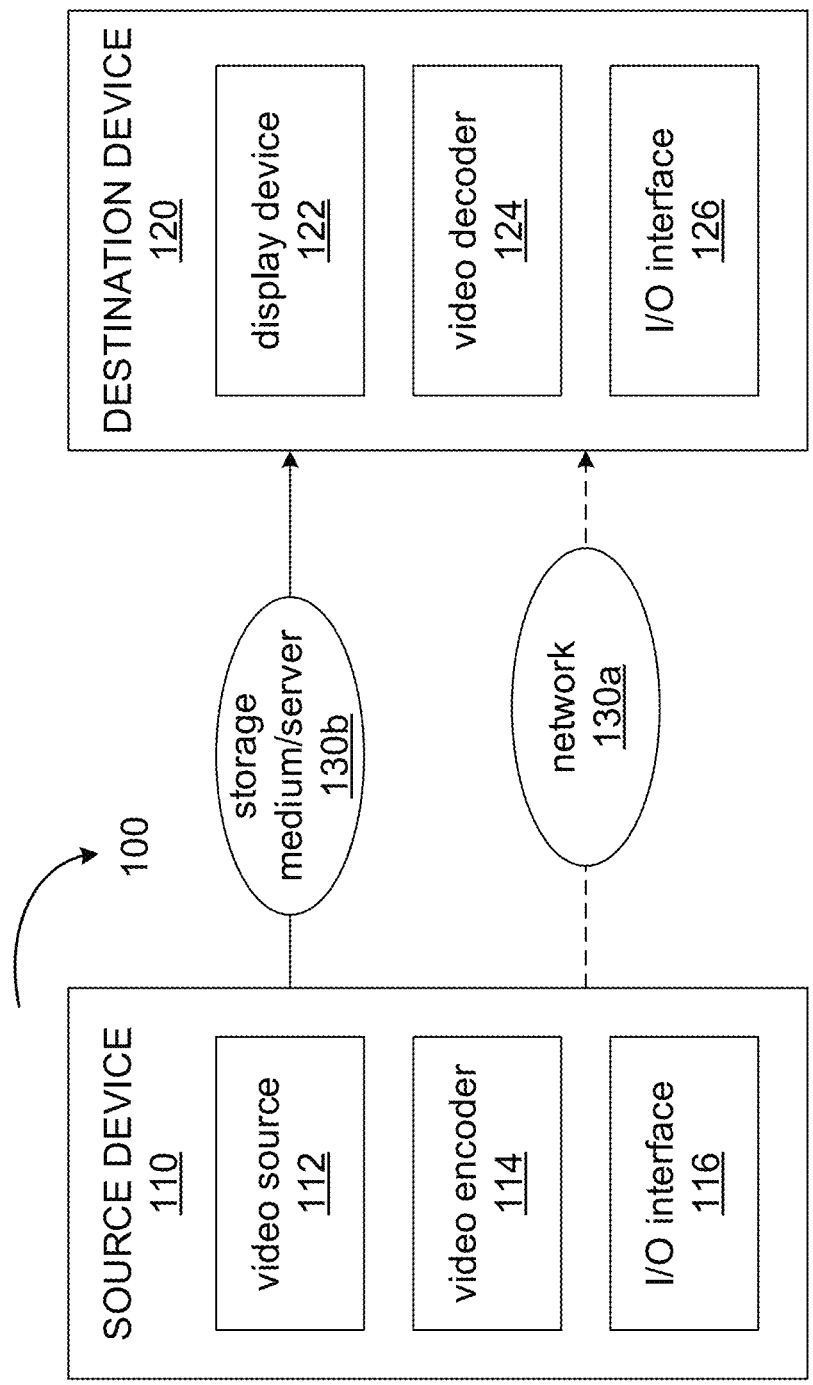
FIG. 20 is a block diagram that illustrates an example video coding system.

FIG. 20 is a block diagram that illustrates an example video coding system 100 that may utilize the techniques of this disclosure.

As shown in FIG. 20, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 21:
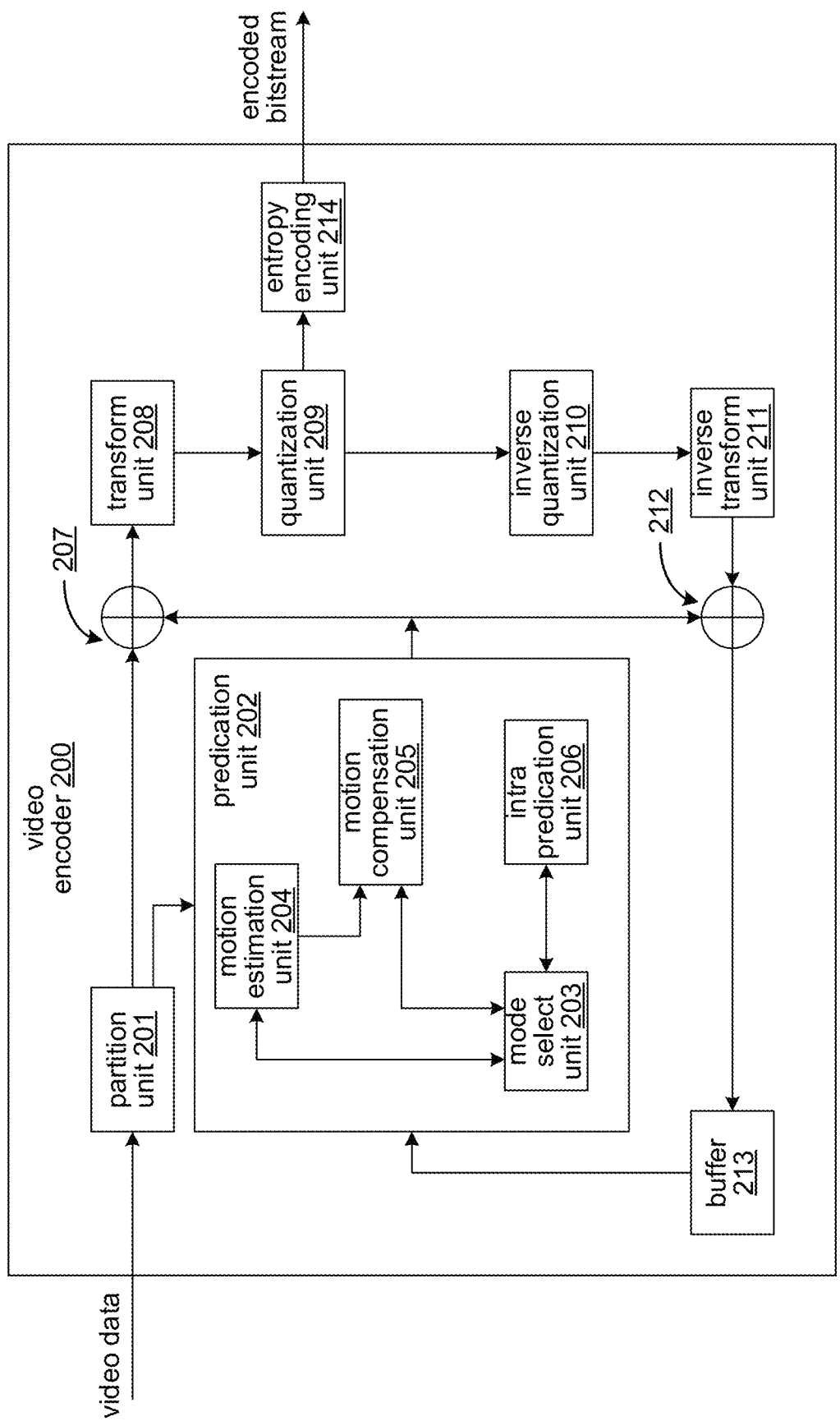
FIG. 21 is a block diagram that illustrates an encoder in accordance with some embodiments of the present disclosure.

FIG. 21 is a block diagram illustrating an example of video encoder 200, which may be video encoder 114 in the system 100 illustrated in FIG. 20.

Video encoder 200 may be configured to perform any or all of the techniques of this disclosure. In the example of FIG. 21, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 22:
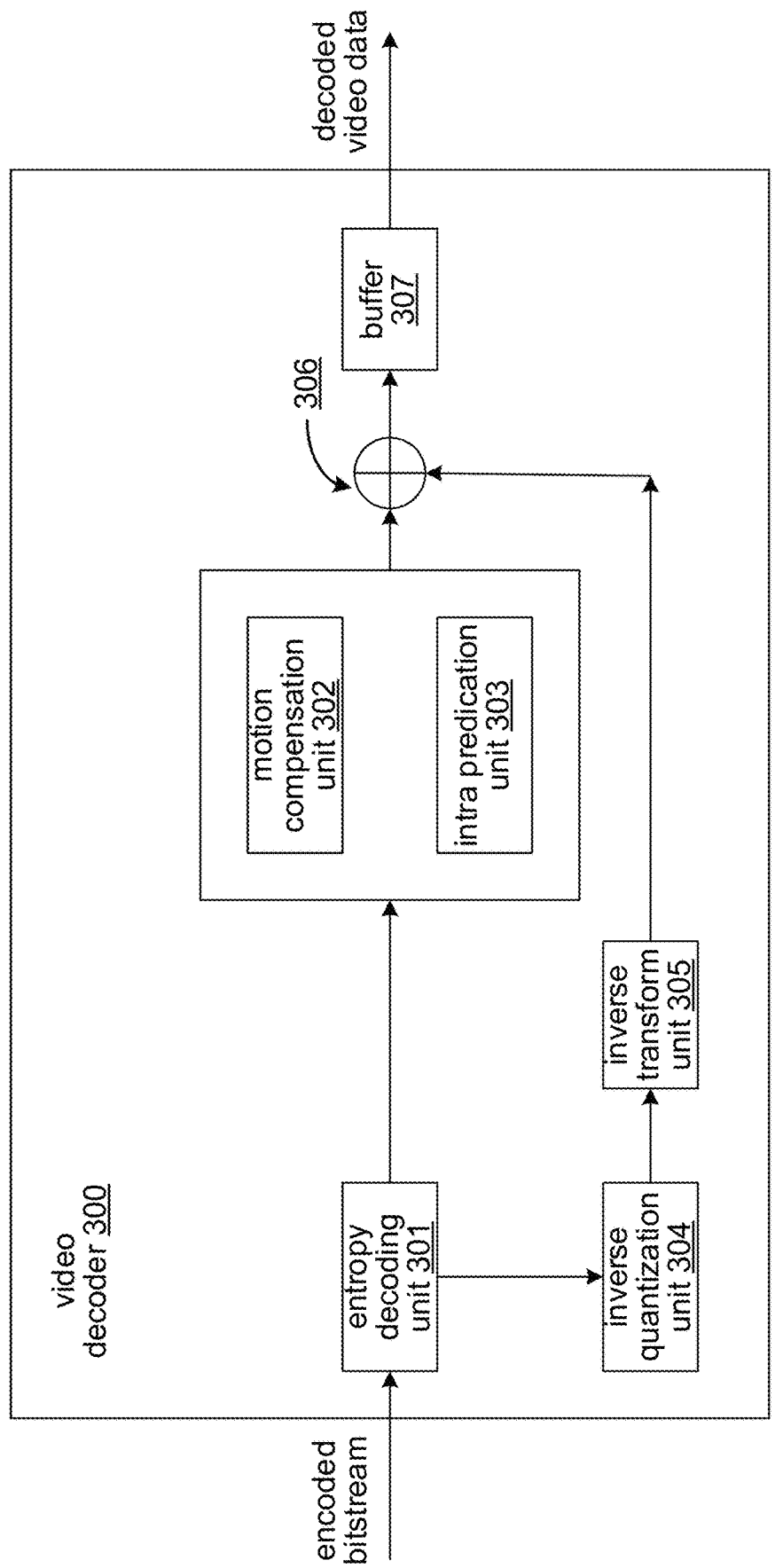
FIG. 22 is a block diagram that illustrates a decoder in accordance with some embodiments of the present disclosure.

FIG. 22 is a block diagram illustrating an example of video decoder 300 which may be video decoder 114 in the system 100 illustrated in FIG. 20.

The video decoder 300 may be configured to perform any or all of the techniques of this disclosure. In the example of FIG. 22, the video decoder 300 includes a plurality of functional components. The techniques described in this disclosure may be shared among the various components of the video decoder 300. In some examples, a processor may be configured to perform any or all of the techniques described in this disclosure.

In the example of FIG. 22, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (e.g., FIG. 21).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, e.g., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

Figure 23:
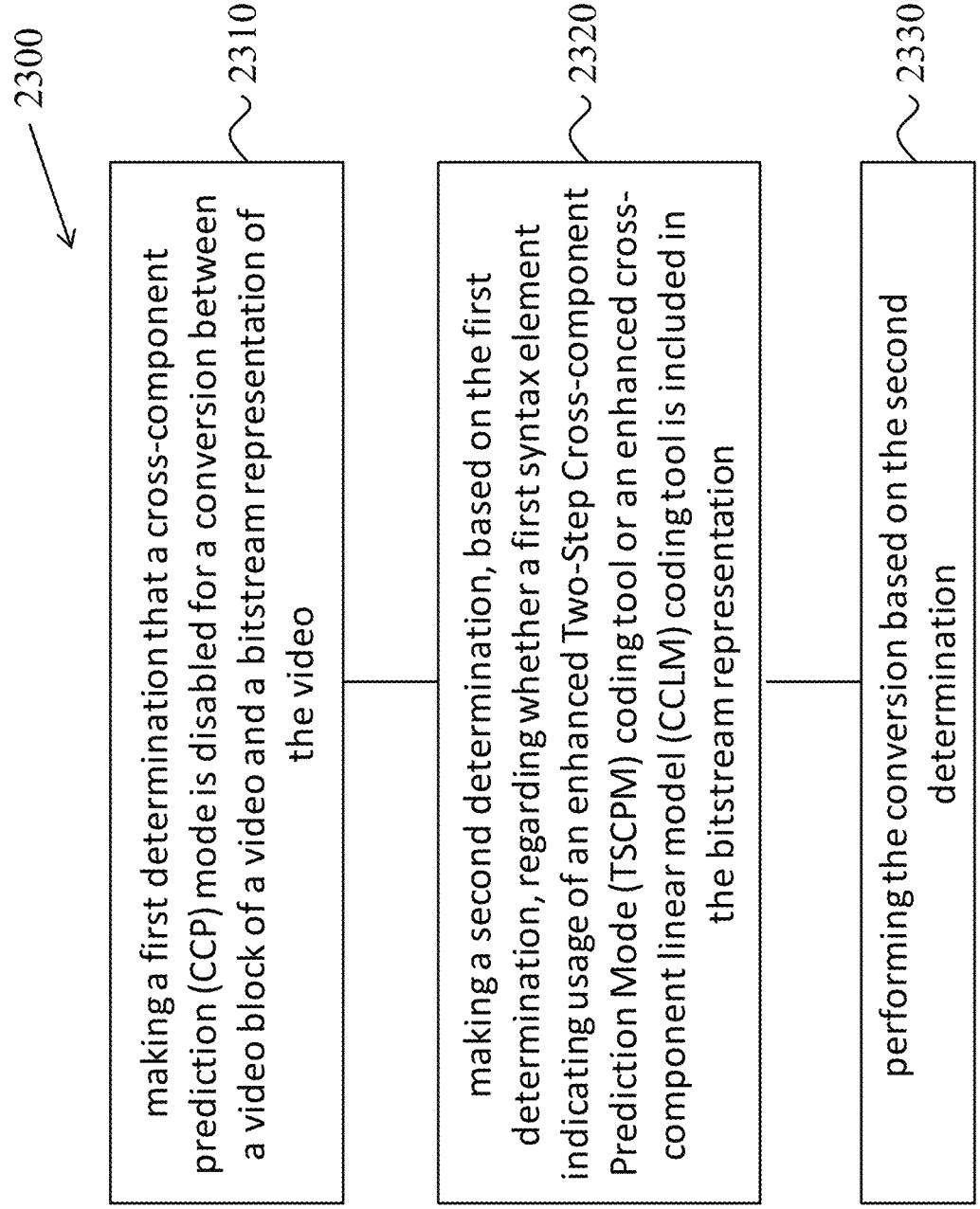
FIG. 23 is a flowchart representation of a method for video processing in accordance with the present technology.

FIG. 23 is a flowchart representation of a method 2300 for video processing in accordance with the present technology. The method 2300 includes, at operation 2310, making a first determination that a cross-component prediction (CCP) mode is disabled for a conversion between a video block of a video and a bitstream representation of the video. The method 2300 includes, at operation 2320, making a second determination, based on the first determination, regarding whether a first syntax element indicating usage of an enhanced Two-Step Cross-component Prediction Mode (TSCPM) coding tool or an enhanced cross-component linear model (CCLM) coding tool is included in the bitstream representation. The method 2300 also includes, at operation 2330, performing a conversion based on the second determination.

In some embodiments, the first syntax element is omitted in the bitstream representation due to the CCP mode being disabled. In some embodiments, in case the enhanced TSCPM coding tool or the enhanced CCLM coding tool is disabled, a second syntax element indicating a type of the enhanced TSCPM coding tool or the enhanced CCLM coding tool is omitted from the bitstream representation. In some embodiments, in case the enhanced TSCPM coding tool or the enhanced CCLM coding tool is disabled, a third syntax element that distinguishes different modes of the enhanced TSCPM coding tool or the enhanced CCLM coding tool is omitted from the bitstream representation.

Figure 24:
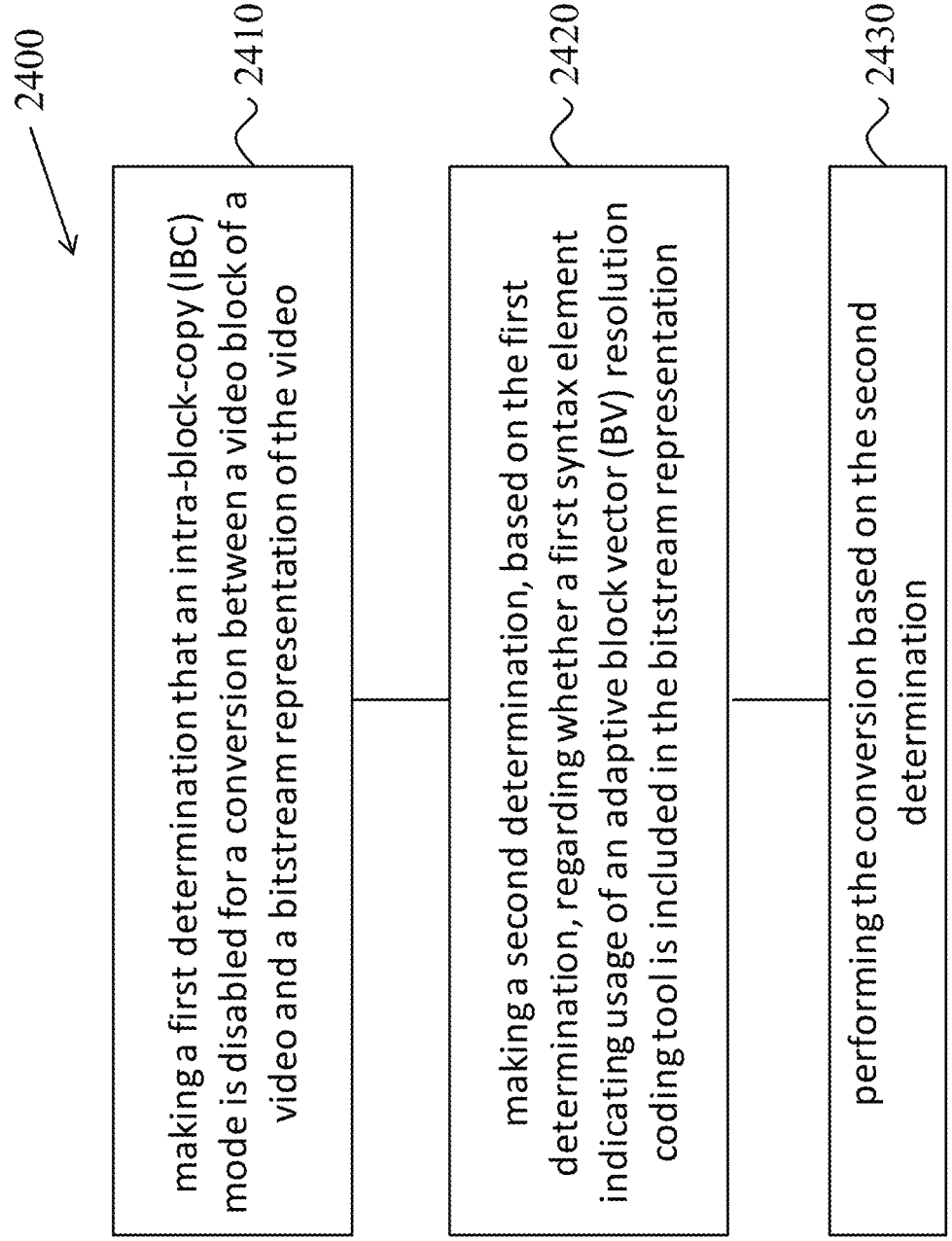
FIG. 24 is a flowchart representation of another method for video processing in accordance with the present technology.

FIG. 24 is a flowchart representation of a method 2400 for video processing in accordance with the present technology. The method includes, at operation 2410, making a first determination that an intra-block-copy (IBC) mode is disabled for a conversion between a video block of a video and a bitstream representation of the video. The method includes, at operation 2420, making a second determination, based on the first determination, regarding whether a first syntax element indicating usage of an adaptive block vector (BV) resolution coding tool is included in the bitstream representation. The method also includes, at operation 2430, performing a conversion based on the second determination.

In some embodiments, the first syntax element is omitted in the bitstream representation due to the IBC mode being disabled.

Figure 25:
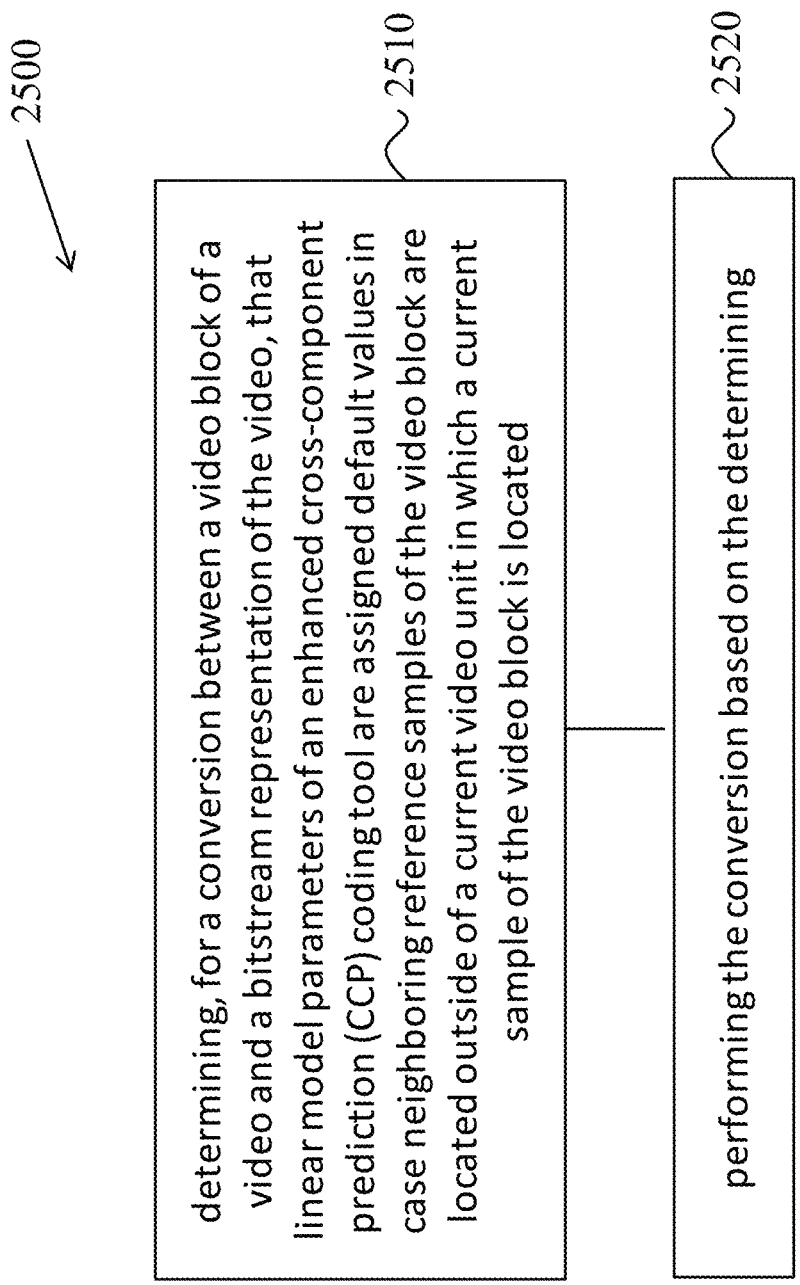
FIG. 25 is a flowchart representation of another method for video processing in accordance with the present technology.

FIG. 25 is a flowchart representation of a method 2500 for video processing in accordance with the present technology. The method 2500 includes, at operation 2510, determining, for a conversion between a video block of a video and a bitstream representation of the video, that linear model parameters of an enhanced cross-component prediction (CCP) coding tool are assigned default values in case neighboring reference samples of the video block are located outside of a current video unit in which a current sample of the video block is located. The method also includes, at operation 2520, performing the conversion based on the determining.

In some embodiments, the neighboring reference samples are located to the left or above the video block. In some embodiments, a default value of one of the linear model parameters α is 0. In some embodiments, a default value of one of the linear model parameters β is 0. In some embodiments, a default value of one of the linear model parameters β is 1<<(bitDepth−1), wherein bitDepth is a bit depth of samples in the video block. In some embodiments, the neighboring reference samples include samples that are located above the video block, and the linear model parameters that use the neighboring reference samples are assigned the default values. In some embodiments, the neighboring reference samples include samples that are located to the left of the video block, and the linear model parameters that use the neighboring reference samples are assigned the default values.

Figure 26:
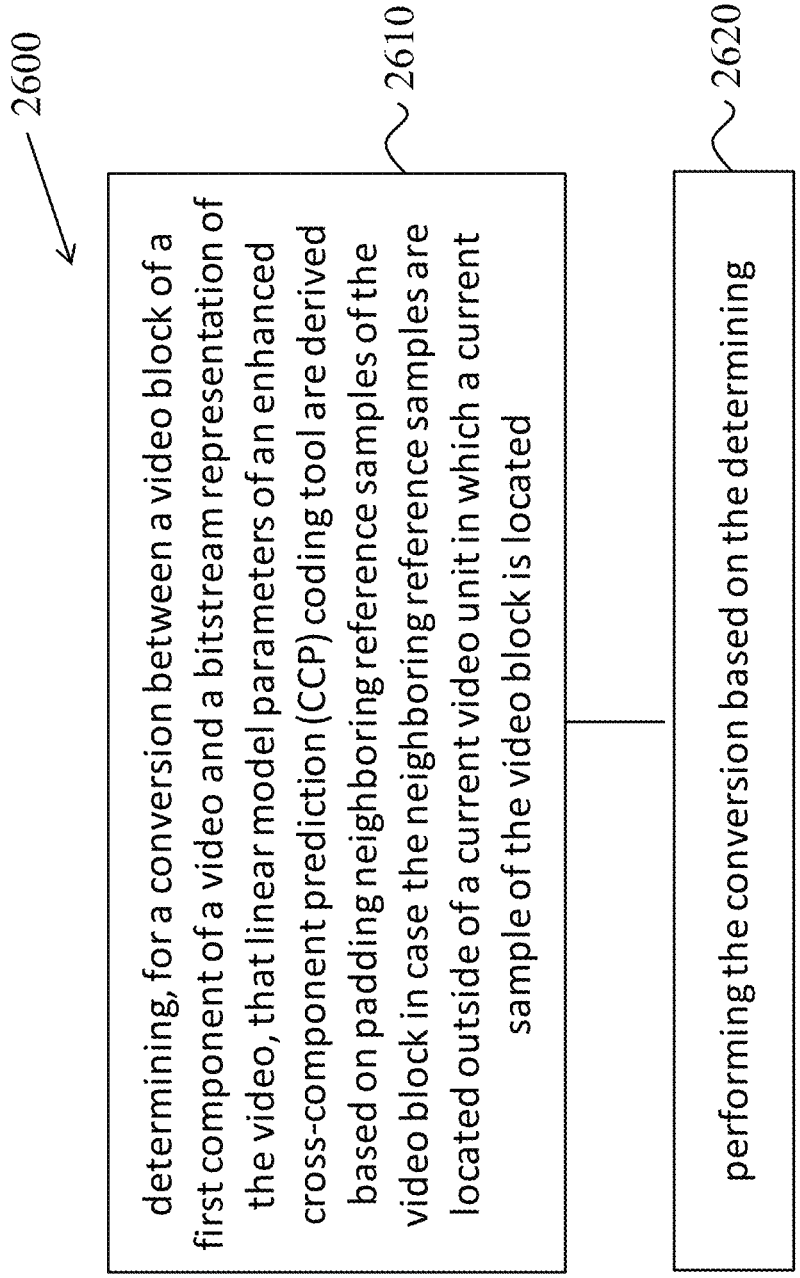
FIG. 26 is a flowchart representation of another method for video processing in accordance with the present technology.

FIG. 26 is a flowchart representation of a method 2600 for video processing in accordance with the present technology. The method includes, at operation 2610, determining, for a conversion between a video block of a first component of a video and a bitstream representation of the video, that linear model parameters of an enhanced cross-component prediction (CCP) coding tool are derived based on padding neighboring reference samples of the video block in case the neighboring reference samples are located outside of a current video unit in which a current sample of the video block is located. The method also includes, at operation 2620, performing the conversion based on the determining.

In some embodiments, the neighboring reference samples are located to the left or above the video block. In some embodiments, the neighboring reference samples are located above the video block, and the linear model parameters that use the neighboring reference samples are derived based on padding the above neighboring reference samples. In some embodiments, the neighboring reference samples are located to the left of the video block, and the linear model parameters that use the neighboring reference samples are derived based on padding the left neighboring reference samples.

Figure 27:
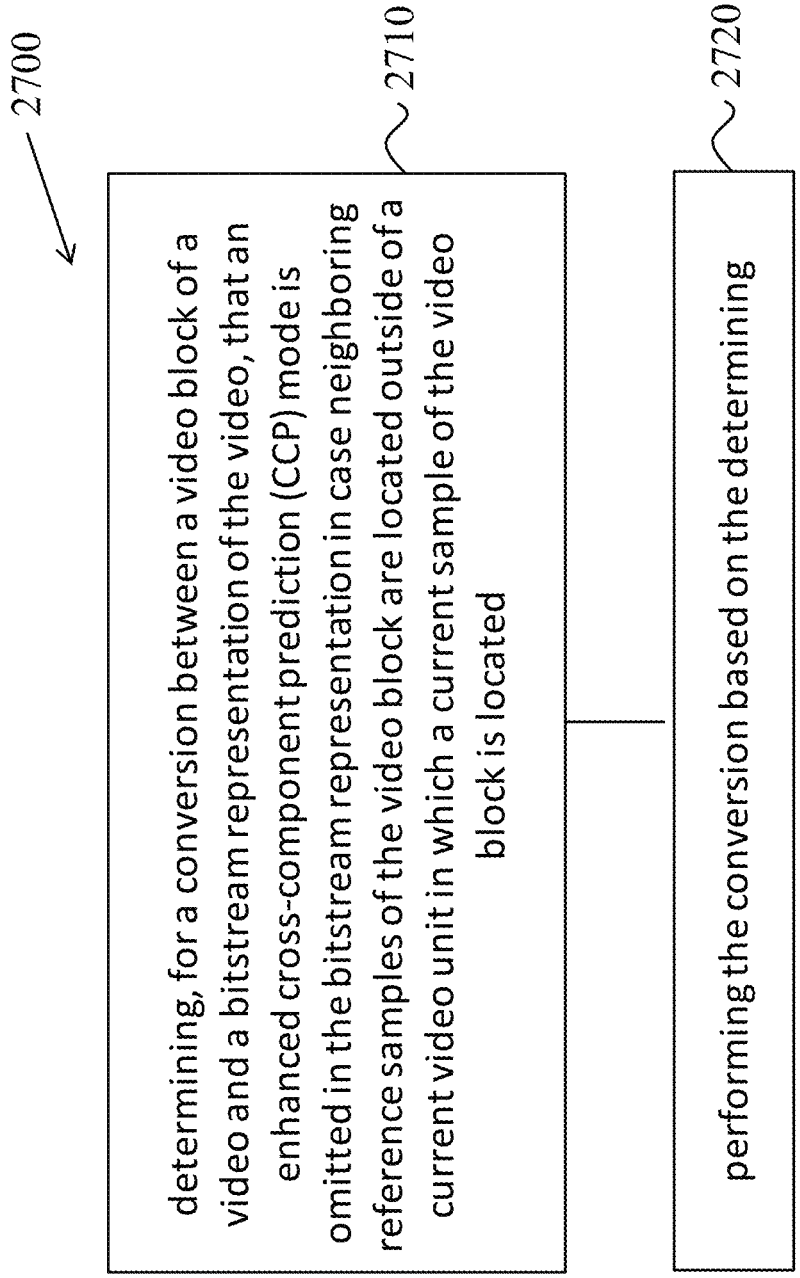
FIG. 27 is a flowchart representation of yet another method for video processing in accordance with the present technology.

FIG. 27 is a flowchart representation of a method 2700 for video processing in accordance with the present technology. The method includes, at operation 2710, determining, for a conversion between a video block of a video and a bitstream representation of the video, that an enhanced cross-component prediction (CCP) mode is omitted in the bitstream representation in case neighboring reference samples of the video block are located outside of a current video unit in which a current sample of the video block is located. The method also includes, at operation 2720, performing the conversion based on the determining.

In some embodiments, the neighboring reference samples are located to the left or above the video block. In some embodiments, the neighboring reference samples are located above the video block, and the enhanced CCP mode that uses only the above neighboring reference samples are omitted in the bitstream representation. In some embodiments, the neighboring reference samples are located to the left of the video block, and the enhanced CCP mode that uses only the left neighboring reference samples are omitted in the bitstream representation.

In some embodiments, the conversion includes encoding the video block into the bitstream representation. In some embodiments, the conversion includes decoding the video block from the bitstream representation.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of video processing, comprising:
   determining, for a conversion between a chroma block of a video and a bitstream of the video, that a first intra prediction mode is applied to derive prediction samples of the chroma block, wherein in the first intra prediction mode, prediction samples of the chroma block are derived based on corresponding luma samples of the chroma block and a linear model,
   determining, for the chroma block, a first parameter and a second parameter of the linear model,
   performing the conversion based on the first parameter and the second parameter,
   wherein the first parameter is set to a first default value and the second parameter is set to a second default value in response to left and/or above neighboring reference samples of the chroma block are not available.

2. The method of claim 1, wherein the first intra prediction mode is a Prediction from Multiple Cross-component (PMC) mode, or a PMC_LT mode, or a Two-Step Cross-component Prediction Mode (TSCPM), or a TSCPM_LT, or a TSCPM_L, or a TSCPM_T, and
   wherein the first parameter is set to the first default value and the second parameter is set to the second default value in response to left and above neighboring reference samples of the chroma block are not available.

3. The method of claim 1, wherein the first intra prediction mode is a PMC_L mode, and
   wherein the first parameter is set to the first default value and the second parameter is set to the second default value in response to left neighboring reference samples of the chroma block are not available.

4. The method of claim 1, wherein the first intra prediction mode is a PMC_T mode, and
   wherein the first parameter is set to the first default value and the second parameter is set to the second default value in response to above neighboring reference samples of the chroma block are not available.

5. The method of claim 1, wherein the first default value and the second default value are different.

6. The method of claim 1, wherein the chroma block is a Cb chroma block, and the linear model comprises predChroma[x][y]=Clip1((($\alpha_{Cb}$*I[x][y])>>iShift)+$\beta_{Cb}$),
   wherein $\alpha_{Cb}$ denotes the first parameter,
   wherein $\beta_{Cb}$ denotes the second parameter,
   wherein iShift is an integer,
   wherein x is an integer no less than 0 and less than 2W, and W is the width of the Cb chroma block,
   wherein y is an integer no less than 0 and less than 2H, and H is the height of the Cb chroma block,
   wherein I[x][y] denotes a luma sample value in the location [x][y], and
   wherein predChroma are used to derive prediction samples of the chroma block.

7. The method of claim 6, wherein the first default value is equal to 0.

8. The method of claim 6, wherein the second default value is equal to 1<<(BitDepth−1), where BitDepth denotes a bit depth of chroma samples.

9. The method of claim 6, wherein the first intra prediction mode is applied to a Cr chroma block corresponding to the Cb chroma block, and
   wherein prediction samples of the Cr chroma block are derived based on (((($\alpha_{Cb}+\alpha_{Cr}$)*I[x][y])>>iShift)+$\beta_{Cb}$+$\beta_{Cr}$), where $\alpha_{Cr}$ and $\beta_{Cr}$ denote two parameters.

10. The method of claim 9, wherein prediction samples of the Cr chroma block are derived as following:

predMatrixTemp[0][n]=(predChroma[0][2n]+predChroma[0][2n+1]+1)>>1, predMatrixTemp[m][n]=(predChroma[2m−1][2n]+ 2*predChroma[2m][2n]+predChroma[2m+1][2n]+predChroma[2m−1][2n+1]+2*predChroma[2m][2n+1]+predChroma[2m+1][2n+1]+4)>>3, and predMatrix[k][n]=predMatrixTemp[k][n]−Cb[k][n], wherein m is an integer greater than 0 and less than W, n is an integer no less than 0 and less than H, and k is an integer no less than 0 and less than W,
    wherein predChroma[ ][ ] are derived based on (((($\alpha_{Cb}+\alpha_{Cr}$)*I[x][y])>>iShift)+$\beta_{Cb}$+$\beta_{Cr}$), and
    wherein predMatrix[ ][ ] denotes a prediction sample of the Cr chroma block.

11. The method of claim 9, wherein $\alpha_{Cr}$ is set to the first default value and $\beta_{Cr}$ is set to the second default value in response to left and/or above neighboring reference samples of the chroma block are not available.

12. The method of claim 1, wherein a first syntax element indicating whether the first intra prediction mode is enabled is included in the bitstream.

13. The method of claim 1, wherein a second syntax element indicating whether TSCPM is enabled is included in the bitstream, and Enhanced TSCPM is only enabled in response to the second syntax element indicating TSCPM being enabled.

14. The method of claim 1, wherein one or more flags indicating a type of TSCPM are included in the bitstream in case that Enhanced TSCPM is enabled.

15. The method of claim 1, wherein in case that a fourth syntax element indicates Intra Block Copy (IBC) mode is disabled for a video block of the video, Adaptive BV Resolution (ABVR) is inferred to be disabled for the video block.

16. The method of claim 1, wherein the conversion includes encoding the chroma block into the bitstream.

17. The method of claim 1, wherein the conversion includes decoding the chroma block from the bitstream.

18. An apparatus for processing video data comprising a processor and a non-transitory memory with instructions thereon, wherein the instructions upon execution by the processor, cause the processor to:
    determine, for a conversion between a chroma block of a video and a bitstream of the video, that a first intra prediction mode is applied to derive prediction samples of the chroma block, wherein in the first intra prediction mode, prediction samples of the chroma block are derived based on corresponding luma samples of the chroma block and a linear model, determine, for the chroma block, a first parameter and a second parameter of the linear model, perform the conversion based on the first parameter and the second parameter, wherein the first parameter is set to a first default value and the second parameter is set to a second default value in response to left and/or above neighboring reference samples of the chroma block are not available.

19. A non-transitory computer-readable storage medium storing instructions that cause a processor to:

determine, for a conversion between a chroma block of a video and a bitstream of the video, that a first intra prediction mode is applied to derive prediction samples of the chroma block, wherein in the first intra prediction mode, prediction samples of the chroma block are derived based on corresponding luma samples of the chroma block and a linear model, determine, for the chroma block, a first parameter and a second parameter of the linear model, perform the conversion based on the first parameter and the second parameter, wherein the first parameter is set to a first default value and the second parameter is set to a second default value in response to left and/or above neighboring reference samples of the chroma block are not available.

20. A method for storing a bitstream of a video, comprising:

determining, for a chroma block of the video, that a first intra prediction mode is applied to derive prediction samples of the chroma block, wherein in the first intra prediction mode, prediction samples of the chroma block are derived based on corresponding luma samples of the chroma block and a linear model;

determining, for the chroma block, a first parameter and a second parameter of the linear model;

generating the bitstream based on the first parameter and the second parameter; and storing the bitstream in a non-transitory computer-readable recording medium, wherein the first parameter is set to a first default value and the second parameter is set to a second default value in response to left and/or above neighboring reference samples of the chroma block are not available.

* * * * *